(12) United States Patent
Attorre et al.

(10) Patent No.: US 10,522,186 B2
(45) Date of Patent: Dec. 31, 2019

(54) APPARATUS, SYSTEMS, AND METHODS FOR INTEGRATING DIGITAL MEDIA CONTENT

(71) Applicant: Adobe Inc., San Jose, CA (US)

(72) Inventors: Brunno Fidel Maciel Attorre, New York, NY (US); Xiaozhen Xue, Woodbridge, CT (US); Shabbir Marzban, Quetta (PK); Nicolas Huynh Thien, New York, NY (US); William L. Marino, New York, NY (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/049,690

(22) Filed: Jul. 30, 2018

(65) Prior Publication Data

US 2019/0035431 A1    Jan. 31, 2019

Related U.S. Application Data

(60) Provisional application No. 62/538,155, filed on Jul. 28, 2017.

(51) Int. Cl.
*H04N 5/93*    (2006.01)
*G11B 27/036*    (2006.01)
(Continued)

(52) U.S. Cl.
CPC ........ *G11B 27/036* (2013.01); *G06K 9/00718* (2013.01); *G06K 9/00744* (2013.01);
(Continued)

(58) Field of Classification Search
CPC ............ G06K 9/00718; G06K 9/00744; G10L 17/005; G11B 27/036; G11B 27/3081; G11B 27/34
(Continued)

(56) References Cited

U.S. PATENT DOCUMENTS

| | | |
|---|---|---|
| 6,711,293 B1 | 3/2004 | Lowe |
| 2009/0238460 A1 | 9/2009 | Funayama et al. |
| 2019/0116200 A1* | 4/2019 | Joy ..................... H04L 63/1433 |

OTHER PUBLICATIONS

Meyer, Yves, "Wavelets and Operators", Cambridge Studies in Advanced Mat, Volume, 37, Cambridge University Press, Jan. 1996, 4 pages.

(Continued)

*Primary Examiner* — Robert Chevalier
(74) *Attorney, Agent, or Firm* — Kilpatrick Townsend & Stockton LLP

(57) ABSTRACT

Disclosed herein are techniques for digital content integration. A computer-implemented method includes receiving a target digital content item that includes a plurality of frames, identifying a set of candidate host frames for inserting source digital content items from the plurality of frames based on one or more attributes of the target digital content item, determining a candidate score for each respective candidate host frame of the candidate host frames, and generating host time defining data including identifications and the candidate scores of the candidate host frames, where the candidate score indicates a degree of transition of the target digital content item at the candidate host frame. One or more candidate host frames are then selected based on the candidate scores for inserting one or more source digital content items into the target digital content item.

20 Claims, 22 Drawing Sheets

(51) Int. Cl.
| | |
|---|---|
| *G11B 27/30* | (2006.01) |
| *G11B 27/34* | (2006.01) |
| *G06K 9/00* | (2006.01) |
| *G10L 17/00* | (2013.01) |
| *H04N 21/81* | (2011.01) |
| *H04N 21/234* | (2011.01) |
| *G10L 25/30* | (2013.01) |
| *H04N 21/233* | (2011.01) |
| *G10L 15/18* | (2013.01) |
| *G10L 25/78* | (2013.01) |
| *G10L 25/24* | (2013.01) |
| *G10L 25/21* | (2013.01) |
| *G10L 25/09* | (2013.01) |
| *G10L 21/007* | (2013.01) |

(52) U.S. Cl.
CPC ........ *G06K 9/00765* (2013.01); *G10L 17/005* (2013.01); *G10L 25/30* (2013.01); *G11B 27/3081* (2013.01); *G11B 27/34* (2013.01); *H04N 21/23418* (2013.01); *H04N 21/23424* (2013.01); *H04N 21/812* (2013.01); *G10L 15/1822* (2013.01); *G10L 21/007* (2013.01); *G10L 25/09* (2013.01); *G10L 25/21* (2013.01); *G10L 25/24* (2013.01); *G10L 25/78* (2013.01); *H04N 21/233* (2013.01)

(58) Field of Classification Search
USPC ................ 386/278, 281, 290, 326, 239, 241
See application file for complete search history.

(56) References Cited

OTHER PUBLICATIONS

Viola, Paula, "Rapid Object Detection Using A Boosted Cascade of Simple Features", Proceedings of the 2001 IEEE Computer Society Conference on Computer Vision and Patent Recognition, Dec. 2001, 9 pages.
Mikolajczyk, Krystian, et al. "A Performance Evaluation of Local Descriptors", IEEE Transactions on Pattern Analysis and Machine Intelligence, vol. 27, Issue 10, Oct. 2005, 34 pages.
Dalal, Navneet, et al., "Histograms of Oriented Gradients for Human Detection", International Conference on Computer vision, Jun. 2005, 8 pages.
Rublee Ethan, et al., "ORB: An Efficient Alternative to SIFT or SURF", 2011 International Conference on Computer Vision, Nov. 2011, 8 pages.
Canny, John, "A Computational Approach to Edge Detection", IEEE Transactions on Pattern Analysis and Machine Intelligence, vol. PAMI-8, No. 6, Nov. 1986, 20 pages.
Deriche, Rachid, "Using Canny's Criteria to Derive a Recursively Implemented Optimal Edge Detector", International Journal of Computer Vision, 1987, 21 pages.
Roberts, Lawrence Gilman, "Machine Perception of Three-Dimensional Solids", Department of Electrical Engineering , 1963, 81 pages.
Harris, Chris, et al., "A Combined Corner and Edge Detector", Plessey Research, 1988, 5 pages.
Shi, Jianbo, et al. "Good Features to Track", National Science Foundation, Dec. 1993, 32 pages.
Wang, Han et al, "6-2 Gray Level Corner Detection", IAPR Workshop on Machine Vision Applications, Nov. 1998, 4 pages.
Linderberg, Tony, et al. "Shape-Adapted Smoothing in Estimation of 3-D Depth Cues from Affine Distortions of Local 2-D Brightness Structure", CVAP Dept of Numerical Analysis and Computing Science, Jan. 1997, 12 pages.
Smith, Stephen M., et al. "Susan—A New Approach to Low Level Image Processing" International Journal of Computer Vision, vol. 23, Issue 1, May 1997, 59 pages.
Rosten, Edward, et al., "Machine Learning for High-Speed Corner Detection", European Conference on Computer Vision, 2006, 14 pages.
Lindenberg, Tony, "Image Matching Using Generalized Scale-Space Interest Points", Journal of Mathematical Imaging Vision, vol. 52, Issue 1, May 2015, 17 pages.
Matas, J, et al., "Robust Wide Baseline Stereo From Maximally Stable Extremal Regions", Image and Vision Computing, vol. 22, Issue 10, Sep. 2004. 10 pages.
Deng, Hongli, et al., "Principal Curvature-Based Region Detector for Object Recognition" IEEE Conference on Computer Vision and Pattern Recognition, Jun. 2007, 8 pages.
Duda, Richard O., "Use of the Hough Transformation to Detect Lines and Curves in Pictures", Graphics and Image Processing, 1972, 5 pages.
Knutsson, Hans, "Representing Local Structure Using Tensors", Scandinavian Conference on Image Analysis, 2011, 8 pages.
Mikolajczyk, Krystian, et al., "A Comparison of Affine Region Detectors", International Journal Computer, 2006 30 pages.
Mikolajczyk, Krystian, et al., "An Affine Invariant Interest Point Detector", 7th European Conference on Computer Vision (ECCV '02), May 2002, 15 pages.
Zitnick, Lawrence, C. et al. "Consistent Segmentation for Optical Flow Estimation", Proceedings of the Tenth IEEE International Conference on Computer Vision, vol. 2, Oct. 2005 8 pages.
Linderberg, Tony, et al., "Segmentation and Classification of Edges Using Minimum Description Length Approximation and Complementary Junction", Journal Computer vision and Image Understanding, vol. 67, Issue 1, Jul. 1997, 21 pages.
Panwar, Preeti, et al., "Image Segmentation Using K-Means Clustering and Thresholding", International Research Journal of Engineering and Technology, vol. 3, Issue 5, May 2016, 7 pages.

\* cited by examiner

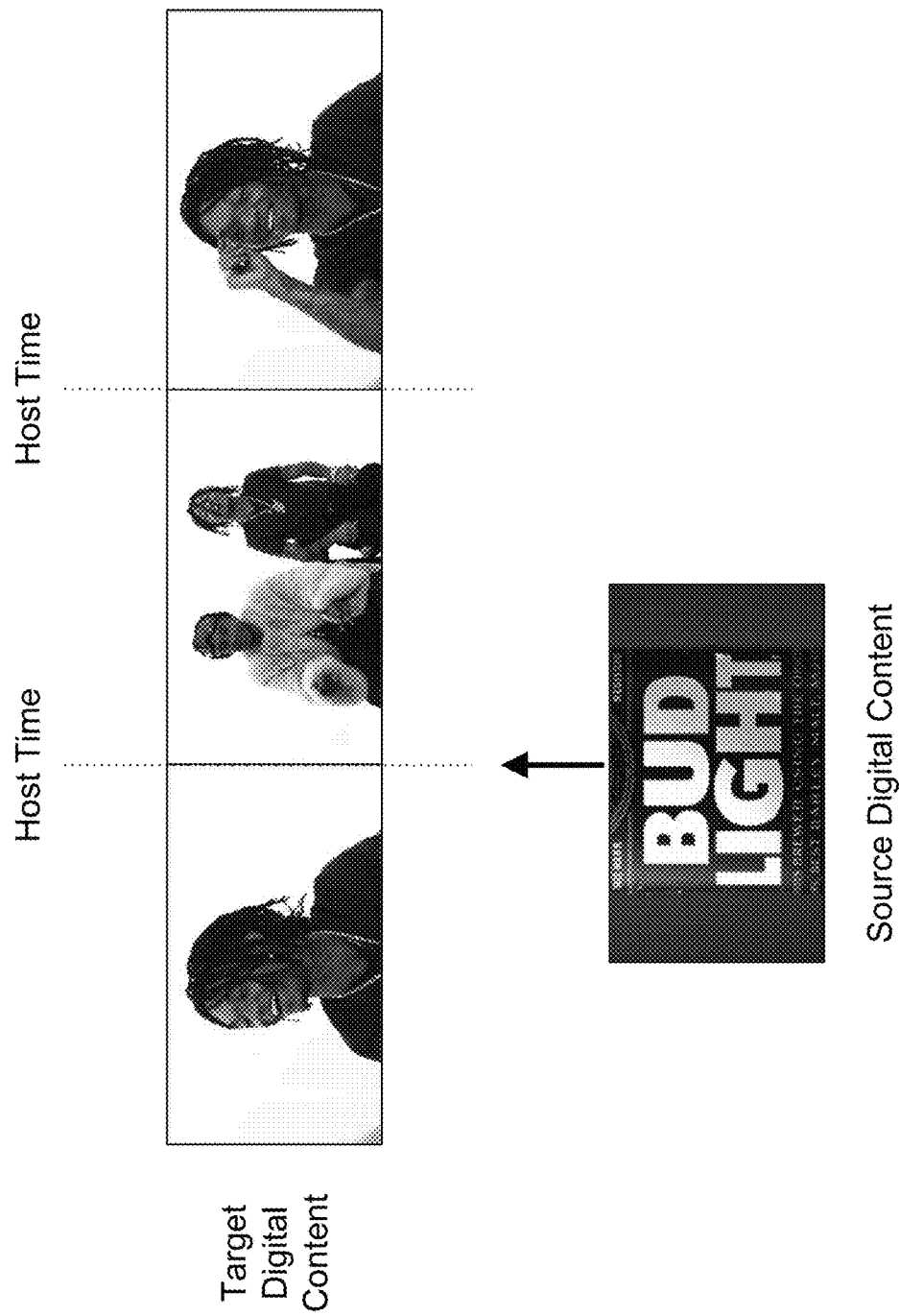

APPARATUS, SYSTEMS, AND METHODS FOR INTEGRATING DIGITAL MEDIA CONTENT

CROSS REFERENCE TO RELATED APPLICATIONS

The present application claims the benefit of and priority to U.S. Provisional Patent Application No. 62/538,155, filed on Jul. 28, 2017, entitled "Apparatus, Systems, And Methods For Integrating Digital Media Content Into Other Digital Media Content," the disclosure of which is herein incorporated by reference in its entirety for all purposes.

TECHNICAL FIELD

Techniques disclosed herein relate generally to editing digital media content. More specifically, this application relates to integrating source digital content items into a target digital content item at appropriate time points so as to minimize the impact on user experience of viewing the integrated digital content.

BACKGROUND

Digital media content, such as videos and audio recordings, generally includes media content that lasts a period of time when being played. For example, a video may include a sequence of ordered image frames that can be played at a certain frame rate (e.g., 30 frames per second) and an audio recording (e.g., an audio track) that may be played simultaneously with the image frames. In many circumstances, it is desirable to edit the digital media content, such as inserting, removing, or reordering certain content. For example, in video or audio broadcasting, commercial content (e.g., advertisements) or informational messages (e.g., traffic information or breaking news) are sometimes inserted into the video or audio content before the content is played or on the fly while the content is being played. Modifying the digital media content at some time points (e.g., near the start) in the digital media content may adversely affect the user experience.

SUMMARY

Embodiments of the present disclosure involve editing digital media content, such as inserting source media content into target media content, or removing or reordering certain portions of the target media content, at appropriate time points to minimize the impact on user experience of consuming the edited digital media content. According to certain embodiments, a computer-implemented method includes receiving a target digital content item that includes a plurality of frames, identifying a set of candidate host frames for inserting source digital content items from the plurality of frames based on one or more attributes of the target digital content item, determining a candidate score for each respective candidate host frame of the candidate host frames, where the candidate score indicates a degree of transition of the target digital content item at the candidate host frame, and generating host time defining data including identifications and the candidate scores of the candidate host frames. In some embodiments, the method also includes ranking the candidate host frames identified in the host time defining data based on their respective candidate scores in the host time defining data, selecting one or more candidate host frames based on the ranking for inserting one or more source digital content items into the target digital content item, and inserting the one or more source digital content items into the target digital content item at the one or more candidate host frames.

In some embodiments, an apparatus includes a processor configured to run a computer program stored in memory. The computer program is operable to cause the processor to receive one or more instances of source digital content, a target digital content item, and host time defining data associated with the target digital content item, where the host time defining data identifies one or more host times within the target digital content item when the source digital content may be integrated or inserted into the target digital content item. The computer program is also operable to cause the processor to integrate, interleave, or insert one or more of the instances of the source digital content into the target digital content item at certain host times identified in the host time defining data.

In some embodiments, a computer-implemented method includes receiving one or more instances of source digital content, a target digital content item, and host time defining data associated with the target digital content item, where the host time defining data identifies one or more host times within the target digital content item when the source digital content may be integrated or inserted into the target digital content item. The computer-implemented method also includes integrating, interleaving, or inserting the source digital content into the target digital content item at certain host times within the target digital content item identified by the host time defining data.

In some embodiments, a non-transitory computer-readable medium stores executable instructions. The executable instructions, when executed by a processor, cause the processor to receive one or more instances of source digital content, a target digital content item, and host time defining data associated with the target digital content item, where the host time defining data identifies one or more host times within the target digital content item when the source digital content may be integrated or inserted into the target digital content item. The executable instructions can also cause the processor to integrate, interleave, or insert the source digital content into the target digital content item at certain host times within the target digital content item identified by the host time defining data.

In some embodiments, the computer program in the apparatus and/or the executable instructions in the non-transitory computer readable medium are operable to cause the processor to detect or predict the host times within the target digital content item. In some embodiments, the computer-implemented method further includes detecting or predicting the host times within the target digital content item.

In some embodiments, the computer program in the apparatus and/or the executable instructions in the non-transitory computer-readable medium are operable to cause the processor to detect or predict the host times from the target digital content item by searching audio and visual data in the target digital content item for indications of transitions or breaks between the scenes or stories in the target digital content item. In some embodiments, the computer-implemented method further includes detecting or predicting the host times in the target digital content item by searching the audio and visual data in the target digital content item for indications of transitions or breaks between the scenes or stories in the target digital content item.

In some embodiments, the computer program in the apparatus and/or the executable instructions in the non-transitory computer-readable medium are operable to cause the processor to use a neural network to accept audio and visual data from portions of the target digital content item as an input and to classify the input as either a positive or negative example of a transition or break between the scenes or stories in the target digital content item comprises or a positive or negative example of a sequence that leads up to a transition or break between the scenes or stories in the target digital content item. In some embodiments, the computer-implemented method further includes using a neural network to accept audio and visual data from portions of the target digital content item as an input and to classify the input as either a positive or negative example of a transition or break between the scenes or stories in the target digital content item, or a positive or negative example of a sequence that leads up to a transition or break between the scenes or stories in the target digital content item.

In some embodiments, the computer program in the apparatus and/or the executable instructions in the non-transitory computer-readable medium are operable to cause a processor to detect or predict the host time from the target digital content item based on one or more of: (1) the detection or prediction of pairs or sequences of frames or other successive components of the target digital content's visual data whose pixel values, recognized objects, or other attributes vary or alter in such a way as to indicate that there has been or will be a transition in the scenes or stories in the target digital content item; (2) the detection or prediction of pairs or sequences of frames or other successive components of the target digital content's visual data whose pixel values or other attributes mark a transition in the scenes or stories in the target digital content item; (3) the detection or prediction of points in the target digital content's audio data where the attributes vary in such a way as to indicate that there has been or will be a transition in the scenes or stories in the target digital content item; (4) the detection or prediction of language or symbols in the target digital content's visual data, which indicate that there has been or will be a transition in the scenes or stories in the target digital content item; (5) the detection or prediction of language in the target digital content's audio data, which indicates that there has been or will be a transition in the scenes or stories in the target digital content item; (6) metadata associated with the target digital content item, such as genre or audio transcripts; and (7) combination methods including, but not limited to, machine learning models including neural network-based approaches that use models trained on attributes (e.g., audio data, visual data, metadata, or combinations thereof) from positive and negative examples of target digital content that embody or precede a transition in the scenes or stories in the target digital content item.

In some embodiments, the computer program in the apparatus and/or the executable instructions in the non-transitory computer-readable medium are operable to cause the processor to parse the visual data of the target digital content item comprising a plurality of frames into a plurality of scenes, where each scene comprises one or more interrelated frames in the target digital content item. In some embodiments, the computer-implemented method further includes parsing the visual data of the target digital content item comprising a plurality of frames into a plurality of scenes, where each scene comprises one or more interrelated frames in the target digital content item.

In some embodiments, the computer program in the apparatus and/or the executable instructions in the non-transitory computer-readable medium are operable to cause the processor to group the plurality of scenes into a first set of scenes and a second set of scenes, where the first set of scenes comprises scenes whose camera motion has a translation less than a pre-determined percentage of a height or a width of a frame, and the second set of scenes comprises scenes whose camera motion has a translation greater than the pre-determined percentage of the height or the width of the frame. In some embodiments, the computer-implemented method further includes grouping the plurality of scenes into a first set of scenes and a second set of scenes, wherein the first set of scenes comprises scenes whose camera motion has a translation less than a pre-determined percentage of a height or a width of a frame, and the second set of scenes comprises scenes whose camera motion has a translation greater than the pre-determined percentage of the height or the width of the frame.

In some embodiments, the computer program in the apparatus and/or the executable instructions in the non-transitory computer-readable medium are operable to cause the processor to group the plurality of scenes into a first set of scenes and a second set of scenes, where the first set of scenes comprises scenes whose camera motion has a rotation less than a pre-determined value in degrees, and the second set of scenes comprises scenes whose camera motion has a rotation greater than the pre-determined value in degrees. In some embodiments, the computer-implemented method further includes grouping the plurality of scenes into a first set of scenes and a second set of scenes, where the first set of scenes comprises scenes whose camera motion has a rotation less than a pre-determined value in degrees, and the second set of scenes comprises scenes whose camera motion has a rotation greater than the pre-determined value in degrees.

In some embodiments, the computer program in the apparatus and/or the executable instructions in the non-transitory computer-readable medium are operable to cause the processor to detect host times or candidate host times (or determine the quality thereof) by examining the frames comprising the visual aspect of the target digital content for pairs or sequences of frames whose pixel values display a sufficient variation (as compared to a pre-set threshold) across or between the frames to suggest a transition or break between the scenes or stories in the target digital content item. In some embodiments, the computer-implemented method further includes detecting the host times or candidate host times (or determine the quality thereof) by examining the frames comprising the visual aspect of the target digital content for pairs or sequences of frames whose pixel values display sufficient variation (as compared to a pre-set threshold) across or between the frames to suggest a transition or break between the scenes or stories in the target digital content item.

In some embodiments, the computer program in the apparatus and/or the executable instructions in the non-transitory computer-readable medium are operable to cause the processor to detect host times or candidate host times (or determine the quality thereof) by examining the frames comprising the visual aspect of the target digital content for pairs or sequences of frames whose pixel values display sufficient variation (as compared to an adaptive threshold based on the variance in pixel values for frames in an interval between the frame being examined and the frame representing the start of the interval, such as a scene) across or between the frames to suggest a transition or break between the scenes or stories in the target digital content item. In some embodiments, the computer-implemented method further includes detecting the host times by examining the frames comprising the visual aspect of the digital content for pairs or sequences of frames whose pixel values display sufficient variation (as compared to an adaptive threshold based on the variance in pixel values for frames in an interval between the frame being examined and the frame representing the start of the interval, such as a scene) across or between the frames to suggest a transition or break between the scenes or stories in the target digital content item.

In some embodiments, the computer program in the apparatus and/or the executable instructions in the non-transitory computer-readable medium are operable to cause the processor to detect host times or candidate host times (or determine the quality thereof) by examining the frames comprising the visual aspect of the target digital content for pairs or sequences of frames whose pixel values are within a pre-set threshold of the pixel values representing the color black or the color white and thus represent a fade-out, fade-in, or fade-out/fade-in sequence, and hence a transition in the story in the target digital content item. In some embodiments, the computer-implemented method further includes detecting a host time by examining the frames comprising the visual aspect of the digital content for pairs or sequences of frames whose pixel values are within a pre-set threshold of the pixel values representing the color black or the color white and thus represent a fade-out, fade-in, or fade-out/fade-in sequence, and hence a transition in the story in the target digital content item.

In some embodiments, the computer program in the apparatus and/or the executable instructions in the non-transitory computer-readable medium are operable to cause the processor to detect host times or candidate host times (or determine the quality thereof) by using a combination of one or more of the following approaches to analyze the visual aspect of the target digital content: (1) using a pre-set threshold to examine the frames comprising the visual aspect of the target digital content for pairs or sequences of frames whose pixel values represent a sufficient change to indicate a transition in scenes or stories in target digital content item; (2) using an adaptive threshold to examine the frames comprising the visual aspect of the digital content for pairs or sequences of frames whose pixel values represent a sufficient change to indicate a transition in scenes or stories in the target digital content item; and (3) searching the target digital content item for fade-out, fade-in, or fade-out/fade-in sequences, where each of these methods acts as a filter for others methods or each is used to determine an aggregate candidate score. In some embodiments, the computer-implemented method further includes detecting a host time by using a combination of one or more of the following approaches: (1) using a pre-set threshold to examine the frames comprising the visual aspect of the target digital content for pairs or sequences of frames whose pixel values represent a sufficient change to indicate a transition in scenes or stories in the target digital content item; (2) using an adaptive threshold to examine the frames comprising the visual aspect of the digital content for pairs or sequences of frames whose pixel values represent a sufficient change to indicate a transition in scenes or stories in the target digital content item; (3) searching the target digital content item for fade-out, fade-in, or fade-out/fade-in sequences, where each of these methods can act as a filter for other methods or each is used to determine an aggregate candidate score.

In some embodiments, the computer program in the apparatus and/or the executable instructions in the non-transitory computer-readable medium are operable to cause the processor to detect host times or candidate host times (or determine the quality thereof) by searching the visual aspect of the target digital content for representations of words or letters using, for example, OCR, converting those words or letters to text, and then searching in the text for representations of words, punctuations (e.g., periods), or capitalizations that indicate a transition in the story in the target digital content item. In some embodiments, the computer-implemented method further includes detecting host times by searching the visual aspect of the target digital content for representations of words or letters using, for example, OCR, converting those words or letters to text, and then searching the text or predicting in the text representations of words, punctuations (e.g., periods), or capitalizations that indicate a transition in the story in the target digital content item.

In some embodiments, the computer program in the apparatus and/or the executable instructions in the non-transitory computer-readable medium are operable to cause the processor to detect host times or candidate host times (or determine the quality thereof) by searching the visual aspect of the target digital content for representations of objects, people, textures, materials, shapes, locations, and activities by, for example, using various object recognition techniques, and then identifying points in the target digital content item where there is a transition between the objects, people, textures, materials, shapes, locations, and activities displayed as points marking a transition in the story in the target digital content item. In some embodiments, the computer-implemented method further includes detecting the host times by searching the visual aspect of the target digital content for representations of objects, people, textures, materials, shapes, locations, and activities using, for example, various object recognition techniques, and then identifying points in the target digital content item where there is a transition between the objects, people, textures, materials, shapes, locations, and activities displayed as points marking a transition in the story in the target digital content item.

In some embodiments, the computer program in the apparatus and/or the executable instructions in the non-transitory computer-readable medium are operable to cause the processor to detect host times or candidate host times (or determine the quality thereof) by training one or more neural networks on instances of digital content and deriving models that can, given new segments of the target digital content item, output a "content vector" (e.g., a composite of features vectors that represent the output of the second-to-last layer of each neural network model), and using the neural network model to generate content vectors for segments of the target digital content item. For segments of the target digital content item having sufficiently different content vectors, it is assumed that there has been a transition in the story in the target digital content item, and thus, there is a host time or candidate host time between the segments. In some embodiments, the computer-implemented method further includes detecting the host time by training one or more neural networks on instances of digital content and deriving models that can, given new segments of target digital content item, output a "content vector" (e.g., a composite of features vectors that represent the output of the second-to-last layer of each neural network model), and using the neural network model to generate content vectors for segments of the target digital content item. For segments of the target digital content item having sufficiently different content vectors, it is assumed that there has been a transition in the story in the target digital content item, and thus, there is a host time or candidate host time between the segments.

In some embodiments, the computer program in the apparatus and/or the executable instructions in the non-transitory computer readable-medium are operable to cause the processor to detect host times or candidate host times (or determine the quality thereof) by examining elements or frames comprising the audio aspect of the target digital content for pairs or sequences of frames whose attributes display a sufficient variation (as compared to a pre-set threshold) across or between the elements or frames to suggest transitions or breaks between the scenes or stories in the target digital content item. In some embodiments, the computer-implemented method further includes detecting the host times or candidate host times (or determine the quality thereof) by examining the frames comprising the audio aspect of the target digital content for pairs or sequences of frames whose attributes display a sufficient variation (as compared to a pre-set threshold) across or between the elements or frames to suggest transitions or breaks between the scenes or stories in the target digital content item.

In some embodiments, the computer program in the apparatus and/or the executable instructions in the non-transitory computer-readable medium are operable to cause the processor to detect host times or candidate host times (or determine the quality thereof) by examining the frames comprising the audio aspect of the target digital content for pairs or sequences of elements or frames whose attributes display a sufficient variation (as compared to an adaptive threshold that uses the variance in attributes for elements or frames in an interval between the element or frame being examined and the element or frame representing the start of the current interval, e.g., a scene) to suggest transitions or breaks between the scenes or stories in the target digital content item. In some embodiments, the computer-implemented method further includes detecting the host times or candidate host times (or determine the quality thereof) by examining the elements or frames comprising the audio aspect of the target digital content for pairs or sequences of elements or frames whose attributes display a sufficient variation (as compared to an adaptive threshold that uses the variance in attributes for elements or frames in an interval between the element or frame being examined and the element or frame representing the start of the interval of content, e.g., a scene) to suggest transitions or breaks between the scenes or stories in the target digital content item.

In some embodiments, the computer program in the apparatus and/or the executable instructions in the non-transitory computer readable-medium are operable to cause the processor to detect host times or candidate host times (or determine the quality thereof) by classifying the elements or frames, or segments thereof, comprising the audio aspect of the target digital content according to the types of sound they represent, such as human speech, music, or silence, and searching for successive pairs or sequences of elements or frames that are classified differently and thus indicate that there has been a transition in the story in the target digital content item. In some embodiments, the computer-implemented method further includes detecting the host times by classifying the elements or frames, or segments thereof, comprising the audio aspect of the target digital content according to the types of sound they represent, such as human speech, music, or silence, and searching for successive pairs or sequences of elements or frames that are classified differently, and thus indicate that there has been a transition in the story in the target digital content item.

In some embodiments, the computer program in the apparatus and/or the executable instructions in the non-transitory computer-readable medium are operable to cause the processor to detect host times or candidate host times (or determine the quality thereof) by classifying the elements or frames, or segments thereof, comprising the audio aspect of the digital content according to the types of sound they represent, such as human speech, music, or silence, identifying whether those segments that have been classified as human speech are spoken by the same speaker, and searching for successive pairs or sequences of elements or frames that are spoken by different speakers, which indicates that there has been a transition in the story in the target digital content item. In some embodiments, the computer-implemented method further includes detecting the host times by classifying the elements or frames, or segments thereof, comprising the audio aspect of the target digital content according to the types of sound they represent, such as human speech, music, or silence, identifying whether those segments that have been classified as human speech are spoken by the same speaker, and searching for successive pairs or sequences of elements or frames that are spoken by different speakers, which indicates that there has been a transition in the story in the target digital content item.

In some embodiments, the computer program in the apparatus and/or the executable instructions in the non-transitory computer-readable medium are operable to cause the processor to detect host times or candidate host times (or determine the quality thereof) by classifying or scoring the elements or frames, or segments thereof, comprising the audio aspect of the digital content according to their emotional classifications (e.g., levels of valence or arousal), and searching for successive pairs or sequences of elements or frames that have different classifications or sufficiently different scores, which indicates that there has been a transition in the story in the target digital content item. In some embodiments, the computer-implemented method further includes detecting the host time by classifying or scoring the elements or frames, or segments thereof, comprising the audio aspect of the target digital content according to their emotional classifications (e.g., levels of valence or arousal), and searching for successive pairs or sequences of elements or frames that have different classifications or sufficiently different scores, which indicates that there has been a transition in the story in the target digital content item.

In some embodiments, the computer program in the apparatus and/or the executable instructions in the non-transitory computer-readable medium are operable to cause the processor to detect host times or candidate host times (or determine the quality thereof) by examining the audio data of the target digital content, converting the audio data to text using speech recognition techniques, and then using natural language processing (NLP) techniques to identify or predict portions of the text (e.g. punctuations or the end of sentences) that indicate that there has been a transition in the story in the target digital content item. In some embodiments, the compute-implemented method further includes detecting the host time by examining the audio data of the target digital content, converting the audio data to text using speech recognition techniques, and then using NLP to identify or predict portions of the text (e.g. punctuations or the end of sentences) that indicate that there has been a transition in the story in the target digital content item.

In some embodiments, the computer program in the apparatus and/or the executable instructions in the non-transitory computer-readable medium are operable to cause the processor to detect host times or candidate host times (or determine the quality thereof) by examining the metadata associated with the target digital content item, searching for points in the target digital content item where the metadata (such as a transcript or metadata about commercial breaks) suggests that there is a transition in the story in the target digital content item. For example, scene breaks or scene headings in a transcript may mark new scenes, or metadata about commercial break times may mark pauses in the target digital content item where source digital content might be integrated, interleaved, or inserted unobtrusively. In some embodiments, the computer-implemented method further includes examining the metadata associated with the target digital content item, searching for points in the target digital content item where the metadata (such as a transcript or metadata about commercial breaks) suggests that there is a transition in the story in the target digital content item. For example, scene breaks or scene headings in a transcript may mark new scenes, or metadata about commercial break times may mark pauses in the target digital content item where source digital content might be integrated, interleaved, or inserted unobtrusively.

In some embodiments, the computer program in the apparatus and/or the executable instructions in the non-transitory computer-readable medium are operable to cause the processor to detect a host time by examining one or more of the following: the audio aspect of the target digital content, the visual aspect of the target digital content, and the metadata aspect of the target digital content. Specifically, it is configured to search those sources of data for segments of the target digital content item that indicate a transition in the story in the target digital content item. In some embodiments, the computer-implemented method further includes examining one or more of the following: the audio aspect of the target digital content, the visual aspect of the target digital content, and the metadata aspect of the target digital content item. Specifically, it is configured to search those sources of data for segments of the target digital content item that indicate a transition in the story in the target digital content item.

In some embodiments, the computer program in the apparatus and/or the executable instructions in the non-transitory computer-readable medium are operable to cause the processor to detect a host time by first looking into the visual aspect of the target digital content to identify segments of the target digital content item whose differences or changes in the visual data suggest that there is a transition in the story in the target digital content item, then passing the resultant list of candidate host times to a part of the process that examines the audio aspect of the target digital content to estimate whether the audio data on both sides of those candidate host times is similar in terms of the type of audio (speech, music, or silence), speaker (if speech), and emotional classification, and keeping the candidate host times that have sufficiently different audio data on both sides as host times or candidate host times (or increasing their candidate score). In some embodiments, the computer-implemented method further includes first looking into the visual aspect of the target digital content to identify segments of the target digital content item whose differences or changes in the visual data suggest that there is a transition in the story in the target digital content item, passing the resultant list of candidate host times to a part of the process that examines the audio aspect of the target digital content to estimate whether the audio data on both sides of the candidate host times is similar in terms of the type of audio (speech, music, or silence), speaker (if speech), and emotional classification, and keeping the candidate host times that have sufficiently different audio data on both sides as host times or candidate host times (or increasing their candidate score).

In some embodiments, the computer program in the apparatus and/or the executable instructions in the non-transitory computer-readable medium are operable to cause the processor to detect a host time by using a machine learning classifier model, such as a neural network model that has been trained on some combinations of audio and visual features, and to use the predictions of that machine learning classifier model or neural network model to identify segments of the target digital content item for which the predicted qualities are sufficiently different to suggest that there is a transition in the story in the target digital content item, passing the resultant list of candidate host times to a part of the process that examines the audio aspect of the target digital content to estimate whether the audio data on both sides of those candidate host times is similar in terms of the type of audio (speech, music, or silence), speaker (if speech), and emotional classification, and keeping the frames that have sufficiently different audio data on both sides as host times or candidate host times (or increasing their candidate score). In some embodiments, the computer implemented method further includes first looking into the visual aspect of the target digital content to identify segments of the target digital content item for which the predicted qualities using a neural network model or other machine learning-based model are sufficiently different to suggest that there is a transition in the story in the target digital content item, passing the resultant list of candidate host times to a part of the process that examines the audio aspect of the target digital content to estimate whether the audio data on both sides of these candidate host times is similar in terms of the type of audio (speech, music, or silence), speaker (if speech), and emotional classification, and keeping the frames that have sufficiently different audio data on both sides as host times or candidate host times (or increasing their candidate score).

In some embodiments, the computer program in the apparatus and/or the executable instructions in the non-transitory computer-readable medium are operable to cause the processor to detect a host time by using a machine learning classifier model, such as a neural network model, which has been trained on some combinations of audio and visual features, and to use the feature vectors (e.g., content vectors) predicted by the machine learning classifier model or neural network model to identify segments of the target digital content item for which the predicted content vectors are sufficiently different to suggest that there is a transition in the story in the target digital content item, passing the resultant list of candidate host times to a part of the process that examines the audio aspect of the target digital content to estimate whether the audio data on both sides of the candidate host times is similar in terms of the type of audio (speech, music, or silence), speaker (if speech), and emotional classification, and keeping the frames that have sufficiently different audio data on both sides as host times or candidate host times (or increasing their candidate score). In some embodiments, the computer-implemented method further includes first using a machine learning classifier model, such as a neural network model, which has been trained on some combinations of audio and visual features, and to use the feature vectors (e.g., the content vectors) predicted by the machine learning classifier model or neural network model to identify segments of the target digital content item for which the predicted content vectors are sufficiently different to suggest that there is a transition in the story in the target digital content item, passing the resultant list of candidate host times to a part of the process that examines the audio aspect of the target digital content to estimate whether the audio data on both sides of these candidate host times is similar in terms of the type of audio (speech, music, or silence), speaker (if speech), and emotional classification, and keeping the candidate host times that have sufficiently different audio data on both sides as host times or candidate host times (or increasing their candidate score).

In some embodiments, the computer program in the apparatus and/or the executable instructions in the non-transitory computer-readable medium are operable to cause the processor to integrate the source digital content into the target digital content item at host times in real-time using a web-browser. In some embodiments, the computer-implemented method further includes integrating the source digital content into the target digital content item at host times in real-time using a web-browser.

In some embodiments, the computer program in the apparatus and/or the executable instructions in the non-transitory computer-readable medium are operable to cause the processor to detect a host time by searching the visual aspect of the target digital content for "fade in" and "fade out" sequences, which often represent a transition in the scenes or the story in the target digital content item.

In some embodiments, the computer program in the apparatus and/or the executable instructions in the non-transitory computer-readable medium are operable to cause the processor to use a neural network model to detect a host time by ingesting the visual and/or audio features of portions of the target digital content item in order to predict whether those portions represent positive or negative examples of host times.

In some embodiments, the computer program in the apparatus and/or the executable instructions in the non-transitory computer-readable medium are operable to (1) remove a candidate host time from consideration (or reducing its candidate score) when the frames immediately before and immediately after the candidate host time are too visually similar, for example, as indicated by the difference between the pixel value (e.g. color) histogram of the frames immediately before and immediately after the candidate host time being less than a threshold; (2) remove a candidate host time from consideration (or reduce its candidate score) if any of the frames immediately after the next three candidate host times is too visually similar to the frame immediately after the candidate host time, as indicated by the difference between the pixel value (e.g. color) histogram of the frames being less than a threshold; (3) computer the mean motion vector for all frames between any two adjacent candidate host times using an optical flow method to track features across the frames, and, when the motion vectors for the scenes before and after a particular candidate host time are not sufficiently different (e.g., with a difference less than a threshold), removing that candidate host time from consideration (or reducing its candidate score).

Some embodiments of the disclosed subject matter include an apparatus. The apparatus includes a processor configured to run a computer program stored in memory. The computer program is operable to cause the processor to receive a target digital content item comprising a plurality of frames captured using an imaging device, detect or predict one or more candidate host times within the target digital content item, and create host time defining data associated with the target digital content item, where the host time defining data includes one or more locations or times for integrating, interleaving, or inserting source digital content into the target digital content item. In some embodiments, the host time defining data also includes a candidate score associated with each respective candidate host time.

Some embodiments of the disclosed subject matter include a computerized method performed by a processor in a computing system. The computerized method includes receiving a target digital content item comprising a plurality of frames captured using an imaging device, detecting or predicting one or more candidate host times within the target digital content item, and creating host time defining data associated with the target digital content item, where the host time defining data includes one or more locations or times for integrating, interleaving, or inserting source digital content into the target digital content item. In some embodiments, the host time defining data also includes a candidate score associated with each respective candidate host time.

Some embodiments of the disclosed subject matter include a non-transitory computer-readable medium storing executable instructions. The executable instructions are operable to cause a processor to receive a target digital content item comprising a plurality of frames captured using an imaging device, detect or predict one or more candidate host times within the target digital content item, and generate host time defining data associated with the target digital content item, where the host time defining data includes one or more locations or times for integrating, interleaving, or inserting source digital content into the target digital content item. In some embodiments, the host time defining data also includes a candidate score associated with each respective candidate host time.

In some embodiments, the computer program in the apparatus and/or the executable instructions in the non-transitory computer-readable medium are operable to cause a processor to retrieve a target digital content item and the host time defining data associated with the target digital content item, receive one or more instances of source digital content, and integrate, interleave, or insert the source digital content into host time(s) within the target digital content item identified by the host time defining data. In some embodiments, the computer-implemented method further includes retrieving the target digital content item and the host time defining data associated with the target digital content item, receiving one or more instances of source digital content, and integrating, interleaving, or inserting the source digital content into the host time(s) within the target digital content item identified by the host time defining data.

In some embodiments, the computer program in the apparatus and/or the executable instructions in the non-transitory computer-readable medium are operable to cause the processor to use a neural network to classify components of the target digital content item as positive or negative examples of candidate host times. In some embodiments, the computer-implemented method further includes using a neural network to classify components of the target digital content item as positive or negative examples of candidate host times.

In some embodiments, the computer program in the apparatus and/or the executable instructions in the non-transitory computer-readable medium are operable to cause the processor to determine a motion category for each scene within the target digital content item and to use the categorization to aid in the determination of candidate host times.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIGS. 4A-4C illustrate examples of a target digital content item, source digital content, and a digital content item integrated using an example of a content integration system in accordance with some embodiments.

DETAILED DESCRIPTION

Figure 1:
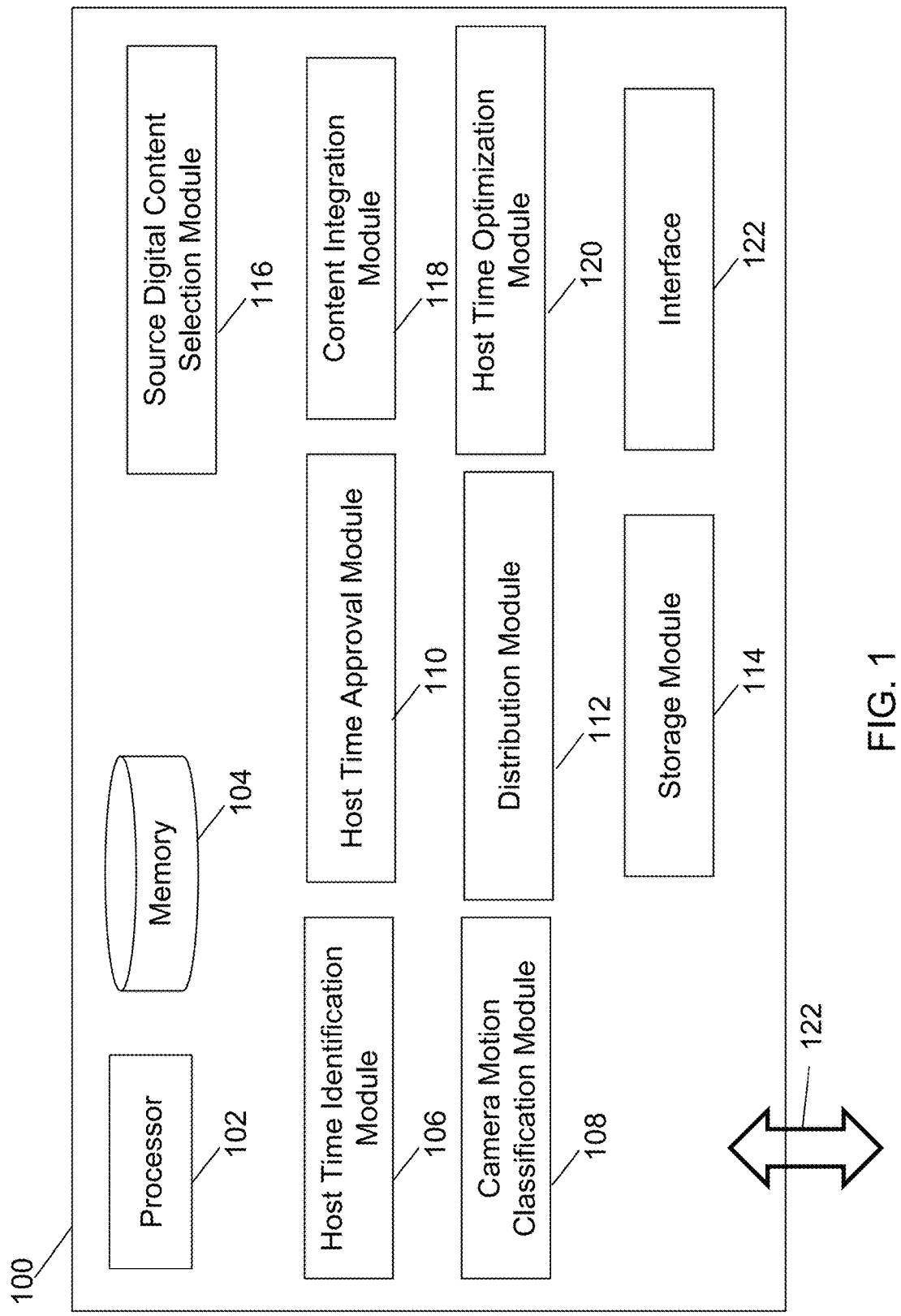
FIG. 1 illustrates an example of a content integration system in accordance with some embodiments.

Techniques disclosed herein involve editing digital media content, such as video or audio content. As explained above, in many circumstances, it is desirable to edit the digital media content, such as inserting commercial content (e.g., advertisements) or informational messages (e.g., traffic information or breaking news) into the video or audio content before the content is played or on the fly while the content is being played. However, modifying the digital media content at some time points in the digital media content may adversely affect the user experience. Certain embodiments described herein can address this problem by determining candidate host time points (e.g., represented by candidate host frames) associated with transitions or breaks in the scenes or stories in a target digital content item and determining candidate scores associated with the candidate host time points, such that some source digital content items can be inserted into the target digital content item at the transitions or breaks (host times) with highest candidate scores.

The following example is used to introduce certain embodiments in which a content integration system determines the candidate host times and the corresponding candidate scores based on one or more attributes of a target digital content item to be edited, such as one or more attributes of the visual content, audio content, and/or metadata of the target digital content item. In this example, host time defining data is generated based on the candidate host times and the corresponding candidate scores, and is associated with the target digital content item, such as saved as metadata of the target digital content item. The host time defining data associated with the target digital content item can then be used by the content integration system or a computer system of a user to select appropriate host times in the target digital content item for inserting source digital content so as to minimize the impact on user experience. For example, the candidate host times can be ranked based on their candidate scores, and one or more highest ranked candidate host times can be selected for inserting source digital content (e.g., advertisements) in advance or on the fly while the target digital content is viewed, based on specific user criteria or preferences.

Techniques disclosed herein enable the seamless and unobtrusive integration of digital content, such as advertisements or informational messages, at host times inside a target digital content item in an automated or semi-automated fashion, allowing for the efficient placement of the advertisements or other augmentations at a high throughput. Compared with existing techniques, techniques disclosed herein use a combination of various information or attributes of target digital media content (e.g., visual, audio, metadata, and text data) to determine and verify transitions and/or breaks in the target digital media content, and thus can more accurately determine the appropriate candidate host times or frames for inserting source digital content, or removing, reordering, or otherwise editing the target digital content item to minimize the impact on user experience with the edited target digital content item. Candidate scores for the identified candidate host times or frames are determined to indicate the degree of transition of the target digital content at the candidate host times or frames, and are saved in host time defining data associated with the target digital content item. Thus, a user can select a desired number of candidate host times from the identified candidate host times based on the candidate scores and specific user criteria or preferences. For example, for a same target digital content item (e.g., a video or audio file), different users (or a same user at different times or a service provider for different customers) may selected different numbers of candidate host times and/or different combinations of candidate host times for inserting source digital content. In addition, the host time defining data can be pre-determined for a target digital content item, and can be used by different users to select candidate host times in real-time for inserting source digital content.

As used herein, the term "digital content," "media content," or "digital media content" refers to content in any media format, including, but not limited to, audio recordings (whether streaming/live or in a file), audio books, audio tours, radio broadcasts, songs, podcasts, videos (whether streaming/live or in a file and whether two dimensional, three dimensional, 360 degrees, or spherical), animations, video games, graphics displays, augmented reality, mixed reality, and virtual reality content.

As used herein, the term "digital content item," "media content item," or "digital media content item" refers to a specific item including certain media content, such a particular video or an audio recording in the form of a stream or a file.

As used herein, the term "target digital content item" refers to a digital content item into which the digital content in other digital content items is inserted or added. The term "source digital content item" refers to a digital content item, the media content of which is inserted or added to another digital content item.

As used herein, the term "host time" or "host frame" refers to a specific time point or frame in a target digital content item at which source digital content can be inserted (hosted). The host time or host frame can include, for example, a timestamp (e.g., with respect to the beginning of the digital content item), a frame number, an audio element index number, or any other indicator that identifies a specific time instant or moment in the target digital content item.

As used herein, the term "host time defining data" or "host time date" refers to data including one or more host times, candidate host times, or times intervals in the form of one or more timestamps (representing particular points in a target digital content item), frame numbers, audio element index numbers, or any other data that defines one or more specific times or moments in the display of the target digital content item where source digital content may be integrated, interleaved, or inserted. The host time defining data can also include a score, ranking, or probability that indicates the likelihood that each host time, candidate host time, or time interval represents a transition or break, or indicate the relative attractiveness of each specific time or moment as a host time or candidate host time. In some embodiments, the host time defining data also includes metadata about the one or more host times, candidate host times, or time intervals, such as any visual or audio feature at or around each host time, candidate host time, or time interval. In some embodiments, the host time defining data also includes digital content transformation objects that can be used to transform or adjust the visual and/or audio content of the source digital content for more seamless integration of the source digital content into the target digital content item. In some embodiments, the host time defining data is in the form of a table, a list, an array, or any other data structure or object. In some embodiments, the host time defining data is in a lightweight data-interchange format, such as JavaScript Object Notation ("JSON") or Extensible Markup Language ("XML"). In some embodiments, the host time defining data is saved in the target digital content item as metadata or is separate from the target digital content item.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

I. Content Integration System

According to certain embodiments, a content integration system is disclosed. The content integration system is configured to retrieve one or more instances of source digital content, retrieve a target digital content item, identify one or more host times within the target digital content item for integrating, interleaving, or inserting the one or more instances of source digital content, and integrate the source digital content at the identified host time(s) within the target digital content item.

For example, the content integration system can retrieve a video advertisement, retrieve a video including one or more frames, identify a host time within the one or more frames for integrating the video advertisement, and integrate the video advertisement into the video at the identified host time. The content integration system can be configured to integrate the source digital content into a target digital content item in an aesthetically-pleasing, unobtrusive, engaging, and/or otherwise favorable manner. The content integration system can be can be used for many applications, such as advertising or enhanced expression, entertainment, information, or communication.

In some embodiments, the content integration system can be configured to identify one or more host times in the target digital content item where source digital content items can be placed. The host times satisfy certain predetermined criteria. The predetermined criteria can be determined such that integrating, interleaving, or inserting source digital content into the target digital content item at the host times enhances or at least would not detract a viewer or adversely affect the user's experience. The predetermined criteria can include, for example, a shift or change in visual data (e.g., pixel values), a shift or change in audio data (e.g., frequency values), a shift in the nature, speaker, or emotional character of that audio data, the existence of "fade-in" and "fade-out" sequences, new objects, people, textures, materials, shapes, locations, and activities appearing or disappearing from the content, or an indication, by a machine learning model or a neural network trained on past examples of preferable host times, that a portion of the target digital content item represents a positive example of host time or satisfies some prediction score for a host time or candidate host time.

In some embodiments, the content integration system includes a host time identification module configured to identify a host time or candidate host time based on one or more predetermined criteria. For example, the host time identification module can be configured to identify, as host times: (1) times that represent a shift or change in visual data, such as pixel values; (2) times that represent a shift or change in audio data, such as frequency values; (3) times that represent a shift in the nature, speaker, or emotional character of the audio data; (4) times that represent "fade-in" and "fade-out" sequences; (5) times where new objects, people, textures, materials, shapes, locations, and activities appear or disappear from the content; or (6) times which a machine learning model or neural network trained on past examples of preferable host times has predicted to represent a positive example of host time or satisfy some prediction score for a host time or candidate host time.

In some embodiments, the host time identification module can be configured to enable a user to approve, delete, or adjust a pre-identified host time within a target digital content item. For example, the host time identification module can be configured to receive a selection of host times for a given target digital content item identified or presented by a graphics tool. In some cases, the host time identification module can be configured to assist the selection of a host time within a target digital content item. For example, the content integration system can provide candidate host times from which a host time can be selected.

In some embodiments, the content integration system is configured to (1) parse a digital content item (e.g., a video) into scenes, (2) classify each scene based on the type and/or level of a camera motion corresponding to the scenes, and (3) use that data to enhance the identification of host times.

In some embodiments, the scene recognition module can be configured to automatically classify one or more scenes in the target digital content item according to their type or level of camera motion. For example, the scene recognition module can classify scenes lacking camera motion, scenes whose camera motion involves translation of no more than 20% of the height or width of the frame and rotation of no more than 5° ("minimal camera motion"), or scenes with the camera motion involving either a translation of more than 20% of the height or width of the frame or a rotation of more than 5° ("maximal camera motion"). Subsequently, the scene recognition module can provide the classification information to the host time identification module so that the host time identification module can detect one or more host times based on the classification information.

In some embodiments, the scene recognition module is configured to use a machine learning model trained on samples of target digital content labelled according to their types and/or levels of camera motion and scenes, in order to perform the classification of the type or level of camera motion in a given scene of the target digital content.

In some embodiments, the host time identification module is configured to identify or score host times through the use of a machine learning system. The host time identification module can include, for example, one or more machine learning-based classifiers, such as a convolutional neural network, support vector machine, or random forest classifier, that are configured to determine whether a portion of the target digital content item could be classified as a host time or candidate host time.

In some embodiments, the content integration system is configured to represent one or more host times using a predetermined data structure or an object. For example, the content integration system is configured to represent a host time or candidate host time using a time or frame number. When the content integration system has identified a host time or candidate host time, the content integration system adds the time or frame number associated the identified host time to the predetermined data structure that represents the identified host times.

In some embodiments, the content integration system is configured to determine a color palette of the host time in the target digital content item. Subsequently, the content integration system can use the color palette to transform (e.g., morph) the source digital content to have the same colors. Then the content integration system can integrate the transformed source digital content into the target digital content item.

In some embodiments, the content integration system is configured to recognize one or more objects in the target digital content and save the recognition result as a host time defining data. The host time defining data can indicate, for example, that a particular type of object has been recognized in the target digital content and, optionally, the location (e.g., coordinate) of the recognized object in the target digital content item. In some embodiments, the content integration system can also maintain an association between the host time defining data and the source digital content that can be placed upon the object associated with the host time defining data. For example, the host time defining data corresponding to a wall can be associated with source digital content corresponding to a company logo. In some cases, the content integration system is configured to maintain the association using a table and/or a database.

In some embodiments, the content integration system includes a source digital content selection module configured to select the source digital content. In some embodiments, the content integration system also includes a content integration module that is configured to integrate the source digital content into the target digital content item. In one example, the content integration module is configured to integrate the source digital content into the target digital content item by inserting the source digital content into the target digital content at a host time in the target digital content item. In another example, the content integration module is configured to integrate the source digital content into the target digital content item by interleaving the source digital content with the target digital content during a host time. In another example, the content integration module is configured to integrate the source digital content into the target digital content item by integrating source digital content items into the target digital content item during the host times.

In some embodiments, the source digital content selection module and the content integration module can operate in a real-time environment such as a real-time bidding environment for serving advertisements. For example, the source digital content selection module is configured to accept information about an incoming impression of the target digital content and to use that information, along with information about the host time, to accept bids from advertisers on the impression. The winning advertiser's advertisement (i.e., the source digital content) is then delivered to the content integration module, which may be the web browser of the viewer, where the advertisement is integrated, interleaved, or inserted into the target digital content item at the host times, with the entire process happening fast enough that the viewer's experience is not noticeably delayed or impacted.

In some embodiments, the content integration system is configured to recreate the volume level or sound profile of the target digital content in the source digital content prior or during the integration, interleaving, or insertion so as to make the experience of viewing the target digital content with the source digital content integrated, interleaved, or inserted into it more seamless for the viewer.

In some embodiments, the content integration system is configured to recreate the visual profile of the target digital content in the source digital content prior or during the integration, interleaving, or insertion so as to make the experience of viewing the target digital content with the source digital content integrated, interleaved, or inserted into it more seamless for the viewer.

The disclosed content integration system is configurable to provide a scalable computational mechanism to automatically and artfully enhance creativity, expression, or utility in target digital content. The content integration system can also be useful in advertising related applications. For example, the content integration system can provide a computational mechanism to place advertisements into a target digital content item in an unobtrusive, seamless manner.

The benefits of the disclosed content integration system include the seamless and unobtrusive integration of digital contents, such as advertisements or informational messages, at host times inside a target digital content item in an automated or semi-automated fashion and, potentially, in a standardized fashion. There is a great demand for less obtrusive ways to advertise or otherwise augment digital content (especially video), especially ones that can be done at a large scale or programmatically. The content integration system disclosed herein satisfies the demand by providing a method for integrating source digital content into a target digital content item in an unobtrusive way. Further, by removing most or all human involvement from the process and by standardizing the resulting advertisements or augmentations, the disclosed method allows for the placement of the advertisements or augmentations at a high scale and programmatically.

FIG. 1 illustrates an example of a content integration system 100 in accordance with some embodiments. In some embodiments, the content integration system 100 includes one or more processors 102, a memory device 104, a host time identification module 106, a camera motion classification module 108, a host time approval module 110, a distribution module 112, a storage module 114, a source digital content selection module 116, a content integration module 118, a host time optimization module 120, and an interface 122.

In some embodiments, the one or more processors 102 can execute machine executable instructions. The one or more processors 102 can be implemented in hardware using an application specific integrated circuit (ASIC), programmable logic array (PLA), digital signal processor (DSP), field programmable gate array (FPGA), or any other integrated circuit. The one or more processors 102 suitable for the execution of a computer program include, by way of example, both general and special purpose microprocessors, digital signal processors, and any one or more processors of any kind of digital computer. Generally, the one or more processors 102 receive instructions and data from a read-only memory or a random access memory or both.

In some embodiments, the memory device 104 includes one or more memory modules and can store instructions and/or data. The one or more memory modules in the memory device 104 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), and/or any other memory or combination of memories. The memory device 104 can be used to temporarily store data. The memory device 104 can also be used for long-term data storage. The one or more processors 102 and the memory device 104 can be supplemented by and/or incorporated into special purpose logic circuitry.

In some embodiments, the host time identification module 106 is configured to identify, in an automated fashion, the host times within a target digital content item. For example, the host time identification module 106 is configured to accept as input the target digital content in the target digital content item. Then, the host time identification module 106 is configured to, using various methods, automatically identify one or more host times inside the input content. To do so, it may use a number of different computerized approaches including, but not limited to, methods that inspect the visual, audio, and metadata aspects of the target digital content, and methods that employ machine learning-based or neural network-based predictive models. The host time identification module 106 is configured to output a list of times, timestamps, indices, frames names or other indicators of times or moments when source digital content can be integrated, interleaved, or inserted into the target digital content item.

In some embodiments, the camera motion classification module 108 is configured to classify, in an automated fashion, portions of the target digital content between the identified host times according to their levels of camera motion. For example, the camera motion classification module 108 is configured to accept as input the frames representing one or more scenes of the target digital content item between the host times identified by the host time identification module 106. The camera motion classification module 108 is configured to use a machine learning model trained on samples of content with different types and levels of camera motion in digital content to predict the type or level of camera motion in a given scene of the target digital content item. The camera motion classification module 108 can output the classification information to the host time identification module 106 to aid the identification of host times.

In some embodiments, the host time approval module 110 is configured to accept approval, rejections, or adjustments of the host times that have been identified by host time identification module 106. After these have been accepted, the host time approval module 110 may deliver the finalized list of host times to the distribution module 112 or the storage module 114.

In some embodiments, the distribution module 112 is configured to accept the source digital content as an input and, from thereon, to coordinate the communications between some or all of the various modules in the content integration system. For example, the distribution module 112 is configured to accept as input the target digital content and coordinate the communications between the host time identification module 106, the camera motion classification module 108, the host time approval module 110, the storage module 114, the source digital content selection module 116, the host time optimization module 120, the content integration module 118, and/or the interface 122.

For example, the distribution module 112 is configured to relay the target digital content to the host time identification module 106. After optionally coordinating the communications between the host time identification module 106, the camera motion classification module 108, and the host time approval module 110, the distribution module 112 can coordinate, by communicating with storage module 114, the storage of the resulting host time defining data, host time objects (e.g., one or more data structures or object specific to the host time), transformation objects, the target digital content, and/or metadata attached to the target digital content item, until such time that source digital content will be selected for placement at the host times, in which case the distribution module 112 may interact with the source digital content selection module 116. The metadata can include, for example, the duration of the target digital content, audio transcription and/or text, optical character recognition-derived text, creator/publisher (e.g., name of the creator/publisher), audience size, history of source digital content placements, past target digital content subject matter, preferred advertisers, display channel or platform (e.g., name of the display channel or platform), display size, current or predicted number of views or other indications of popularity, display device, subject matter, setting, and/or the objects, people, textures, materials, shapes, locations, and activities that it depicts. The storage may be local to the target digital content itself, or, in cases where the content integration module 118 is co-located with or belongs to a digital media or video hosting website or social network, may be in the source code for the digital content and/or web pages that the distribution module 112 delivers to users who request the target digital content and/or web pages. After the selection of source digital content by source digital content selection module 116, the distribution module 112 may organize the communications with the content integration module 118 and/or an interaction module, report back data on the interaction of the viewer and the integrated digital content to the host time optimization module 120, and, communicate the optimized host times back to the storage module 114 for storage.

In some embodiments, the storage module 114 is configured to store the host time defining data, transformation objects, host time objects, the target digital content item, and/or metadata about the target digital content item until such time that source digital content to be placed at the host times in the target digital content item is selected. The storage module 114 is configured to receive host time defining data, transformation objects, host time objects, the target digital content item, and/or metadata about the target digital content item from the distribution module 112 and/or the host time identification module 106, and store it until such time that a request for the target digital content item to be viewed is made. In response to such a request, the storage module 114 is configured to transmit to the content integration module 118 (e.g., via the distribution module 112) a message that includes the host time defining data, transformation objects, host time objects, the target digital content item, and/or the metadata about the target digital content item.

In some embodiments, the source digital content selection module 116 is configured to select the source digital content or receive the selection of the source digital content to be placed at the host time in the target digital content item. In some embodiments, the source digital content selection module 116 is configured to select or enable the selection of one or more instances of source digital content to be integrated, interleaved, or inserted at the host times in the target digital content, using methods including, but not limited to, receiving a selection message from a user, selection via buying, ordering, or bidding in a marketplace, and computerized or programmatic selection based on the host time defining data, host time objects, the target digital content item, and/or the metadata about the target digital content item. Source digital content selection module 116 is also configured to, after the selection is made, deliver a message containing the selected source digital content, data about the source digital content, or some other indications of the source digital content selection that has been made to either the distribution module 112 or the content integration module 118.

In some embodiments, the content integration module 118 is configured to integrate a source digital content item into the target digital content item at a host time in the target digital content item. The content integration module 118 is configured to accept as input the target digital content item, the source digital content, host time-defining data that defines the host times in the target digital content item, and/or transformation objects that define the transformations that can take place for the source digital content to seamlessly integrate with the target digital content item. Subsequently, the content integration module 118 can integrate, interleave, or insert the source digital content into the target digital content item. The content integration module 118 is configured to integrate the source digital content into the target digital content item using one or more assorted methods. For example, the content integration module 118 can be configured to create a new version of the target digital content based on the guidance provided by the host time-defining data that defines the host times in the target digital content item, and/or based on the transformation objects that define the transformations for the target digital content to seamlessly integrate with the target digital content at host times in the target digital content item. Alternatively, the content integration module 118 can be configured to interleave or alternate between the source digital content and the target digital content during the display of the target digital content to a viewer based on the guidance provided by the host time defining data that defines the host times in the target digital content item, and/or based on the transformation objects that define the transformations for the target digital content to seamlessly interleave with the target digital content at host times in the target digital content item. The content integration module 118 is also configured to capture data tracking the interactions of the viewer with the integrated content, including, but not limited to, the time that the viewer stops watching the integrated content or, if the content integration module 118 enables the viewer to click through, hover over, or otherwise interact with the content, data regarding such activities. The content integration module 118 can then report the tracking data to the distribution module 112, the host time optimization module 120, or the host time identification module 106 (so that it may improve its initial host time identification process).

In some embodiments, the host time optimization module 120 is configured to accept as input the data about user interactions with the resultant integrated content and then use the data to optimize the host times for that particular target digital content, such as removing, adding, or adjusting host times from the list of host times as needed. In some embodiments, the host time optimization module 120 is configured to accept as input the data about user interaction with the resultant integrated content and then use the data to improve its predictive models for identifying the host times in target digital content.

In some embodiments, the host time identification module 106, the camera motion classification module 108, the host time approval module 110, the distribution module 112, the storage module 114, the source digital content selection module 116, and/or the content integration module 118 can be implemented in software. The software can run on a processor 102 capable of executing computer instructions or computer code.

In other embodiments, the host time identification module 106, the camera motion classification module 108, the host time approval module 110, the distribution module 112, the storage module 114, the source digital content selection module 116, and/or the content integration module 118 can be implemented in digital electronic circuitry, or in computer hardware, firmware, software, or any combination thereof. The implementation can be as a computer program product (e.g., a computer program tangibly embodied in a machine-readable storage device) for execution by or to control the operation of a data processing apparatus, such as a programmable processor, a computer, and/or multiple computers. A computer program can be written in any form of computer or programming language, including source code, compiled code, interpreted code, and/or machine code. The computer program can be deployed in any form, including as a stand-alone program or as a subroutine, element, or other unit suitable for use in a computing environment. A computer program can be deployed to be executed on one computer or on multiple computers at one or more sites.

In some embodiments, two or more modules 106-120 can be implemented on the same integrated circuit, such as ASIC, PLA, DSP, or FPGA, thereby forming a system on chip. Subroutines can refer to portions of the computer program and/or the processor/special circuitry that implement one or more functions.

In some embodiments, the interface 122 is configured to provide communication between the content integration system 100 and other computing devices in a communications network. The interface 122 can be implemented in hardware to send and receive signals in a variety of media, such as optical, copper, and/or wireless interfaces, and in a number of different protocols, some of which may be non-transient.

The content integration system 100 can be operatively coupled to external equipment or to a communications network in order to receive instructions and/or data from the equipment or network and/or to transfer instructions and/or data to the equipment or network. Computer-readable storage devices suitable for embodying the computer program instructions and data include all forms of volatile and nonvolatile memory, including, by way of example, semiconductor memory devices (e.g., DRAM, SRAM, EPROM, EEPROM, and flash memory devices), magnetic disks (e.g., internal hard disks or removable disks), magneto-optical disks, and optical disks (e.g., CD, DVD, HD-DVD, and Blu-ray disks).

In some embodiments, the content integration system 100 can include user equipment. The user equipment can communicate with one or more radio access networks or with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system, such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, the content integration system 100 can include a server. The server can operate using operating system (OS) software. In some embodiments, the OS software is based on a Linux software kernel and runs specific applications in the server, such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

In some embodiments, the target digital content can be created at a target digital content source, and can be found in the procedure, function, thread, process, application, memory, cache, disk or other storage, database, computer, device, or network on which it was created, recorded, edited, handled, or stored.

In some embodiments, at any time during or after its creation or origination, the target digital content or its components are transferred, over the internet or any other network, from the target digital content source to the content integration system.

In some embodiments, the content integration system can maintain the target digital content in a memory device 104. For example, the content integration system can receive the target digital content over the interface from the target digital content source, and store the target digital content in the memory device 104.

In some embodiments, the content integration system 100 can maintain the target digital content in the distribution module 112 dedicated to hosting or serving digital content and including, but not limited to, digital content distribution websites, applications, or social media networks.

In some embodiments, at any time during or after its origination, the target digital content or its components are delivered to one or more procedures, functions, processes, threads, applications, memories, caches, disks or other storage, databases, computers, devices, or networks sitting in the network (e.g., host time identification module 106) dedicated to host time identification.

In some embodiments, the host time identification module 106 is co-located with the target digital content source. This allows for host time identification to occur up-front, such that later steps in the content integration process can be distributed or parallelized accordingly.

In some embodiments, the host time identification module 106 is not co-located with the target digital content source, but is the first point of contact of the target digital contact source, meaning that a target digital content item is transmitted directly from the target digital content source to the host time identification module 106, without intermediary modules. This allows for the host time identification to occur relatively early on specialized processes or equipment that are impractical to contain on target digital content sources (e.g., GPUs), such that later steps in the content integration process can be distributed or parallelized accordingly.

In some embodiments, where the host time identification module(s) 106 is not co-located with the target digital content source, the distribution module 112 (which is configured to accept the source digital content as an input and, from thereon, coordinate the communications between some or all of the various modules in the content integration system) controls the messages and the transmission of data between the host time identification module(s) 106 and the target digital content source.

Figure 2:
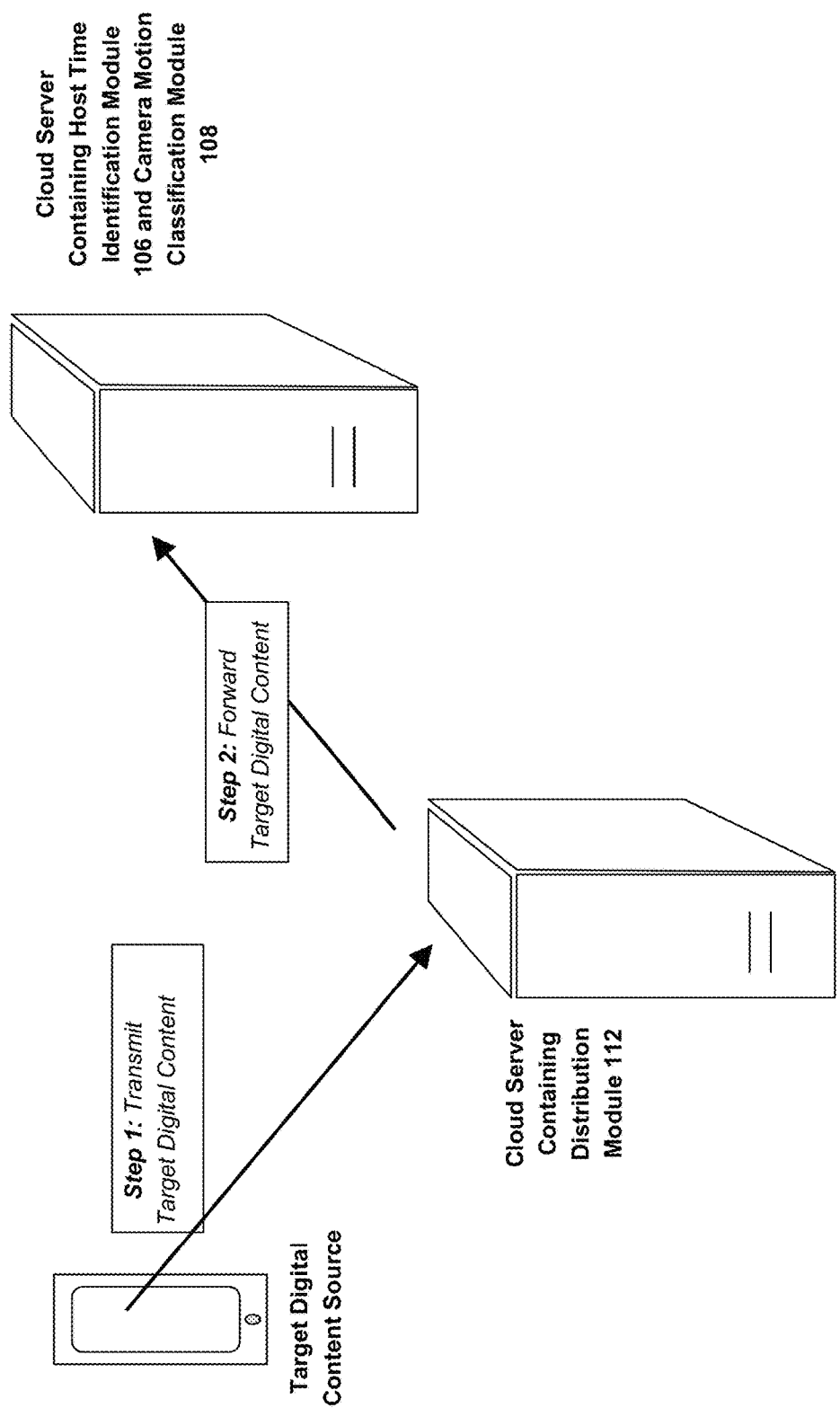
FIG. 2 illustrates an embodiment of a content integration system in accordance with some embodiments.

FIG. 2 describes an embodiment of the content integration system 100 where the host time identification module 106 and the camera motion classification module 108 are co-located, potentially on an internet server, but are not co-located with the distribution module 112 or the target digital content source. In this embodiment, a target digital content item is delivered from the target digital content source to the distribution module 112, which may be an internet server, such as an internet server belonging to a media website or social network that coordinates the distribution of the target digital content to the host time identification module 106 and the camera motion classification module 108 for the purpose of identifying the host times in the target digital content item and classifying the camera motion in any of the scenes within the target digital content item.

Figure 3:
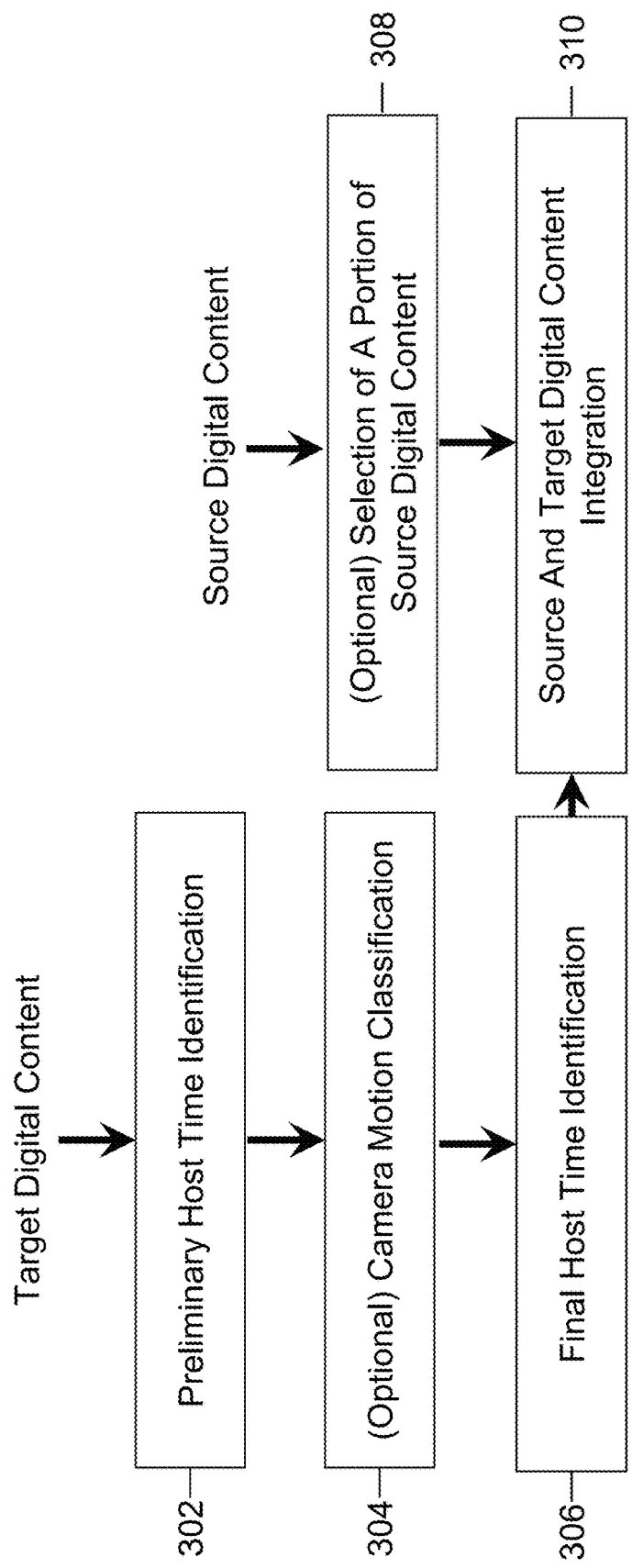
FIG. 3 illustrates examples of operations of a content integration system in accordance with some embodiments.

FIG. 3 illustrates examples of operations of the content integration system 100 in accordance with some embodiments. In step 302, the content integration system 100 can receive a target digital content item and use the host time identification module 106 to identify one or more host times in the target digital content item. In step 304, the content integration system 100 can optionally use a camera motion classification module 108 to classify scene(s) detected in the target digital content item. In step 306, the content integration system 100 can optionally output of the camera motion classification determined in step 304 to finalize or improve the host times identified in step 302. As described above, the host time identification module 106 can use a variety of features of the target digital content to identify host times or candidate host times.

In step 308, the content integration system 100 can receive one or more instances of source digital content for integration into the target digital content item. In step 310, the content integration system 100 can use a content integration module 118 to integrate the source digital content (or a portion thereof) into the target digital content time at the host times identified in step 302-306. For example, the content integration module 118 can integrate, interleave, or insert the source digital content at the detected host time(s) of the target digital content item.

Figure 4A:
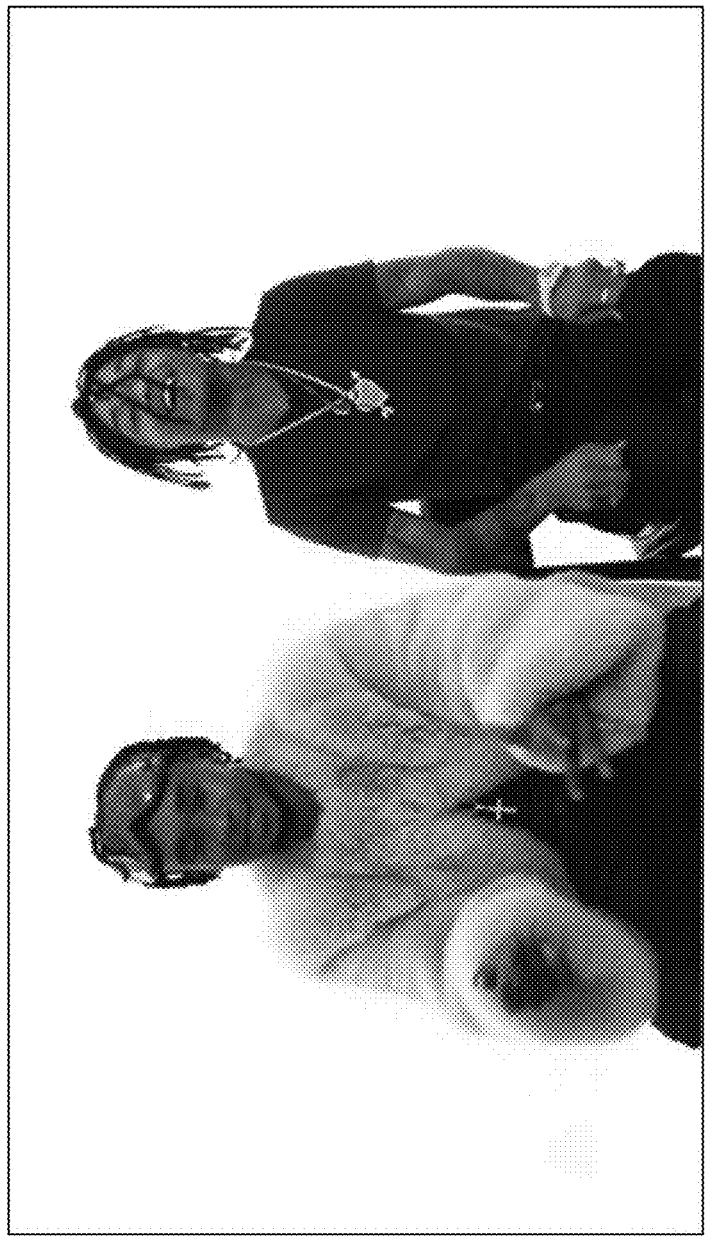
Figure 4B:
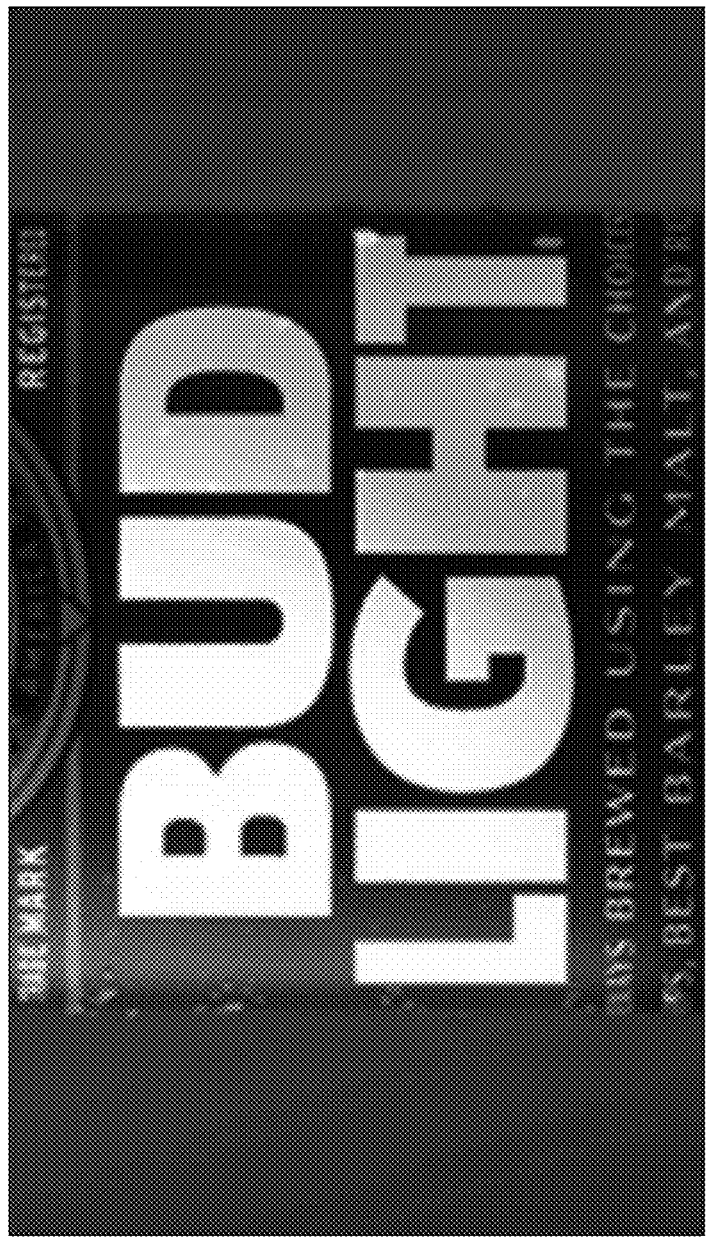

FIGS. 4A-4C illustrate examples of a target digital content time, source digital content, and a digital content item integrated using the content integration system in accordance with some embodiments. FIG. 4A illustrates a frame from a target digital content item including a video. FIG. 4B illustrates a frame from a source digital content including a video advertisement. FIG. 4C illustrates the integration of the source digital content into the target digital content item at one of the identified host times.

II. Host Time Identification and Scoring

As described above, the subject matter disclosed herein is exemplified in or may be practiced by any digital content, including, but not limited to, audio recordings (whether streaming/live or in a file), audio books, audio tours, radio broadcasts, songs, podcasts, videos (whether streaming/live or in a file and whether two-dimensional, three-dimensional, 360 degrees, or spherical), animations, video games, graphics displays, augmented reality, mixed reality, and virtual reality (the "target digital content").

The target digital content can exist as a file, data, or some other discrete or continuous and streaming entity. A target digital content item can include one or more frames (e.g., still images, to be displayed in succession) and/or audio elements (e.g., sound values in an array, to be played in succession) and/or other states to be displayed or played in synch at given points in time (collectively, "frames or elements"). Each of the frames or elements can further include individual pixels, dots, image points, or other smallest addressable elements (collectively, "pixels").

From any of the target digital content item, its subcomponent audio and/or visual data, the frames composing the visual data included in the target digital content item, or any components or subdivisions of those frames, such as pixels, windows, or localities, the content integration system can be configured to extract certain features or attributes of the target digital content item. These features or attributes associated with visual or visually displayed information (i.e., the images), collectively referred to as "available visual features," can include, but are not limited to, the following examples: (A) pixel values including, but not limited to, color, brightness, luminance, hue, radiance, lightness, colorfulness, chroma, intensity, saturation, or depth, as well as localized histograms or other aggregations of the same (collectively, "pixel values"); (B) values derived from said pixel values including, but not limited to, approximations of the magnitude of the gradients of the image intensity function ("gradient") as extracted through the convolution of the image using a kernel, including, but not limited to, the Sobel operator as described in Sobel & Feldman, *Isotropic 3×3 Image Gradient Operator*, SAIL (1968), which is herein incorporated by reference in its entirety, or the Prewitt operator as described in Prewitt, *Object Enhancement and Extraction, in Picture Processing and Psychopictorics*, Academic Press (1970), which is herein incorporated by reference in its entirety, as well as localized histograms or other aggregations of the same (collectively, "pixel-derived values"); (C) features derived from localized wavelet transforms including, but not limited to, the method described in Meyer, *Wavelets and Operators*, Cambridge Univ. Press (1992), which is herein incorporated by reference in its entirety; (D) Haar-like features including but not limited to those derived using the method described in Viola & Jones, *Rapid Object Detection Using a Boosted Cascade of Simple Features*, CVPR (2001), which is herein incorporated by reference in its entirety; (E) local key point features extracted through methods, such as the SIFT method described in U.S. Pat. No. 6,711,293, which is herein incorporated by reference in its entirety, the SURF method described in U.S. Patent application 2009238460, which is herein incorporated by reference in its entirety, the GLOH method including, but not limited to, the method described in Mikolajczyk & Schmid, *A Performance Evaluation of Local Descriptors*, TPAMI (2005), which is herein incorporated by reference in the entirety, the HOG method including, but not limited to, the method described in Dalal & Triggs, *Histograms of Oriented Gradients for Human Detection*, CVPR (2005), which is herein incorporated by reference in its entirety, or the ORB method including, but not limited to, the method described in Rublee et al., *Orb: An Efficient Alternative to SIFT or SURF*, ICCV (2011), which is herein incorporated by reference in its entirety; (F) edge features derived through, for example, (i) the Canny edge detection method as described in Canny, *A Computational*

*Approach To Edge Detection*, TPAMI (1986), which is herein incorporated by reference in its entirety; (ii) the Deriche edge detection method as described in Deriche, *Using Canny's Criteria to Derive a Recursively Implemented Optimal Edge Detector*, IJCV 1 (1987), which is herein incorporated by reference in its entirety; and (iii) the Roberts cross edge detection method as described in Roberts, *Machine Perception of Three-Dimensional Solids*, Technical Report 315, MIT (1963), which is herein incorporated by reference in its entirety; (G) corner features derived through, for example, (i) the Harris corner extraction method as described in Harris & Stephens, *A Combined Corner and Edge Detector*, AVC (1988), which is herein incorporated by reference in its entirety; (ii) the Shi-Tomasi corner extraction method as described in Shi & Tomasi, *Good Features to Track*, CVPR (1994), which is herein incorporated by reference in the entirety; (iii) the level curve curvature method as described in Kitchen & Rosenfeld, *Gray-level Corner Detection*, Pattern Recognition Letters 1 (1982), which is herein incorporated by reference in its entirety; (iv) the Hessian feature strength method as described in Lindeberg & Garding, *Shape-adapted Smoothing in Estimation of 3-D Depth Cues from Affine Distortions of Local 2-D Structure*, IVC 15 (1997), which is herein incorporated by reference in its entirety; (v) the SUSAN method as described in Smith & Brady, *SUSAN—a New Approach to Low Level Image Processing*, IJCV 23 (1997), which is herein incorporated by reference in its entirety; and (vi) the FAST method including, but not limited to, the method described in Rosten & Drummond, *Machine Learning for High-speed Corner Detection*, ECCV (2006), which is herein incorporated by reference in its entirety; (H) blob features extracted through the use of, for example, (i) the Laplacian of Gaussian (LoG) including, but not limited to, the method described in Kong et al., *A Generalized Laplacian of Gaussian Filter for Blob Detection and Its Applications*, IEEE Trans. Cybern. 6 (2013), which is herein incorporated by reference in its entirety; (ii) Difference of Gaussians (DoG) or Determinant of Hessian (DoH) as described in Lindeberg, *Image Matching Using Generalized Scale-space Interest Points*, JMIV 52 (2015), which is herein incorporated by reference in its entirety; (iii) MSER, including, but not limited to, the method described in Matas et al., *Robust Wide Baseline Stereo from Maximally Stable Extremal Regions*, BMVC (2002), which is herein incorporated by reference in its entirety; and (iv) PCBR, including, but not limited to, the method described in Deng et al. (2007), *Principal Curvature-based Region Detector for Object Recognition*, IEEE (2007), which is herein incorporated by reference in its entirety; (I) features extracted from a Hough transform, including, but not limited to, the method described in Duda & Hart, *Use of the Hough Transformation to Detect Lines and Curves in Pictures*, CACM (1972), which is herein incorporated by reference in its entirety; (J) structure tensor features derived from methods including, but not limited to, the one described in Knutsson, *Representing Local Structure Using Tensors*, SCIA (1989), which is herein incorporated by reference in the entirety; (K) affine invariant features derived from affine shape adaptation, including, but not limited to, (i) the method described in Lindeberg & Garding, *Shape-adapted Smoothing in Estimation of 3-D Depth Cues from Affine Distortions of Local 2-D Structure*, IVC 15 (1997), which is herein incorporated by reference in its entirety; (ii) the Harris affine feature detection method including, but not limited to, the method described in Mikolajczyk et al., *A Comparison of Affine Region Detectors*, IJCV (2005), which is herein incorporated by reference in its entirety; (iii) Hessian affine methods of affine invariant feature detection, including, but not limited to, the method described in Mikolajczyk & Schmid, *An Affine Invariant Interest Point Detector*, ICCV (2002), which is herein incorporated by reference in its entirety; or (L) segment features derived from methods including, but not limited to: (i) optical flow segmentation, including, but not limited to, the method described in Zitnick et al., *Consistent Segmentation for Optical Flow Estimation*, ICCV (2005), which is herein incorporated by reference in its entirety; (ii) edge detection segmentation, including, but not limited to, the method described in Lindeberg & Li, *Segmentation and Classification of Edges Using Minimum Description Length Approximation and Complementary Junction Cues*, CVIU 67 (1997), which is herein incorporated by reference in its entirety; (iii) thresholding segmentation using k-means including, but not limited to, the method described in Beigh et al., *Image Segmentation using K-means Clustering and Thresholding*, IRJET (2016), which is herein incorporated by reference in its entirety; (iv) graph-based image segmentation, including, but not limited to, the method described in Felzenszwalb & Huttenlocher, *Efficient Graph-based Image Segmentation*, IJCV (2004), which is herein incorporated by reference in its entirety; (v) mean shift clustering segmentation, including, but not limited to, the method described in Comaniciu & Meer, *Mean Shift: A Robust Approach toward Feature Space Analysis*, PAMI (2002), which is herein incorporated by reference in its entirety; (vi) blob-based segmentation methods, including, but not limited to, MSER; (vii) SLIC super pixel segmentation, including, but not limited to, the method described in Achanta et al., *SLIC Superpixels Compared to State-of-the-art Superpixel Methods*, TPAMI (2012), which is herein incorporated by reference in its entirety; (viii) watershed super pixel segmentation, including, but not limited to, the method described in Khiyal et al., *Modified Watershed Algorithm for Segmentation of 2D Images*, IISIT (2009), which is herein incorporated by reference in its entirety; (ix) quick shift super pixel segmentation, including, but not limited to, the method described in Fulkerson & Soatto, *Really Quick Shift: Image Segmentation on a GPU*, CVGPU (2010), which is herein incorporated by reference in its entirety; (x) neural net-based segmentation including, but not limited to, the method described in Ozkan et al., *Neural-network Based Segmentation of Multi-modal Medical Images: A Comparative and Prospective Study*, IEEE Trans Med Imag. 12 (1993), which is herein incorporated by reference in its entirety; (M) contour feature data extracted by methods including, but not limited to, the method described in Deguchi, *Multi-scale Curvatures for Contour Feature Extraction*, ICPR (1988), which is herein incorporated by reference in its entirety; (N) line feature data extracted by methods including, but not limited to, the method described in Heij den, *Edge and Line Feature Extraction Based on Covariance Models*, IEEE Trans. Pattern Anal. Mach. Intell. (1995), which is herein incorporated by reference in its entirety; or (O) any combinations of these or other available features.

The features or attributes associated with audio information, collectively referred to as "available audio features", can include, but are not limited to: (a) a series or array of samples, elements, or frames, each sample, element, or frame including a value or a set of values at a point in time and/or space, where the values reflect, among other things, the sound frequency at that given point in time and/or space; (b) the zero crossing rate, which captures the rate of sign-changes in an audio signal during the duration of a particular audio sample, element, or frame ("zero crossing rate); (c) the "energy", which captures the sum of the squares of the signal values and may be normalized by the respective frame length ("energy"); (d) the entropy of energy, which captures the entropy of the sub-frames' normalized energies and can be interpreted as a measure of abrupt changes ("entropy of energy"); (f) spectral centroids, which are the center of gravity of the spectrum and are calculated as the weighted mean of the frequencies present in the signal determined using a Fourier transform, with their magnitudes as the weights ("spectral centroids"); (g) spectral spread, which is a measure of the bandwidth of the spectrum ("spectral spread"); (h) spectral entropy, which is the entropy of the normalized spectral energies for a set of sub-frames ("spectral entropy"); (i) spectral flux, which is the squared difference between the normalized magnitudes of the spectra of two successive frames ("spectral flux"); (j) spectral roll-off, which is the frequency below which 90% of the spectrum in the magnitude distribution is concentrated ("spectral roll-off"); (k) Mel-Frequency Cepstral Coefficients form a cepstral representation where the frequency bands are not linear but are distributed according to the mel-scale ("MFCCs"); (l) chroma vector, which is a 12-element representation of the spectral energy where the bins represent the 12 equal-tempered pitch classes of western-type music (semitone spacing) ("chroma vector"); (m) chroma deviation, which is the standard deviation of the 12 chroma coefficients ("chroma deviation"); or (n) amplitude, which is the objective measurement of the degree of change (positive or negative) in atmospheric pressure (the compression and rarefaction of air molecules) caused by sound waves and is captured when sound waves are sampled and turn into digital audio data.

In some embodiments, the host time identification module 106 is configured to receive certain universal constraints or parameters regarding host times, including, but not limited to, desired host time frequency, minimum or maximum intervals between host times, or portions of the content that may never host source digital content. These constraints or parameters can be used to eliminate host times from consideration, to refine lists of candidate host times or host times, or to assign candidate scores to host times.

In some embodiments, the host time identification module 106 can be configured to exclude, at any time during or after the host time identification, an identified host time from further consideration because it fails to satisfy some condition (e.g. it occurs too close to the start or end of the target digital content) or is otherwise deemed unable to favorably host source digital content.

In some embodiments, as a preliminary step in host time identification, the host time identification module 106 can be configured to parse the target digital content into its visual components and its audio components.

In some embodiments where a preliminary step in host time identification involves parsing the target digital content into its visual components and its audio components, the host time identification module 106 can be configured to parse the target digital content into a list of frames including the visual aspect of the target digital content, and an array or other data structure including the audio aspect of the target digital content.

In some embodiments, the host time identification module 106 can be configured to identify and/or score host times or candidate host times by searching the visual components and/or the audio components of the target digital content, and optionally considering the target digital content's metadata in conjunction, for patterns or qualities that suggest the existence of a host time or candidate host time.

In some embodiments, the host time identification module 106 can be configured to start the search of the available attributes of the target digital content or its components for patterns or qualities that suggest the existence of a host time or candidate host time at the first point in content (e.g. the first frame and/or the first element of audio data) that is deemed appropriate for insertion of source digital content.

In some embodiments, such as those where the target digital content is being created on an ongoing basis (e.g., is live or streaming), the host time identification module 106 can be configured to start the search of the available attributes of the target digital content or its components for patterns or qualities that suggest the existence of a host time or candidate host time at the current or most recent and available point in the content (e.g. the current frame and/or the current element of audio data) that is deemed appropriate for insertion of source digital content.

In some embodiments, the host time identification module 106 can be configured to record data representing one or more host times, candidate host times, or times intervals in the form of one or more times or timestamps (representing particular points in the target digital content item), frame numbers, audio element index numbers, or any other data that defines one or more specific times or moments in the display of the target digital content where source digital content may be integrated, interleaved, or inserted ("host time defining data").

In some embodiments, the host time identification module 106 can be configured to, at any point during host time identification, assign to one or more times, frame numbers, or audio element indices of the target digital content item a score, ranking, or probability that indicates the likelihood that each host time, candidate host time, or time interval represents a host time or candidate host time or its relative attractiveness as a host time or candidate host time ("candidate score").

In some embodiments, the host time identification module 106 can be configured to collect the host time defining data (including the candidate scores) along with or including, for example, metadata about the host times (such as any visual or audio features at or around the host times detected during the host times identification) or the target digital content, in one or more data structures or object specific to the target digital content ("host time object"). In some embodiments, the host time object is in a lightweight data-interchange format, including, but not limited to, JavaScript Object Notation ("JSON") or Extensible Markup Language ("XML").

In some embodiments, the host time object is (or is used to generate) a standardized XML template or other metadata file template that can be used to describe the structure for advertisement inventory insertion in content, including but not limited to Interactive Advertising Bureau Video Multiple Ad Playlist (VMAP).

In some embodiments, at some points during or after the host time identification, statistics regarding the host time (such as average confidence score) are calculated and added to the metadata or the host time object in order to facilitate the pairing of the host time with source digital content for placement.

In some embodiments, the host time identification module 106 can be configured to select one or more candidate host times using one or more host time identification processes before passing the candidate host times to one or more other processes where the list is further refined or where final host times are selected from the candidate host times.

In some embodiments, at any time during or after the calculation of summary statistics, the target digital content item or its individual host times may be excluded from further consideration if they fail to satisfy some threshold confidence score or average confidence score, or are otherwise deemed unable to favorably host source digital content.

In some embodiments, at any time during or after the calculation of summary statistics, the metadata about the host times may be used to create a source digital content transformation object that can be used to make the integration, interleaving, or insertion of the source digital content more effective, unobtrusive, or aesthetically pleasing. For example, sound frequencies or volume levels observed during the analysis of audio may be used to transform or adjust the frequencies or volume levels in the source digital content so that the resulting integration, interleaving, or insertion of the source digital content is more seamless and less disruptive.

In some embodiments, the host time identification module 106 is configured to use data collected during the host time identification process to create a transformation object that is applied to the source digital content in order to makes its integration, interleaving, or insertion into the target digital content more seamless.

In some embodiments, the host time identification module 106 is configured to create a transformation object that can be used to alter the data of the source digital content in such a way that the source digital content more closely resembles the audio levels or profile of the target digital content.

In some embodiments, the host time identification module 106 can be configured to create a transformation object that can be used to alter the visual data of the source digital content in such a way that the source digital content more closely resembles the visual aspects or profile of the target digital content.

In some embodiments, the host time identification module 106 is configured to identify and store all host times or candidate host times that satisfy certain thresholds that are set for determining a host time or candidate host time.

In some embodiments, the host time identification module 106 is configured to identify and/or store only a specific number of host times, such as adaptively adjusting its thresholds for host times in order to satisfy that constraint. This can reduce storage costs.

In some embodiments where the host time identification module 106 is configured to identify and/or store only a specific number of host times, the number of host times is passed in by a user, such as the owner of the content, when, for example, submitting the target digital content item to the content integration system 100 or any time thereafter.

A. Host Time Identification Using Visual Data

In some embodiments, the content integration system 100 is configured to receive or retrieve the visual component of the target digital content item and to use the host time identification module 106 to identify and/or score host times or candidate host times in the target digital content item by analyzing the available attributes of the visual data present in the target digital content item or its components, and searching for patterns or qualities that indicate the existence of host times or candidate host times (and/or determining their levels of quality).

In some embodiments where the host time identification module 106 is configured to identify and/or score host times or candidate host times in the target digital content item by analyzing the available attributes of the visual data present in the target digital content item or its components to search for patterns or qualities that indicate the existence of host times or candidate host times (or determine their level of quality), where the first frame of the target digital content item is used as the starting point for the search.

In some embodiments where the host time identification module 106 is configured to identify and/or score host times or candidate host times in the target digital content item by analyzing the available attributes of the visual data present in the target digital content item or its components, searching for patterns or qualities that suggest the existence of host times or candidate host times (or predict their levels of quality), the first frame of the target digital content item appropriate for insertion of source digital content is used as the starting point for the search. This narrows the size of the analysis, thus reducing computation. This is useful, for example, in cases where the source digital content to be integrated, interleaved, or inserted is an advertisement and there is a prohibition on showing advertisements during certain portions of the target digital content item (e.g., during the first three seconds).

In some embodiments, the content integration system 100 is configured to receive or retrieve the visual component of the target digital content item and use the host time identification module 106 to parse the visual component of the target digital content item into scenes, shots, or cuts ("scenes"), where each scene represents a series of interrelated and/or consecutive frames, a continuous action in time, a contiguous physical space, etc.

In some embodiments, the host time identification module 106 is configured to identify and/or score host times or candidate host times in the target digital content item by parsing the visual component of the target digital content item into scenes, and then identifying and/or scoring, as host times or candidate host times, one or more times or frame numbers representing the transitions between those scenes (e.g., the frame number representing the start of each new scene).

In some embodiments, the host time identification module 106 is configured to identify and/or score host times or candidate host times in the target digital content item using software such as PySceneDetect described at https://pyscenedetect.readthedocs.io/en/latest/, which is incorporated by reference herein, to parse the visual component of the target digital content into scenes, and then identifying, as host times or candidate host times, one or more frame numbers or times that the software identifies as representing the transition between those scenes (e.g., the frame number representing the start of each new scene).

In some embodiments where the host time identification module 106 is configured to identify and/or score host times or candidate host times in the target digital content item using an open source software, such as PySceneDetect, to parse the visual component of the target digital content item into scenes, and then identifying, as host times or candidate host times, one or more frame numbers or times that the open source software identifies as representing the transitions between those scenes (e.g., the frame number representing the start of each new scene), scene transition confidence scores or accuracy scores associated with the predicted transitions are associated with the host times or candidate host times as host time candidate scores.

In some embodiments, the host time identification module 106 is configured to identify and/or score host times or candidate host times in the target digital content item by analyzing the available attributes of the visual aspect of the target digital content item or its components, searching through all frames for consecutive pairs of frames or sequences of successive frames whose attributes (e.g. pixel values) reflect a level of change that exceeds a predetermined threshold, suggesting that the pairs or sequences of frames include a transition between two shots or scenes or a transition in the story in the target digital content item, and then selecting as host times or candidate host times one or more times or frame numbers associated with that transition (e.g., the frame number of the frame at the start of a new shot, scene, or story).

In some embodiments where the host time identification module 106 is configured to identify and/or score host times or candidate host times in the target digital content item by analyzing the attributes of the visual aspects of the target digital content item or its components, searching through all frames for consecutive pairs of frames or sequences of successive frames whose attributes (e.g. pixel values) reflect a level of change that exceeds a predetermined threshold (indicating a transition), and then selecting as host times or candidate host times one or more times or frame numbers associated with the transition (e.g., the frame number of the frame at the start of a new shot, scene, or story), the level of change observed is also used to determine a candidate score for those host times or candidate host times.

In some embodiments, the host time identification module 106 is configured to identify and/or score host times or candidate host times in the target digital content item by analyzing the available attributes of the visual aspects of the target digital content item or its components, searching through all frames for consecutive pairs of frames or sequences of successive frames whose H, S, or V channel values each change more than a predetermined threshold (e.g., 30), suggesting that the pairs or sequences of frames include a transition between two shots or scenes or a transition in the story in the target digital content item, then selecting as host times or candidate host times one or more times or frame numbers at the transition (e.g., the frame number of the frame at the start of a new shot, scene, or story).

In some embodiments, the host time identification module 106 is configured to identify and/or score host times or candidate host times in the target digital content item by using software, such as the PySceneDetect's "content" method described in https://pyscenedetect.readthedocs.io/en/latest/examples/usage/, which is incorporated by reference herein, to identify points in the target digital content item where the attributes (e.g. pixel values) reflect a level of change that exceeds a predetermined threshold, suggesting that the pairs or sequences of frames including a transition between two shots or scenes or a transition in the story in the target digital content item, and to use as host times or candidate host times the times or frame numbers returned by the method.

In some embodiments where the host time identification module 106 is configured to identify and/or score host times or candidate host times in the target digital content by using software, such as PySceneDetect's "content" method, to identify points in the target digital content item where the attributes (e.g. pixel values) reflect a level of change that exceeds a predetermined threshold and to use as host times or candidate host times the times or frame numbers returned by the method, confidence scores returned along with the times or frame numbers returned by the method can be used as candidate scores.

In some embodiments, the host time identification module 106 is configured to identify and/or score host times or candidate host times in the target digital content item by taking sequential frames from the target digital content item, taking the average of each of their pixel values, and depositing each of the resulting averages into an array (e.g., a time series). Next, the host time identification module 106 is configured to compares segments of the time series by measure their variance difference using the Bartlett variance test, where the output of the Bartlett variance test includes a P value. The host time identification module 106 is further configured to, when segments have sufficiently different P values, determine that the segments include a transition in the story in the target digital content item, and thus identify a host time or candidate host time (and/or the quality of the same) associated with the transition.

In some embodiments, the host time identification module 106 is configured to identify and/or score host times or candidate host times in the target digital content item by analyzing the attributes of the visual aspects of the target digital content item or its components and using an adaptive threshold method to identify pairs or sequences of frames that, because the changes of their pixel values exceed an adaptive threshold, indicate a transition between two shots or scenes or a transition in the story in the target digital content item. This allows the threshold to adapt to the attributes of the particular target digital content item.

In some embodiments, the host time identification module 106 is configured to identify and/or score host times or candidate host times in the target digital content item by iterating frame by frame, starting at the first frame, and, for each frame, calculating the average of the pixel values in each pixel value channel of the frame, taking the variance of the averages for each channel among the frame and all frames before it in a current interval ("calculation interval"), and using those variances for the channels as thresholds to check whether the current frame being examined has pixel values which, in any channel, exceed that channel's threshold. If the pixel values of the current frame exceed the threshold in any channel, the host time identification module 106 can determine that the new frame being examined marks a transition between two shots or scenes or a transition in the story in the target digital content item, select that frame as a host time or candidate host time, and start a new calculation interval with it. If the pixel values of the current frame do not exceed the threshold in any channel, the host time identification module 106 may move on to the next frame and repeating the above-described calculations. In some embodiments, the formula used for determining the variance in each channel is:

$$\sigma^2 = \frac{\sum (X - \mu)^2}{N},$$

where μ can be computed from the calculation interval, X is the average in a channel for the current frame, and N is the is the number of frames in the calculation interval.

In some embodiments, the host time identification module 106 is configured to identify and/or score host times or candidate host times in the target digital content item by analyzing the attributes of the visual aspects of the target digital content item or its components and identifying sequences of frames that reflect a fade-out (e.g., a gradual transition of the pixels values of the frames towards those representing the color black or white), fade-in (the reverse of a fade-out, e.g., a gradual transition of the pixels values in the frames away from those representing the color black or white), or a fade-out followed by a fade-in ("fade-out/fade-in sequence"), with the selected or scored host times or candidate host times being times or frame numbers that precede, follow, or fall somewhere within the sequence of frames or the time window including the fade-in, fade-out, or fade-out/fade-in sequence. Because fade-ins, fade-outs, and fade-out/fade-in sequences are often used to mark transitions in the story in a digital content item, this can be an effective way to identify and/or score host times or candidate host times where source digital content can be integrated, interleaved, or inserted while minimally obtruding the viewer experience.

In some embodiments, the host time identification module 106 is configured to use open source software, such as the "threshold" method in PySceneDetect described in https://pyscenedetect.readthedocs.io/en/latest/examples/usage/, which is incorporated by reference herein, to identify fade-ins, fade-outs, and fade-out/fade-in sequences in the target digital content item and to use the frame numbers returned by such software as host times or candidate host times.

In some embodiments where the host time identification module 106 is configured to use open source software, such as the "threshold" method in PySceneDetect, to identify fade-ins, fade-outs, and fade-out/fade-in sequences in the target digital content and to use the frame numbers returned by such software as host times or candidate host times, the returned prediction score associated with each frame identified as a fade-in, fade-out, or fade-out/fade-in sequence is used as the candidate score for the frame.

In some embodiments, the host time identification module 106 is configured to identify groups of frames that represent fade-ins, fade-outs, or fade-out/fade-in sequences by locating continuous sequences of one or more frames in the target digital content item whose pixel values are within a certain predetermined threshold of the pixel values associated with the color black or the color white, and then selecting the times or frames at the start or end of the sequences or times or times or frames within these sequences as host times or candidate host times.

In some embodiments where the host time identification module 106 is configured to identify those groups of frames that represent fade-in, fade-out, or fade-out/fade-in sequences by locating continuous sequences of one or more frames in the target digital content item whose pixel values are within a certain predetermined threshold of the pixel values associated with the color black or the color white, and then selecting the times or frames at the start or end of the sequences or times or times or frames within these sequences as host times or candidate host times, the difference between the pixel values of the frames in the target digital content item whose pixel values are within a certain predetermined threshold of the pixel values associated with the color black or the color white and the pixel values associated with the color black or the color white is used to determine a candidate score for those host times or candidate host times (which smaller differences translating into a higher candidate score).

Figure 5:
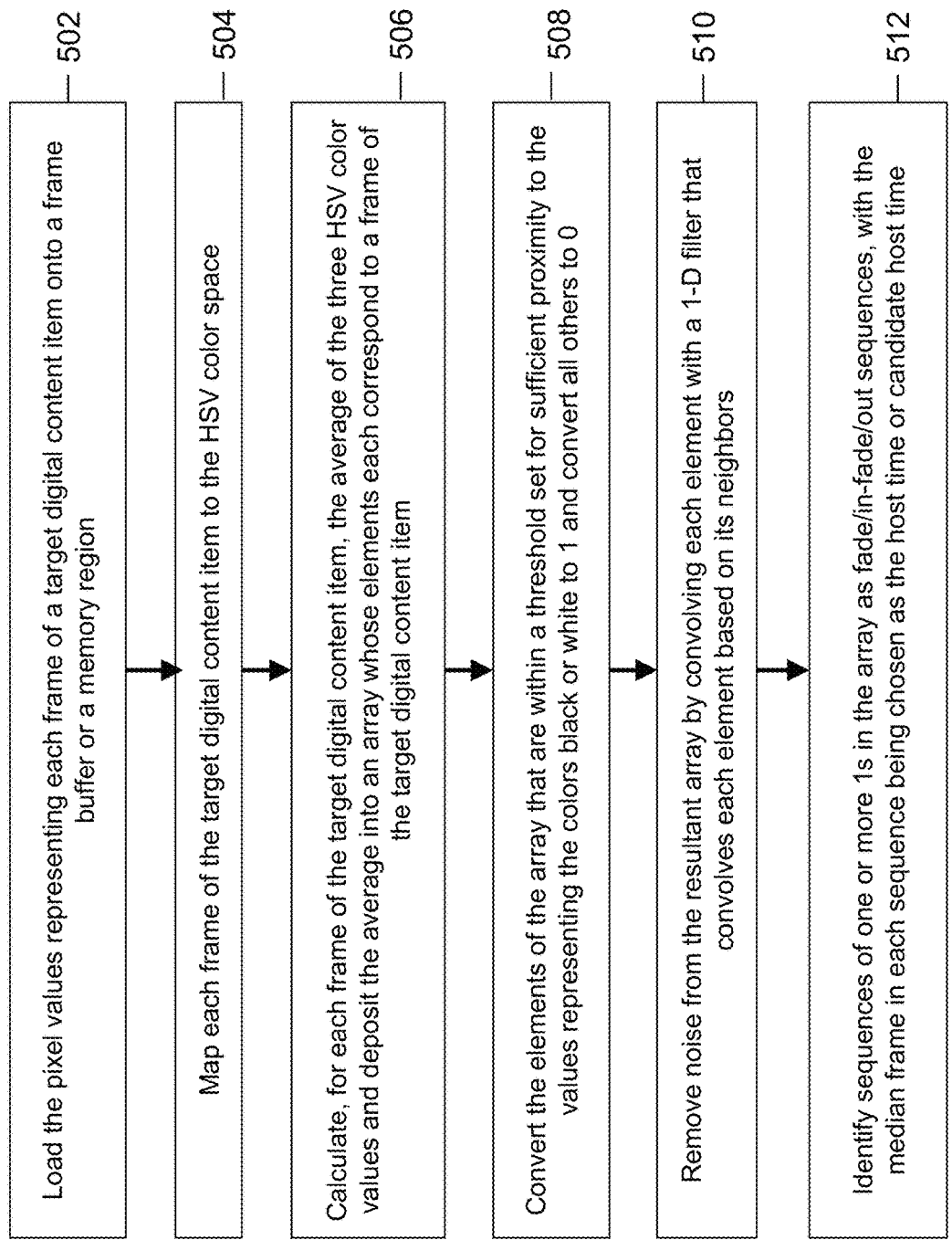
FIG. 5 illustrates an example of a method of host time identification through the identification of fade-in, fade-out, and/or fade-in/fade-out sequences in accordance with some embodiments.

FIG. 5 illustrates an example of a method of host time identification through the identification of fade-ins, fade-outs, and fade/in-fade/out sequences in accordance with some embodiments. In step 502, the host time identification module 106 is configured to load the pixel values representing the first frame of a first scene onto a first frame buffer or a first memory region. In step 504, the host time identification module 106 is configured to map each frame of the target digital content item to the HSV color space. In step 506, the host time identification module 106 is configured to calculate, for each frame of the target digital content item, the average of the three HSV color values and deposit the average into an array whose elements each correspond to a frame of the target digital content item. In step 508, the host time identification module 106 is configured to convert the elements in the array that are within the threshold set for sufficient proximity to value 0 (representing the color black) or the maximum pixel value (representing the color white) to 1 and converting all others to 0. In step 510, the host time identification module 106 is configured to remove noise from the resultant array (i.e., smoothing it) by convolving each element with a 1-D filter that convolves each element based on its neighbors. In step 512, any sequences of one or more 1s in the array are identified as fade/in-fade/out sequences, with the median frame in the each sequence being chosen as a host time or candidate host time.

In some embodiments, the host time identification module 106 is configured to identify and/or score host times or candidate host times in the target digital content item by using any combination of two or more of the above-described methods (e.g., using them as prerequisites or complements for each other or by using all these results (e.g., by averaging) to inform an overall candidate score) including: (1) using a threshold method, in which the host time identification module analyzes the attributes of the visual aspects of the target digital content item or its components, searches through all the frames for consecutive pairs of frames or sequences of successive frames whose attributes (e.g. pixel values) reflect a level of change that exceeds a predetermined threshold, suggesting that the pairs or sequences of frames mark a transition between two shots or scenes or a transition in the story in the target digital content item, and then selecting as host times or candidate host times the one or more times or frame numbers at that transition (e.g., the frame number of the frame at the start of a new shot, scene, or story); (2) the adaptive threshold method, in which the host time identification module analyzes the attributes of the visual aspect of the target digital content item or its components, identifying pairs or sequences of frames that, because their pixel values exceed the adaptive threshold of change, indicate a transition between two shots or scenes or a transition in the story in the target digital content item; and (3) analyzing the attributes of the visual aspects of the target digital content or its components and identifying sequences of frames that reflect a fade-out (e.g., a gradual transition of the pixels values of the frames towards those representing the color black or white), fade-in (the reverse of a fade-out, e.g., a gradual transition of the pixels values in the frames away from those representing the color black or white), or a fade-out followed by a fade-in ("fade-out/fade-in sequence").

In some embodiments where the host time identification module 106 is configured to identify initial candidate host times using the threshold method, the adaptive threshold method, or scouring the content for fade-ins, fade-outs, and fade-in/fade-out sequences, the host time identification module may further refine the list of candidate host times or adjust their scores by additionally taking a certain number of frames on each side of each candidate host time, for example, frames comprising 3 seconds of content, 10 seconds of content, or 30 seconds of content, calculating the average of each frame's pixel values, assembling those averages into a time series, finding the difference between the time series on both side using the Bartlett variance difference, obtaining a P value, repeating this for all candidate host times in the list, ranking each candidate host time based on its P value, and then summing the P values for the 3, 10, and 30 second intervals to assign a candidate score to each candidate time.

In some embodiments, the host time identification module 106 is configured to configured to identify and/or score host times or candidate host times in the target digital content item by examining the motion vectors of segments of the target digital content item using an optical flow method including, but not limited to, the one described in Lucas and Kanade, *An Iterative Image Registration Technique with an Application to Stereo Vision* (1981) ("Lucas-Kanade"), which is herein incorporated by reference in its entirety. In locations where the motion vector of neighboring segments is sufficiently dissimilar, the host time identification module may conclude that the point in the target digital content item representing the border between those segments can be identified as a host time or candidate host time (or increment a candidate score to reflect this conclusion).

Figure 6:
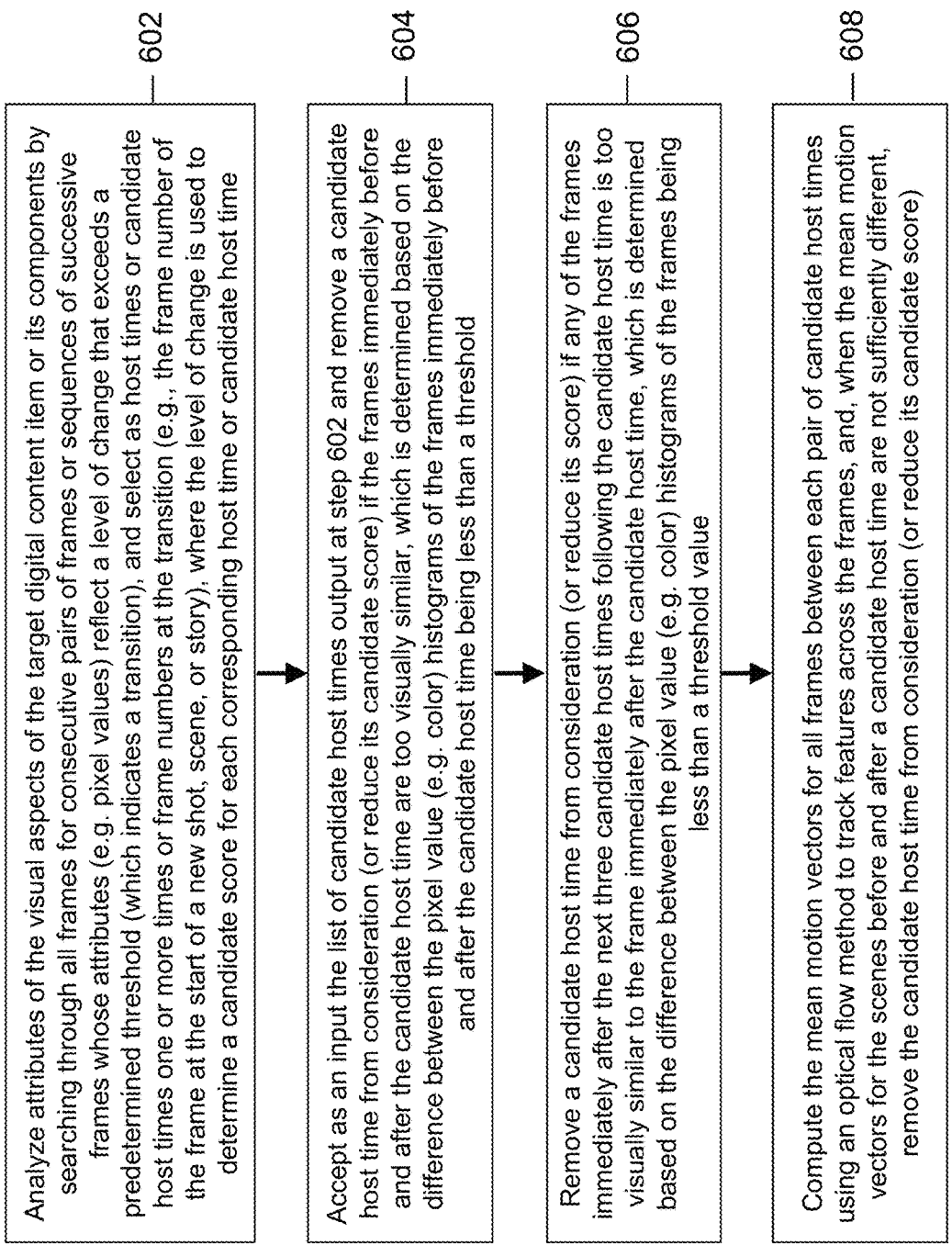
FIG. 6 illustrates an example of a method of host time identification using visual data from a target digital content item in accordance with some embodiments.

FIG. 6 illustrates an example of a method of host time identification using visual data from target digital content in accordance with some embodiments. In step 602, the host time identification module 106 is configured to analyze the attributes of the visual aspects of the target digital content item or its components, search through all frames for consecutive pairs of frames or sequences of successive frames whose attributes (e.g. pixel values) reflect a level of change that exceeds a predetermined threshold, and select the one or more times or frame numbers at the transitions (e.g., the frame number of the frame at the start of a new shot, scene, or story) as host times or candidate host times, where the level of change is used to determine a candidate score for each of the host times or candidate host times. In step 604, the host time identification module 106 is configured to accept as an input the list of candidate host times output at step 602 and to remove some candidate host times from consideration if the frames immediately before and after these candidate host times are too visually similar. For example, if the difference between the pixel value (e.g. color) histogram of the frames immediately before and after a candidate host time does not exceed a satisfactory threshold, the host time is removed from consideration (or its associated candidate score is reduced). In step 606, the host time identification module 106 is configured to remove a candidate host time from consideration (or reduce its candidate score) if any of the frames immediately after the next three candidate host times following that candidate host time is too visually similar to the frame immediately after the candidate host time, for example, if the difference between the pixel value (e.g. color) histogram of any of the frames immediately after the next three host times and the pixel value histogram of the frame immediately after the current host time does not exceed a satisfactory threshold. In step 608, the host time identification module 106 is configured to compute the mean motion vector for all frames between each pair of the candidate host times using an optical flow method, such as the one described in Lucas-Kanade, track features across the frames, and, when the mean motion vectors for the scenes before and after a particular host time are not sufficiently different (e.g., with a difference less than a threshold), remove that host time from consideration (or reduce its candidate score).

In some embodiments, the host time identification module 106 is configured to identify and/or score host times or candidate host times in the target digital content item by searching portions of the visual attributes of the target digital content item for visual representations of text or language using optical character recognition techniques, convert those representations to text or language, and then search for patterns or qualities in the text or language that suggest the existence of a host time or candidate host time.

In some embodiments, the host time identification module 106 is configured to identify and/or score host times or candidate host times in the target digital content item by using optical character recognition ("OCR") techniques to identify any letters and/or text present in the visual aspect of the target digital content item or its components including, but not limited to, subtitles, using natural language processing ("NLP") and other methods to predict or identify elements of the text that signify pauses or transitions in the story in the target digital content item (e.g. words, punctuations, or capitalizations indicating the ends or beginnings of sentences or paragraphs, or ellipses, conjunctions, or other words or punctuation indicating a turning point or transition in the ideas the text embodies).

In some embodiments, the host time identification module 106 is configured to identify and/or score host times or candidate host times in the target digital content by searching the visual attributes of the target digital content item and its components using OCR to identify or predict periods, commas, semicolon, ellipses, or other pauses in the language or text depicted by the target digital content, with the times in the target digital content associated with those items selected as host times or candidate host times.

In some embodiments, the host time identification module 106 is configured to identify and/or score host times or candidate host times in the target digital content item by using image recognition techniques to search for and record the objects, people, textures, materials, shapes, locations, and activities depicted inside the frames of the content, identifying those times or frames in the content representing transitions from particular objects, people, textures, materials, shapes, locations, and activities to other objects, people, textures, materials, shapes, locations, and activities, and selecting or scoring those transition points as host times or candidate host times.

In some embodiments, the host time identification module 106 is configured to identify and/or score host times or candidate host times in the target digital content item by training one or more neural network models, each neural network model for a different purpose (e.g., object recognition) and trained on features extracted from (e.g., attributes extracted from the visual aspect of) instances of target digital content (e.g., in the case of object recognition, images depicting various objects, people, textures, materials, shapes, locations, and activities), such that, for future input images, each model can output, instead of the typical classification or prediction output by the last layer in a neural network, a feature vector representing the output of the second-to-last layer. The feature vectors from the neural network model can then be combined into a "master feature vector" or "content vector" for each future input instance of target digital content. By using the resulting models to calculate the content vectors of segments of target digital content item, the host time identification module can determine where the content vector changes sufficiently, and take as input a given frame and output a vector which, by comparison to prior images' vectors, can predict the objects, people, textures, materials, shapes, locations, and activities depicted inside the input frame. By passing sequential frames or segments of the target digital content item (e.g., the content vectors for the target digital content item on both sides of a candidate host time identified through some other process) through the model, content vectors can be derived for those frames, and, when there is significant distance between the vectors (which can be measured with, for example, cosine distance), it can be determined that there is a transition in the story in the target digital content item and the corresponding transition point represents a host time or candidate host time (or corresponds to a quality level of one).

In some embodiments, the output of part of the host time identification using visual information is a sequence of frame numbers, each representing a host time or candidate host time. In some embodiments, the output of part of host time identification using visual information is a sequence of frame numbers, each representing a host time or candidate host time, and each accompanied by a corresponding candidate score.

B. Host Time Identification Using Audio Data

In some embodiments, the content integration system 100 is configured to receive or retrieve the audio components of the target digital content, and use the host time identification module 106 to identify and/or score host times or candidate host times in the target digital content item by analyzing the attributes of the audio data present in the target digital content item or its components, and searching for patterns or qualities that indicate the existence of host times or candidate host times (or determining their levels of quality).

In some embodiments where the host time identification module 106 is configured to identify and/or score host times or candidate host times by analyzing the audio attributes of the target digital content and searching for patterns or qualities that suggest the existence of a host time or candidate host time (or determining their levels of quality), the starting point for the analysis is the first frame or element of the target digital content's audio information or, where the target digital content's audio components include more than one channel, the first frame or element in each channel.

In some embodiments where the host time identification module 106 is configured to identify and/or score host times or candidate host times by analyzing the audio attributes of the target digital content and searching for patterns or qualities that suggest the existence of a host time or candidate host time (or determining their levels of quality), the starting point for the analysis is the first frame or element of the target digital content's audio information or, where the target digital content's audio components include more than one channel, the first frame or element in each channel) that is deemed appropriate for inserting source digital content. This reduces the size of the analysis and the amount of computation.

In some embodiments, the host time identification module 106 is configured to identify and/or score host times or candidate host times by searching the audio attributes of the target digital content for transitions in the values or qualities of one or more audio attributes, including, but not limited to, amplitude, zero crossing rate, energy, entropy of energy, spectral centroids, spectral spread, spectral entropy, spectral flux, spectral roll-off, MFCCs, chroma vector, and/or chroma deviation, which, due to their size and/or rapidity or other quality, suggest a pause, shift, or transition in the story being told by or in the sequence of events portrayed by the target digital content.

In some embodiments, the host time identification module 106 is configured to identify and/or score host times or candidate host times by setting one or more thresholds and then searching the audio attributes of the target digital content for pairs of successive frames or sequences of frames whose values for one or more of the audio attributes including, but not limited to, amplitude, zero crossing rate, energy, entropy of energy, spectral centroids, spectral spread, spectral entropy, spectral flux, spectral roll-off, MFCCs, chroma vector, and/or chroma deviation exceed the one or more thresholds, suggesting a pause, shift, or transition in the story being told by or in the sequence of events portrayed by the target digital content.

In some embodiments, the host time identification module 106 is configured to identify and/or score host times or candidate host times by using an adaptive threshold method, which involves iterating through all frames or elements of the audio data in the target digital content (starting with the first), calculating, for one or more attributes including, but not limited to, amplitude, zero crossing rate, energy, entropy of energy, spectral centroids, spectral spread, spectral entropy, spectral flux, spectral roll-off, MFCCs, chroma vector, and/or chroma deviation, the variance of the values of that attributes for the interval between the current frame and the one at the start of the current interval, using the variance as the threshold to identify, if the current value exceeds that variance the current frame as a host time or candidate host time, and starting a new interval with the current frame.

In some embodiments, the host time identification module 106 is configured to identify and/or score host times or candidate host times by using attributes from the audio data of the target digital content to classify frames or segments of the audio data according to the nature of the sound it represents, such as speech (by human), music, silence, etc., with the points in the target digital content item that mark a change from one classification to a different classification being selected as host times or candidate host times (and determine the level of quality thereof).

In some embodiments, the host time identification module 106 is configured to identify and/or score host times or candidate host times by using attributes from the target digital content's audio data to classify frames or segments of the audio data according to the nature of the sound it represents, e.g., speech (by human), music, silence, etc., with the points in the target digital content item that mark a change from one classification to a different classification being selected as host times or candidate host times (and determine the level of quality thereof). The candidate score or ranking of a host time or candidate host time may be correlated with the degree of confidence or the predicted probability of the classification of each frame or segment of the audio data.

In some embodiments where the host time identification module 106 is configured to identify and/or score host times or candidate host times by using attributes from the target digital content's audio data to classify frames or segments of the audio data according to the nature of the sound it represents, e.g., speech (by human), music, silence, etc., the classification may be obtained by using a neural network model that has been trained using labelled samples of each class and can determine a classification and, optionally, a probability score for each portion of the target digital content.

In some embodiments, the host time identification module 106 is configured to identify and/or score host times or candidate host times by using attributes from the target digital content's audio data to classify portions of the audio data as either representing speech (by human), music, or silence by using a support vector machine classifier that has been trained using labelled samples of each class and can determine a classification and, optionally, a probability score for each portion of the target digital content.

In some embodiments where the host time identification module 106 is configured to identify and/or score host times or candidate host times by using available attributes from the target digital content's audio data to classify frames or segments of the audio data according to the nature of the sound it represents, e.g. speech (by human), music, silence, etc., with the points in the target digital content that mark a change from one classification to a different classification being selected as host times or candidate host times (or determine the level of quality thereof), the host time identification module 106 is additionally configured to analyze the frames or segments of the audio data that have been classified as human speech to determine if the speakers in the portions are the same person, with those points in the audio information that mark a change from one speaker to another speaker being selected as host times or candidate host times or having their candidate score increased.

In some embodiments where the host time identification module 106 is configured to identify and/or score host times or candidate host times by using attributes from the target digital content's audio data by classifying portions of the audio data as either representing speaking (by human), representing music, or representing silence, the host time identification module 106 may additionally be configured to further analyze the portions that have been classified as speech (by human) by comparing the MFCC features present in each portion to determine if the speakers in the portions are the same person, with those points in the audio data that mark a change from one speaker to another speaker being selected as host times or candidate host times or having their candidate score increased.

In some embodiments where the host time identification module 106 is configured to identify and/or score host times or candidate host times by using attributes from the target digital content's audio data by classifying portions of the audio data as either representing speaking (by human), representing music, or representing silence, the portions that have been classified as speaking (by human) may be further analyzed by comparing the MFCC features present in each to determine if the speakers of those portions are the same human, and where those points in the audio information that mark a change from one speaker to another speaker being selected as host times or candidate host times, or having their candidate score increased, a host time's candidate score may be correlated with the degree of confidence in or the prediction that the audio was speech spoken by different people.

In some embodiments, the host time identification module 106 is configured to identify and/or score host times or candidate host times by using attributes from the target digital content's audio data by classifying or scoring portions of the audio data according to the tone, sentiment, valence, or arousal, or other tonal or emotional quality (collectively, "emotional classification"), with those points in the audio data that mark a change from one emotional classification to another being selected as host times or candidate host times or having their candidate score increased.

In some embodiments, the host time identification module 106 is configured to identify and/or score host times or candidate host times by using attributes from the target digital content's audio data by classifying or scoring portions of the audio data according to the tone, sentiment, valence, or arousal, or other tonal or emotional quality (collectively, "emotional classification"), with those points in the audio data that mark a change from one emotional classification to another being selected as host times, where a host time's score or ranking may be determined based on the degree of confidence in or the predicted probability of the emotional classification of the portions of the audio data.

In some embodiments, the host time identification module 106 is configured to identify and/or score host times or candidate host times by using attributes from the target digital content's audio data to: (1) classify frames or segments of the audio data according to the nature of the sound it represents, such as speech (by human), music, silence, etc., with the points in the target digital content item that mark a change from one classification to a different classification being selected as host times or candidate host times (or determining the level of quality thereof); (2) additionally analyze the frames or segments of the audio data that have been classified as human speech to determine if the speakers of those portions are the same person, with those points in the audio data that mark a change from one speaker to another speaker having their candidate score increased; or (3) additionally analyze the frames or segments of the audio data that have been classified as human speeches by different speakers to determine if the emotional classifications are the same and select those points in the target digital content item where the emotional classification changes as host times or candidate host times or to increase their candidate scores.

In some embodiments where the host time identification module 106 is configured to identify and/or score host times or candidate host times by classifying portions of the audio data based on emotional classification, the classification is achieved by using a neural network model that has been trained using samples of digital content labelled by their emotional classifications and can outputs an emotional classification and, optionally, a probability score.

In some embodiments where the host time identification module 106 is configured to identify and/or score host times or candidate host times by classifying portions of the audio data as either representing speech (by human), music, or silence, the portions representing speech (by human) may be further analyzed using a regression analysis to predict the level of valence, arousal, or other emotional intensity, with those points in the audio data where there is a sufficiently large difference in the variation of emotional intensity in adjacent or neighboring portions (e.g., beyond a threshold distance) being selected as host times or candidate host times or having their host time candidate score increased.

In some embodiments where the host time identification module 106 is configured to identify and/or score host times or candidate host times by classifying portions of the audio data as either representing speech (by human), music, or silence, and where the portions of the audio data representing speech (by human) may be further analyzed using a regression analysis to predict the level of valence, arousal, or other emotional intensity, with those points in the audio data where there is a sufficiently large difference in the variation of emotional intensity in adjacent or neighboring portions (e.g., beyond a threshold distance) being selected as host times or candidate host times or having their host time score increased, the regression model models for the valence and arousal are trained on features, such as the zero crossing rate, energy, entropy of energy, spectral centroids, spectral spread, spectral entropy, spectral flux, spectral roll-off, MFCCs, chroma vector, and chroma deviation, extracted from audio files that have additionally been labelled with a score reflecting their corresponding valence and arousal.

In some embodiments, the content integration system 100 is configured to receive or retrieve the target digital content item and to use the host time identification module 106 to identify and/or score host times or candidate host times by searching the audio attributes of the target digital content for audio representations of language whose patterns and/or nature suggest the existence of a present or future host time (such as the end of a sentence).

In some embodiments, the content integration system 100 is configured to receive or retrieve the target digital content item, use the host time identification module 106 to identify or score host times by using speech recognition to parse the audio attributes of the target digital content, converting the speech into text, and then identify or predict, within that text and using NLP, representations of language whose patterns or nature suggest the existence of a present or future host time (such as the end of a sentence).

In some embodiments, the host time identification module 106 is configured to search the audio data of the target digital content, convert the audio data representing human speech to text using voice recognition, and identify or predict, using NLP, a period, comma, semicolon, ellipses, or any other pause or transition in the story of the target digital content, with the times in the target digital content item associated with the above items selected as host times or candidate host times.

In some embodiments, the host time identification module 106 is configured to analyze the audio data, parse it into text using NLP, search the text for and record themes, objects, people, textures, materials, shapes, locations, and activities inside one or more segments of the content, and then identify times or segments of the target digital content item that represent transitions from some themes, objects, people, textures, materials, shapes, locations, and activities to other objects, people, textures, materials, shapes, locations, and activities as host times.

In some embodiments, the host time identification module 106 is configured to identify and/or score host times or candidate host times in the target digital content by training one or more neural network models, where each neural network is used for a different purpose (e.g., theme recognition) and is trained on features extracted from (i.e., attributes extracted from the audio or the text that has been derived from the audio of) instances of target digital content (e.g., in the case of theme recognition, the objects, people, textures, materials, shapes, locations, and activities mentioned in the audio or the text derived from each instance), such that for each future input instance of target digital content, each model can output, instead of the typical classification or prediction output by the last layer in a neural network, a feature vector representing the output of the second-to-last layer. The feature vectors from the one or more neural network models can then be combined into a "master feature vector" or "content vector" for each future input instance of target digital content. By using the resulting one or more models to calculate the content vectors of segments of the target digital content item, the module can determine where the content vector changes sufficiently, take as its input a given frame and output a vector which, by comparison to prior segments' vectors, can determine the objects, people, textures, materials, shapes, locations, and activities depicted inside the segments. By passing sequential frames or segments of the target digital content (e.g., the frames or segments on both sides of a candidate host time identified through some other process) through the model, content vectors can be derived for those frames or segments and, when there is significant distance between the content vectors (which can be measured using, for example, cosine distance), it can be determined that there is a transition in the story in the target digital content item and the transition point represents a host time or candidate host time (or corresponds to a quality level of one).

In some embodiments, the host time identification module 106 is configured to identify and/or score host times or candidate host times in the target digital content item by taking sequential elements from the target digital content item and depositing their amplitude into an array, such as a time series, and, optionally, taking the average of the amplitudes of two or more elements of audio data so that they align with a particular frame of visual data. Next, the host time identification module 106 compares segments of the time series for example, by measuring their variance difference using the Bartlett variance test, with the output of the Bartlett variance test being a P value. When segments have different P values, the host time identification module 106 can determine that a host time or candidate host time exists between the segments (e.g. at their border).

In some embodiments, the host time identification module 106 is configured to identify and/or score host times or candidate host times in the target digital content item by taking sequential elements from the target digital content and depositing their MFCCs into an array, such as a time series, and, optionally, taking the average of the MFCCs of two or more elements of audio data so that they align with a particular frame of visual data. Next, the host time identification module 106 compares segments of the time series for example, by measuring their variance difference using the Bartlett variance test, with the output of the Bartlett variance test being a P value. When segments have different P values, the host time identification module 106 can determine that a host time or candidate host time exists between the segments (e.g. at their border).

In some embodiments, the host time identification module 106 is configured to identify and/or score host times or candidate host times by accepting as input the audio data of segments of the target digital content item, calculating the mean and variance of attributes including the zero crossing rate, energy, entropy of energy, spectral centroids, spectral spread, spectral entropy, spectral flux, spectral roll-off, MFCCs, chroma vector, and/or chroma deviation across that portion of the target digital content, and concluding that neighboring portions having sufficiently close mean and variance values for the attributes belong to the same story (i.e., there are no host times or candidate host times between them).

In some embodiments, the output of part of the host time identification using audio information is a sequence of element indices or frame numbers, each representing a host time or candidate host time.

In some embodiments, the output of part of the host time identification using audio information is a sequence of element indices or frame numbers, each representing a host time or candidate host time and each accompanied by a candidate score.

C. Host Time Identification Using Metadata

In some embodiments, the content integration system 100 is configured to receive or retrieve the metadata associated with the target digital content item and use the host time identification module 106 to identify and/or score host times or candidate host times in the target digital content item by analyzing the metadata associated with the target digital content item or its components, and searching for patterns or qualities that indicate the existence of host times or candidate host times (or determining their levels of quality).

In some embodiments, the host time identification module 106 is configured to identify and/or score host times or candidate host times in the target digital content by searching the metadata that is associated with the target digital content item and includes a script or transcript of the audio aspect of the target digital content for signifiers of transitions in the story, such as scene headings, scene endings, and indications of a commercial break.

In some embodiments, the host time identification module 106 is configured to use components of the metadata (such as genre, creator, channel, or previously identified breaks) as a feature when training machine learning-based classifiers to identify and/or score host times or candidate host times in the content.

In some embodiments, the host time identification module 106 is configured to use components of the metadata including previously identified breaks or host times to weight the scores of host times or candidate times.

In some embodiments, the output of part of the host time identification using metadata is a sequence of element indices or frame numbers, each representing a host time or candidate host time.

In some embodiments, the output of part of host time identification using metadata is a sequence of element indices or frame numbers, each representing a host time or candidate host time, and each accompanied by a candidate score.

D. Host Time Identification Using Combined Approaches

In some embodiments, the content integration system 100 is configured to receive or retrieve the audio components of the target digital content item and use the host time identification module 106 to identify and/or score host times or candidate host times in the target digital content item by analyzing, in parallel or succession, some combinations of the audio attributes of the target digital content, the visual attributes of the target digital content, and/or the metadata associated with the target digital content, and searching for patterns or qualities that indicate the existence of host times or candidate host times (and/or determining their levels of quality).

In some embodiments, the host time identification module 106 is configured to identify and/or score host times or candidate host times in the target digital content by first analyzing the available visual attributes of the target digital content, searching for patterns or qualities that suggest the existence of a candidate host time (or determine their levels of quality), and producing a set of candidate host times and, optionally, the associated candidate scores. The host time identification module 106 is also configured to, as a second step, analyzing the audio attributes associated with or neighboring those candidate host times in order to further refine or embellish the candidate scores of the candidate host times. Ordering the analysis in this manner can minimize the scope of the audio analysis, thus reducing computation. In addition, visual data is assigned a higher preliminary weight in determining that a given frame or time is a host time or candidate host time, which ensures that the times or frames passed to the audio analysis are only those that have meet the visual criteria.

In some embodiments where the host time identification module 106 is configured to identify and/or score host times or candidate host times in the target digital content item by first analyzing the available visual attributes of the target digital content item searching for patterns or qualities that suggest the existence of a candidate host time (or determining their levels of quality), producing a set of candidate host times and, optionally, the associated candidate scores, then, in a second analysis, analyzing the available audio attributes associated with or neighboring the candidate host times in order to further refine or embellish the candidate scores of the candidate host times, the audio attributes or audio data that is input into the second analysis includes a limited number of elements or frames on each side of a candidate host time. This narrows the analysis, thus reducing computation time.

Figure 7:
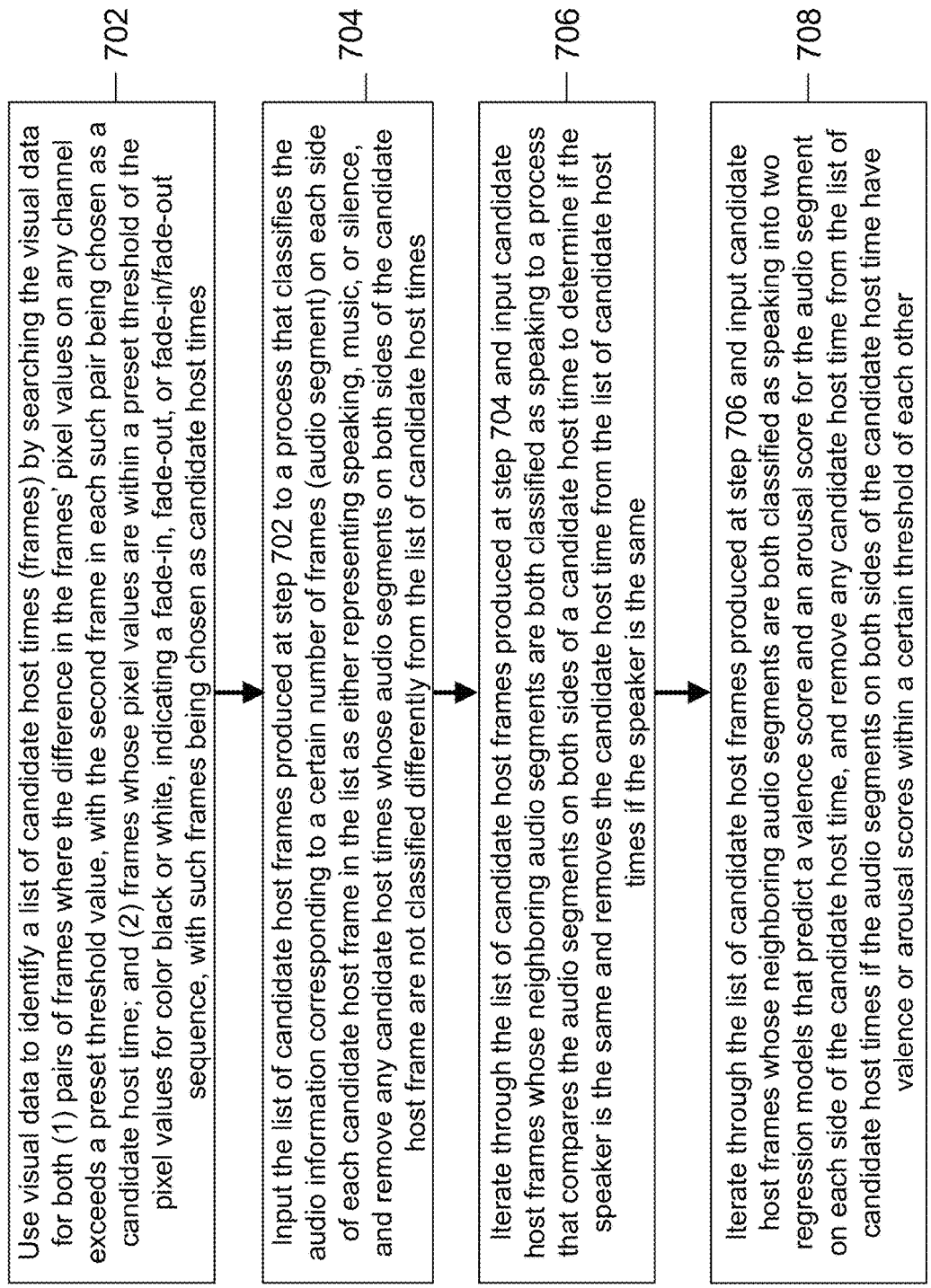
FIG. 7 illustrates an example of a method of host time identification using a combination of audio and visual data from a target digital content item in accordance with some embodiments.

FIG. 7 illustrates an example of a method of host time identification using a combination of visual data and audio data from target digital content in accordance with some embodiments. In step 702, the host time identification module 106 is configured to use visual data to identify a list of candidate host times (or candidate host frames) by searching the visual data for both (1) pairs of frames where the difference in the frames' pixel values on any channel exceeds a preset threshold value, with the second frame in each such pair being chosen as a candidate host time; and (2) frames whose pixel values are within a preset threshold of the pixel values for the color black or white, indicating a fade-in, fade-out, or fade-in/fade-out sequence, with such frames being chosen as candidate host times. In step 704, the host time identification module 106 is configured to input the list of candidate host frames representing the candidate host times produced at step 702 to a process that classifies the audio information corresponding to a certain number of frames ("audio segment") on each side of the candidate host frame as either representing speech (by human), music, or silence, and then removes any candidate host times for which the audio segments on the two sides are not classified differently. In step 706, the host time identification module 106 is configured to iterate through the list of candidate host frames produced at step 704, and the candidate host frames whose neighboring audio segments are both classified as speeches to a process that compares the audio segments on both sides of a candidate host time to determine if the speaker is the same and removes any candidate host time from the list of candidate host times if the speaker is the same. In step 708, the host time identification module 106 is configured to iterate through the list of candidate host frames produced at step 706, input those frames whose neighboring audio segments are both classified as speeches into two regression models that predict a valence score and an arousal score for the audio segment on each side of the candidate host time, and remove any candidate host time from the list of candidate host times if the audio segments on both sides of the candidate host frame have valence or arousal scores within a certain preset threshold of each other.

Figure 8:
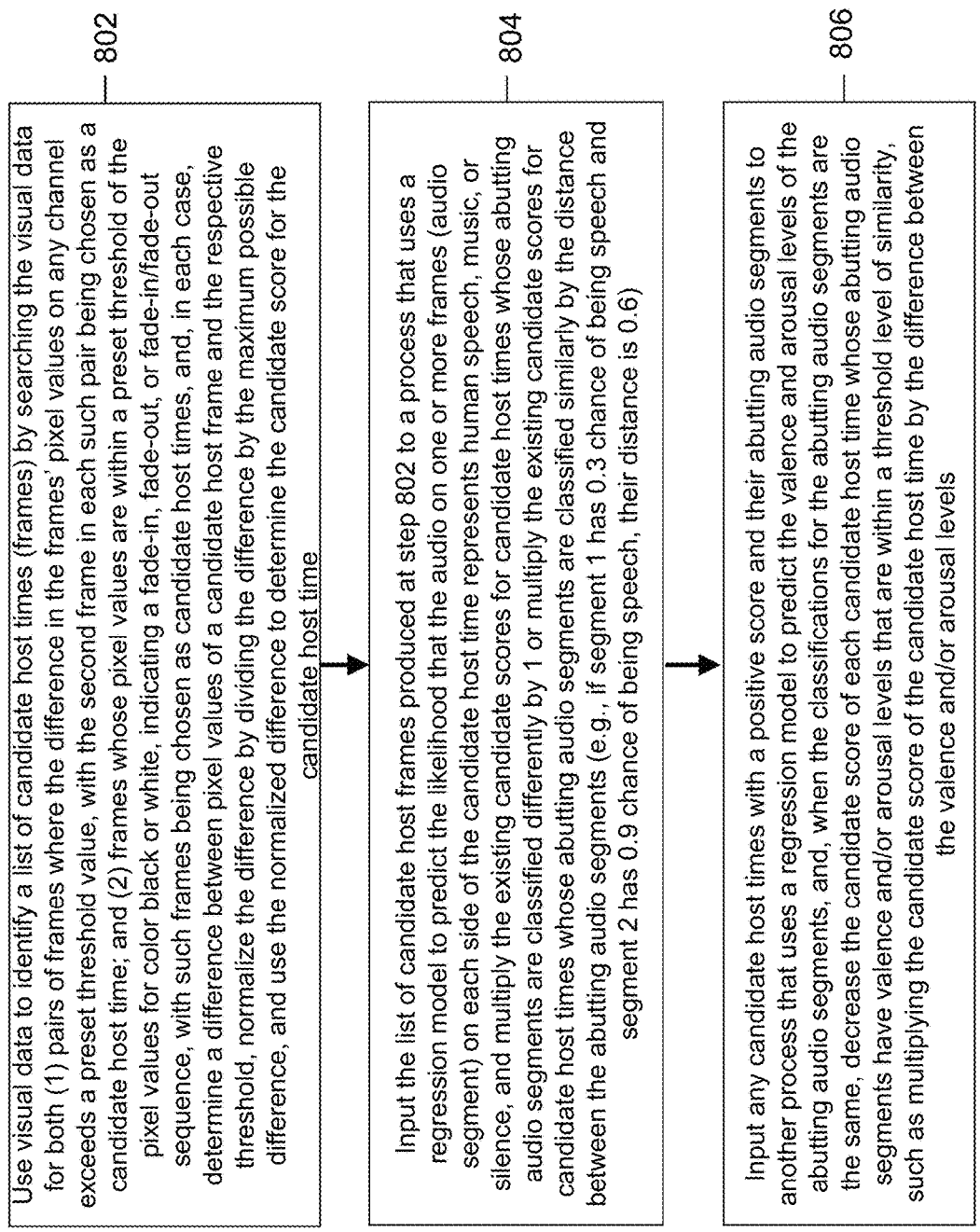
FIG. 8 illustrates an example of a method of host time identification using a combination of audio and visual data from a target digital content item in accordance with some embodiments.

FIG. 8 illustrates an example of a method of host time identification using a combination of audio and visual data from target digital content in accordance with some embodiments. In step 802, the host time identification module 106 is configured to use visual data to identify a list of candidate host times (or candidate host frames) by searching the visual data for both (1) pairs of frames where the difference in the frames' pixel values on any channel exceeds a preset threshold value, with the second frame in each such pair being chosen as a candidate host time; and (2) frames whose pixel values are within a preset threshold of the pixel values for color black or white, indicating a fade-in, fade-out, or fade-in/fade-out sequence, with such frames being chosen as candidate host times, and, in each case, determine the difference in pixel values between a candidate host time (or frame) and the corresponding threshold, normalize the difference by dividing the difference by the maximum possible difference in values, and use the normalized difference to determine the candidate score for the candidate host time or the candidate host time frame. In step 804, the host time identification module 106 is configured to input the list of candidate host frames produced at step 802 to a process that uses a regression model to predict the likelihood that the audio on one or more frames ("audio segment") on each side of the candidate host time frame represents human speech, music, or silence, multiply the existing candidate scores for those candidate host times whose abutting audio segments are classified differently by 1 and multiply the existing candidate scores for those candidate host times whose abutting audio segments are classified similarly by the distance between the abutting audio segments (e.g., if segment 1 has 0.3 chance of being speech and segment 2 has 0.9 chance of being speech, their distance is 0.6). In step 806, the host time identification module 106 is configured to input any candidate host times with a positive score, as well as their abutting audio segments, to another process that uses a regression model to predict the valence and arousal levels of the abutting audio segments, and, when the classification results are the same, decreases the candidate score of each candidate host time whose abutting audio segments possess valence and/or arousal levels that are within a threshold level of similarity, such as multiplying the candidate score by the difference between the predicted valence and arousal levels.

In some embodiments, host time locations in the target digital content item are predicted using a machine learning classifier trained on visual and/or audio attributes and/or the metadata from examples of host times labelled as positive or negative examples, the target digital content item or its components, and/or the metadata about the target digital content item. The machine learning classifier may take the form of, for example: (A) a linear classifier; (B) a Fisher's linear discriminant; (C) a logistic regression; (D) a naive Bayes classifier; (E) a perceptron; (F) a support vector machine; (G) a least squares support vector machine; (H) a quadratic classifier; (I) a kernel estimation; (J) a k-nearest neighbor (KNN) classifier; (K) decision trees; (L) random forests; (M) conditional random fields; (N) neural networks including but not limited to: (i) convolutional neural networks as described in Krizhevsky et al., *ImageNet Classification with Deep Convolutional Neural Networks*, NIPS (2012), which is herein incorporated by reference in its entirety (including the unique implementation where: the neurons in the network are grouped in different layers, each layer analyses windows of a frame and determines an output score for each pixel, the highest score pixels are the ones in windows that match a region of that frame that is suitable for hosting, in an aesthetically-pleasing and unobtrusive manner, source digital content, and the output scores are used to determine the coordinates of the regions of that frame that are best suitable for hosting, in an aesthetically-pleasing and unobtrusive manner, source digital content; and (ii) FMM neural networks; (O) learning vector quantization; (P) meta-algorithms, such as boosting and cascade classifiers described in Viola & Jones, *Robust Real-time Object Detection*, IJCV (2001), which is herein incorporated by reference in its entirety; or (Q) any combinations of the above.

In some embodiments where host times in the target digital content item are predicted using any type of machine learning classifier or neural network model, after the prediction, the host times or candidate host times may be additionally scored or have their candidate score weighted or adjusted based on factors, such as user data about most-viewed portions of the target digital content item or digital content in general, the proximity of the candidate host time to the start of the content (which is useful when inserting advertisements into videos, so as to ensure that the advertisement is likely to be shown before some percentage of viewers drop off), or, for the advertising use-case, advertisement time insertion policies or historical data tracking which portions of the digital content can host the most effective or most lucrative advertisement insertions.

In some embodiments, the host time identification module 106 is configured to identify and/or score host times or candidate host times in the target digital content item by training a neural network model using some combinations of audio or audio-derived (e.g., including text extracted from the audio) features, visual features, and metadata from segments of digital content items that are labelled as representing either positive or negative examples of host times or candidate host times, and then inputting segments of the target digital content item into the neural network model to determine whether they are positive or negative host times or candidate host times.

In some embodiments where host times are identified by inputting the visual or audio attributes and/or metadata regarding portions of the target digital content item into machine learning models in order to predict whether the portions of the target digital content item are positive or negative host times or to predict the probability that the input is a positive or negative host time, the resulting label, probability, or score may be included in the host time object as a candidate score or as host time metadata.

In some embodiments where host times in the target digital content item are identified using any type of machine learning model or neural network model, the model may be continually refined by retraining the model using new examples of positive or negative host times that are produced as users make manual selections, approvals, rejections, or customizations of identified host times.

Figure 9:
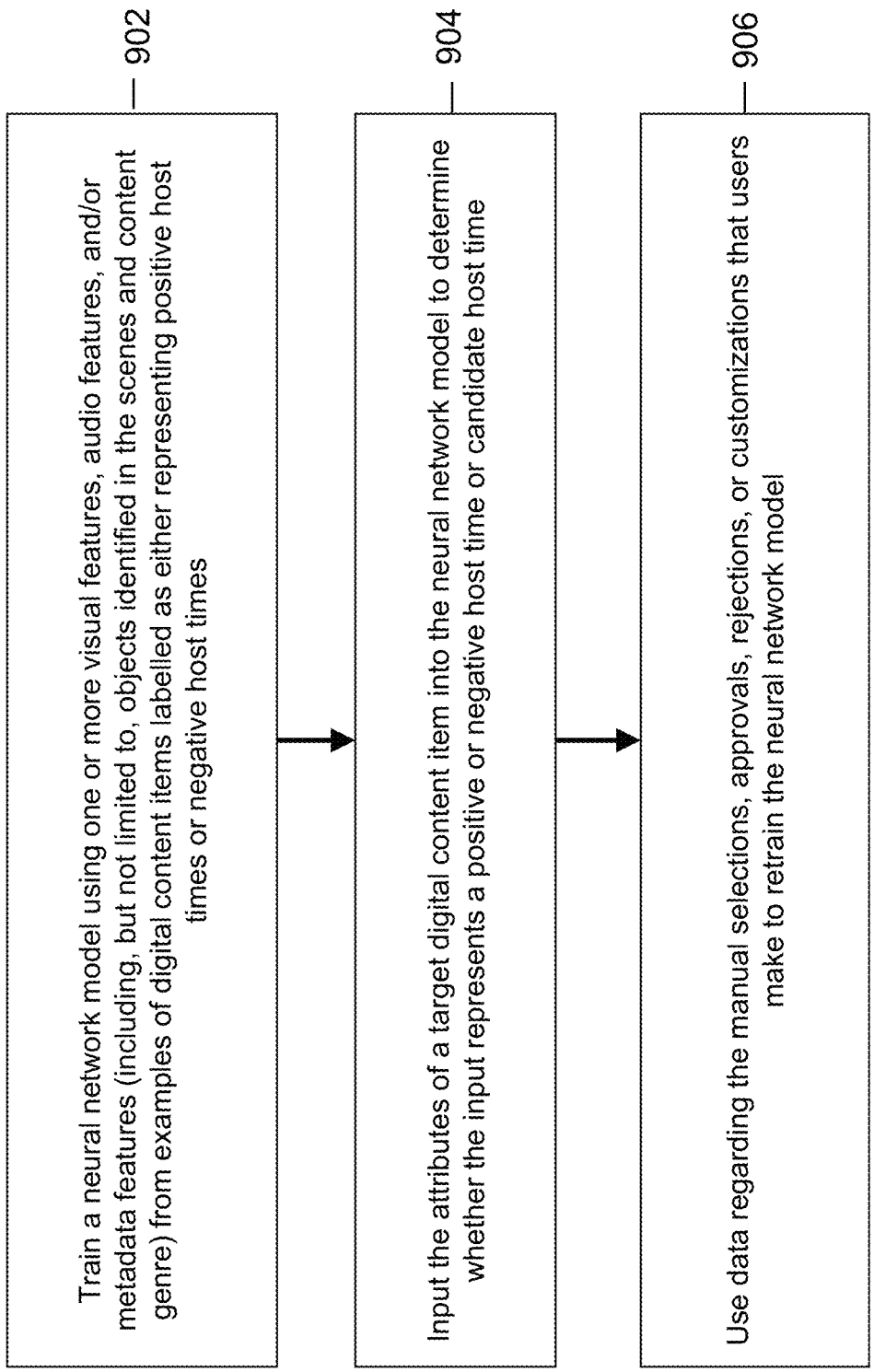
FIG. 9 illustrates an example of a method of using a neural network model to determine and optimize host times in accordance with some embodiments.

FIG. 9 illustrates an example of a method of using a neural network model to determine and optimize host times in accordance with some embodiments. In step 902, the content integration system 100 is configured to train a neural network model using one or more visual features, audio features, and/or metadata features (including, but not limited to, objects identified in the scenes and content genre) from examples of digital content items labelled as either representing positive host times or negative host times. In step 904, the host time identification module 106 is configured to input the attributes of a target digital content item into the neural network model to determine whether the input represents a positive or negative host time or candidate host time. In step 906, the content integration system 100 is configured to use data regarding the manual selections, approvals, rejections, or customizations that users make to retrain the neural network model.

In some embodiments where a host time is predicted using a machine learning model or a neural network model, the host times or candidate host times may additionally be weighted or scored based on factors including, but not limited to, historical data that tracks the portions of the target digital content item that are most likely to be watched by a viewer (e.g., based on data harvested from content integration module 118), past viewer drop off data and other data about viewer interactions ("viewer behavior data"), the various objects, people, textures, materials, shapes, locations, and activities that are depicted in or around the host time, the proximity to the start or end of the target content item (which is useful when inserting advertisements into videos so as to ensure that the advertisement is likely to be shown before some percentage of viewers drop off), or the proximity to narrative events within the target content item, such as the end of an "act" or climax.

Figure 10:
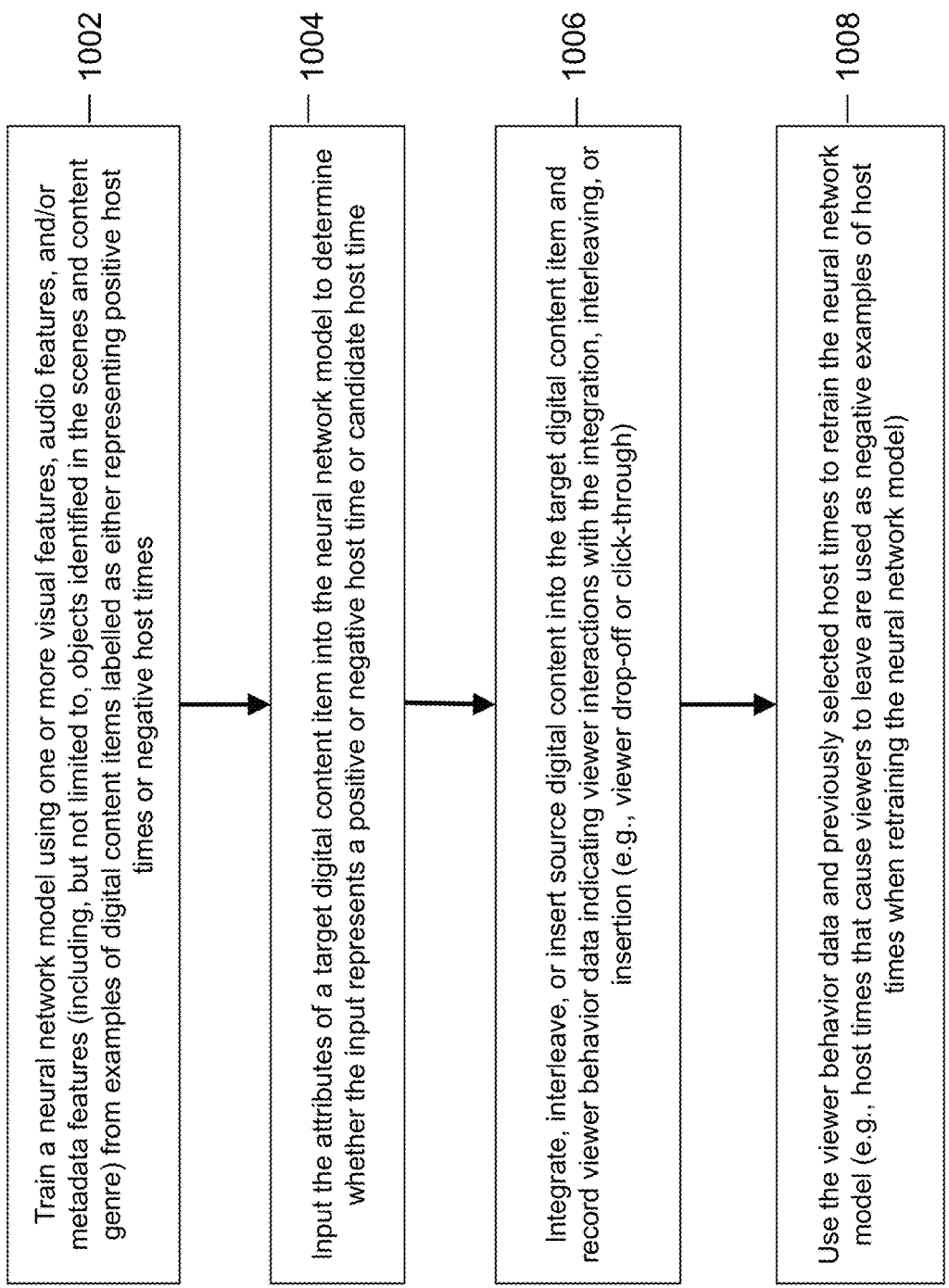
FIG. 10 illustrates an example of a method of using a neural network model to determine and optimize host times in accordance with some embodiments.

FIG. 10 illustrates an example of a method of using a neural network model to determine and optimize host times in accordance with some embodiments. In step 1002, the content integration system 100 is configured to train a neural network model using one or more visual features, audio features, and/or metadata features (including, but not limited to, objects identified in the scenes and content genre) from examples of digital content items labelled as either representing positive host times or negative host times. In step 1004, the host time identification module 106 is configured to input the attributes of a target digital content item into the neural network model to determine whether the input represents a positive or negative host time or candidate host time. In step 1006, the identified host times are used to integrate, interleave, or insert source digital content into the target digital content item and the way that viewers interact with the integration, interleaving, or insertion (e.g., viewer drop-offs or click-throughs) is observed and recorded. In step 1008, the content integration system 100 is configured to use the viewer behavior data and previously selected host times to retrain the neural network model (e.g., host times that cause viewers to leave are used as negative examples of host times when retraining the model).

In some embodiments, the host time identification module 106 is configured to identify and/or score host times or candidate host times in the target digital content item by training one or more neural networks on both audio and visual features (e.g., a neural network model dedicated to object recognition and trained on visual features and a neural network model dedicated to sentiment recognition and trained on text derived from audio data) from instances of digital content items and deriving models that can, given a segment of a target digital content item, output one or more feature vectors that can be combined into a content vector, using the trained model to determine content vectors for segments of the target digital content, and, where segments of the target digital content item have sufficiently different content vectors (which can be measured, for example, by taking the cosine distance), determining that there is a transition in the story in the target digital content item, and thus, there is a host time or candidate host time between the segments.

Figure 11:
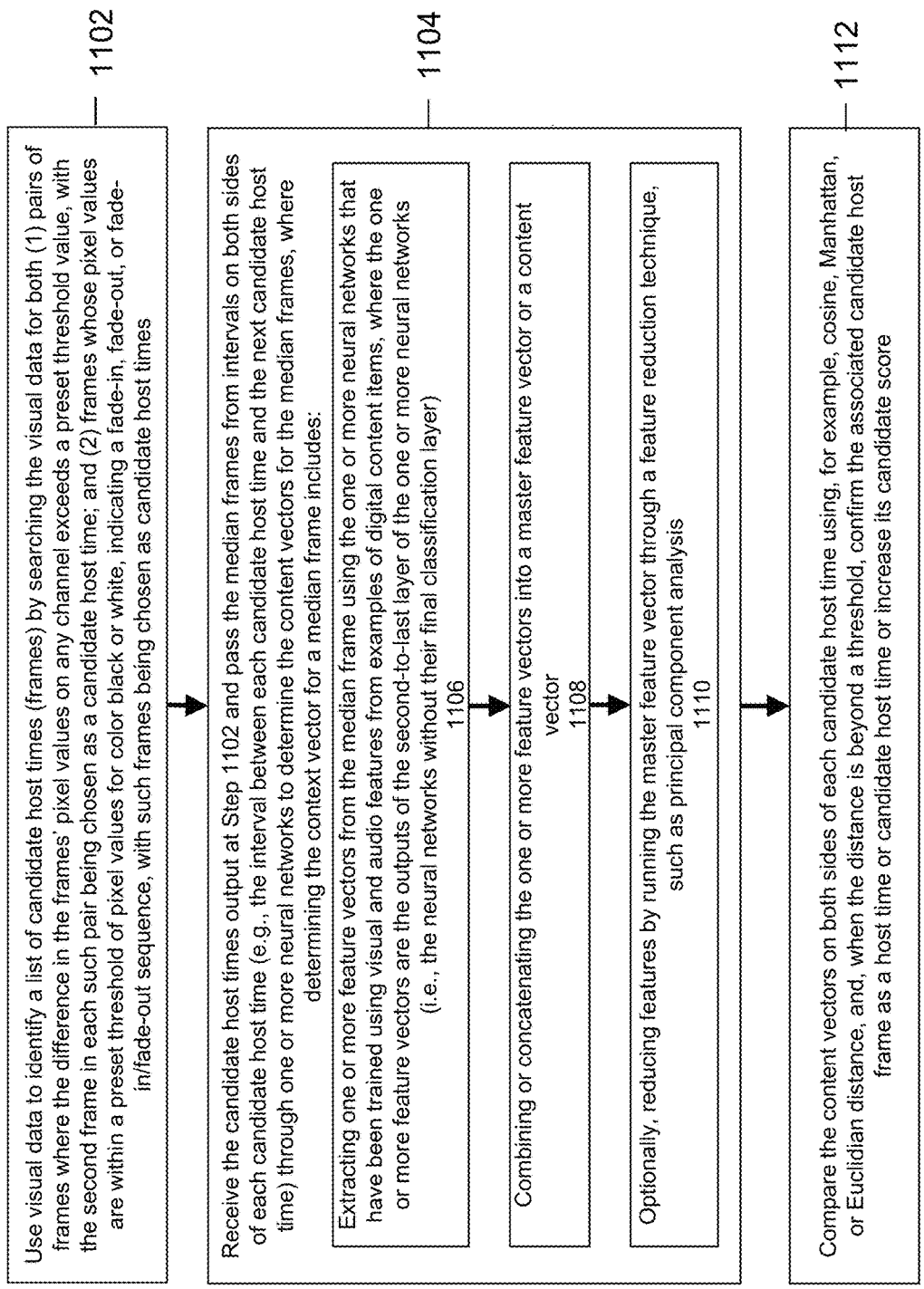
FIG. 11 illustrates an example of a method of host time identification using a combination of audio and visual data from a target digital content item in accordance with some embodiments.

FIG. 11 illustrates an example of a method of host time identification using a combination of audio and visual data from target digital content in accordance with some embodiments. In step 1102, the host time identification module 106 is configured to use visual data to identify a list of candidate host times (or frames) by searching the visual data for both (1) pairs of frames where the difference in the frames' pixel values on any channel exceeds a preset threshold value, with the second frame in each such pair being chosen as a candidate host time; and (2) frames whose pixel values are within a preset threshold of the pixel values for color black or white, indicating a fade-in, fade-out, or fade-in/fade-out sequence, with such frames being chosen as candidate host times. In step 1104, the content integration system 100 is configured to accept the candidate host times output at step 1102 as input and pass the median frames from the intervals on both side of each candidate host time (e.g., the interval between each candidate host time and the next candidate host time) through one or more neural networks to determine the content vectors for the median frames, where determining the content vector for a median frame includes operations in steps 1106-1110. In step 1106, the content integration system 100 is configured to extract one or more feature vectors from the median frame using the one or more neural networks that have been trained using visual and audio features from examples of digital content items, where the one or more feature vectors are the outputs of the second-to-last layer of the one or more neural networks (i.e., the neural networks without their final classification layer). In step 1108, the content integration system 100 is configured to combine or concatenate the one or more feature vectors into a master feature vector or a content vector. Optionally, in step 1110, feature reduction is performed by running the master feature vector through a feature reduction technique, such as principal component analysis ("PCA") described in Fodor, *A Survey of Dimension Reduction Techniques* (2002), which is incorporated by reference herein in its entirety, to reduce its dimensions. In step 1112, the content integration system 100 is configured to compare the content vectors on both sides of each candidate host time using, for example, the cosine, Manhattan, or Euclidian distance, and, when the distance is beyond a threshold, the corresponding candidate host frame can be confirmed as a host time or candidate host time or have its candidate score increased.

Figure 12:
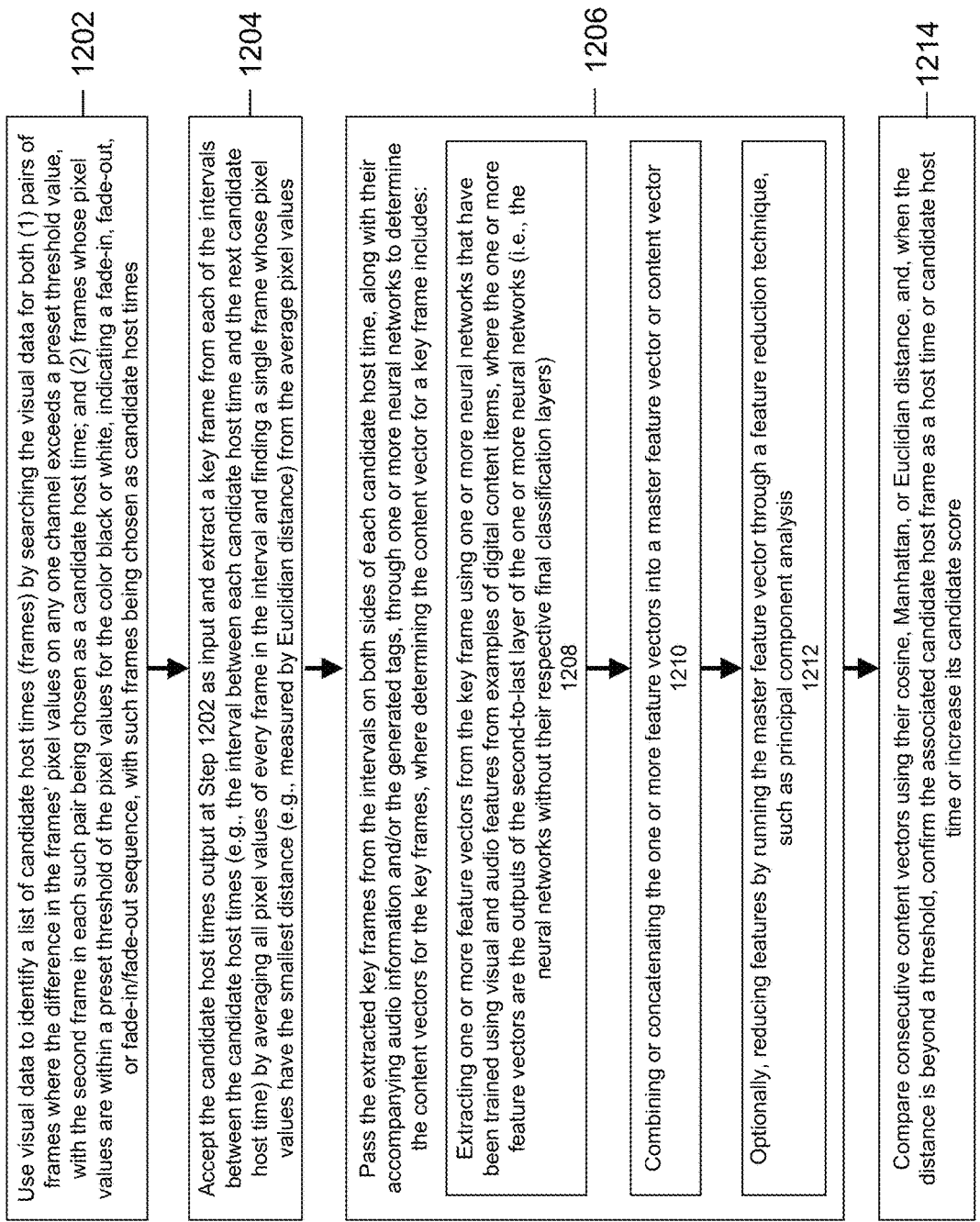
FIG. 12 illustrates an example of a method of host time identification using a combination of audio and visual data from a target digital content item in accordance with some embodiments.

FIG. 12 illustrates an example of a method of host time identification using a combination of audio and visual data from target digital content in accordance with some embodiments. In step 1202, the host time identification module 106 is configured to use visual data of the target digital content to identify a list of candidate host times (or frames) by searching the visual data for both (1) pairs of frames where the difference in the frames' pixel values on any channel exceeds a preset threshold value, with the second frame in each such pair being chosen as a candidate host time; and (2) frames whose pixel values are within a preset threshold of the pixel values for color black or white, indicating a fade-in, fade-out, or fade-in/fade-out sequence, with such frames being chosen as a candidate host time. In step 1204, the content integration system 100 is configured to accept the candidate host times output at step 1202 as input and extract a key frame from each of the intervals between the candidate host times (e.g., the interval between each candidate host time and the next candidate host time) by averaging all pixel values of every frame in an interval and finding a single frame whose pixel values have the smallest distance (e.g., measured by Euclidian distance) from the average pixel values. In step 1206, the content integration system 100 is configured to pass the extracted key frames from the intervals on both sides of each candidate host time, along with their accompanying audio information and/or the generated tags, through one or more neural networks to determine the content vectors for the key frames, where determining the content vector for a key frame includes operations in Steps 1208-1212. In step 1208, the content integration system 100 is configured to extract one or more feature vectors from the key frame of the target digital content using one or more neural networks that have been trained using visual and audio features from examples of digital content items, where the one or more feature vectors are the outputs of the second-to-last layer of the one or more neural networks (i.e., the neural networks without their respective final classification layers). In step 1210, the content integration system 100 is configured to combine or concatenate the one or more feature vectors into a master feature vector or a content vector. Optionally, in step 1212, feature reduction is performed on the master feature vector using a feature reduction technique, such as PCA, to reduce its dimensions. In step 1214, content vectors for consecutive key frames from consecutive intervals can be compared by using, for example, their cosine, Manhattan, or Euclidian distance (or difference), and, when the distance is beyond a threshold, the associated candidate host frame (e.g., the candidate host frame between the two consecutive key frames) can be confirmed as a host time or candidate host time or have its candidate score increased.

Figure 13:
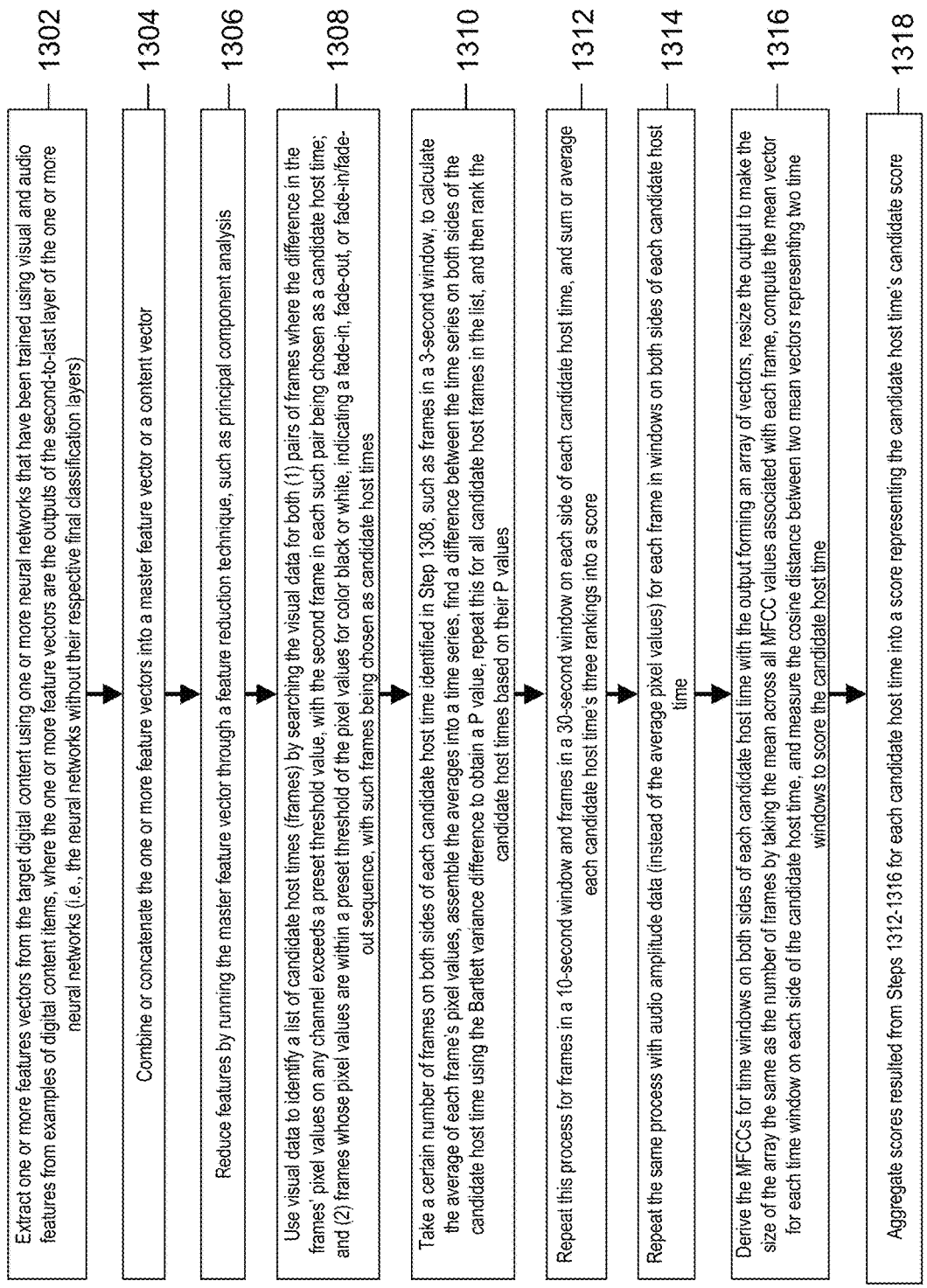
FIG. 13 illustrates an example of a method of host time identification using a combination of audio and visual data from a target digital content item in accordance with some embodiments.

FIG. 13 illustrates an example of a method of host time identification using a combination of audio and visual data from target digital content in accordance with some embodiments. In step 1302, the content integration system 100 is configured to extract one or more features vectors from the target digital content using one or more neural networks that have been trained using visual and audio features from examples of digital content items, where the one or more feature vectors are the outputs of the second-to-last layer of the one or more neural networks (i.e., the neural networks without their respective final classification layers). In step 1304, the content integration system 100 is configured to combine or concatenate the one or more feature vectors into a master feature vector or a content vector. Optionally, in step 1306, feature reduction is performed on the master feature vector using a feature reduction technique, such as PCA, to reduce its dimensions. In step 1308, the host time identification module 106 is configured to use visual data to identify a list of candidate host times (or frames) by searching the visual data for both (1) pairs of frames where the difference in the frames' pixel values on any channel exceeds a preset threshold value, with the second frame in each such pair being chosen as a candidate host time; and (2) frames whose pixel values are within a preset threshold of the pixel values for color black or white, indicating a fade-in, fade-out, or fade-in/fade-out sequence, with such frames being chosen as candidate host times. In step 1310, the content integration system 100 is configured to take a certain number of frames on both sides of each candidate host time identified in step 1308, such as frames in a 3-second window, calculate the average of each frame's pixel values, assemble those averages into a time series, find a difference between the time series on both sides of the candidate host time using the Bartlett variance difference to obtain a P value, repeat these operations for all candidate host frames in the list, and then rank the candidate host times based on the P values. In step 1312, the content integration system 100 is configured to repeat the process in step 1310 for frames in a 10-second window and frames in a 30-second window on both sides of each candidate host time, and then sum or average each candidate host time's three rankings into a score. For example, for each candidate host time, the three rankings can be summed to obtain an overall ranking, which is then normalized to a range from 0 to 1. In step 1314, the content integration system 100 is configured to repeat the same process described in Steps 1310 and 1312 using audio amplitude data (instead of the average pixel values) for each frame in time windows on both sides of each candidate host time, such as taking the average of the audio values associated with a given frame (if there are more than one audio data point per visual frame of the target digital content item). In step 1316, the content integration system 100 is configured to derive the MFCCs for the time windows on both sides of each candidate host time with the output being an array of vectors, resize the output to make the size of the array the same as the number of frames by taking the mean across all MFCCs values associated with each frame, compute the mean vector for each time window on a side of the candidate host time, and measure the cosine distance between the two mean vectors for the time windows on both sides of the candidate host time to score the candidate host time. In step 1318, the scores resulting from Steps 1312-1316 for each candidate host time are aggregated to generate a score representing the candidate score of the candidate host time. For example, a linear regression model can be built and trained using previously studied videos, and the final score for each candidate host time is calculated by applying the scores obtained from Steps 1312-1316 to the linear regression model, where the scores obtained through 1312-1316 are treated as explanatory variables, and the final score of is regarded as the scalar dependent variable.

Figure 14:
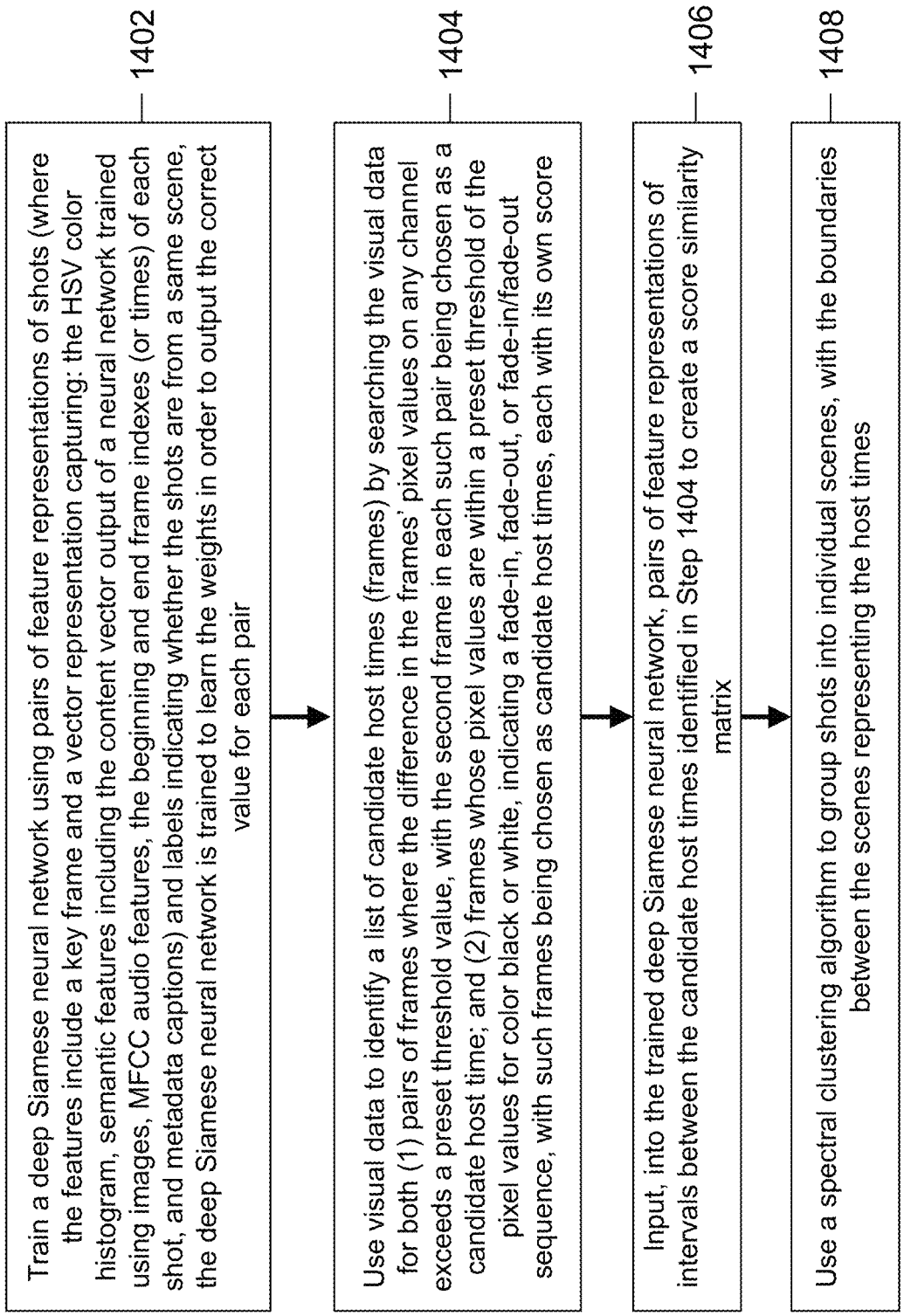
FIG. 14 illustrates an example of a method of host time identification using a combination of audio, visual data, and metadata from a target digital content item in accordance with some embodiments.

FIG. 14 illustrates an example of a method of host time identification using a combination of audio, visual data, and metadata from target digital content in accordance with some embodiments. In step 1402, the content integration system 100 is configured to train a deep Siamese neural network (which is a neural network that can predict an output score of similarity between two things) using pairs of feature representations of shots (where the features include a key frame and a vector representation capturing: the HSV color histogram, semantic features including the content vector output of a neural network trained on images, MFCC audio features, the beginning and end frame index (or time) of each shot, and metadata captions) and labels indicating whether those shots are from a same scene. The deep Siamese neural network is trained to learn the weights in order to output the correct value for each pair. In step 1404, the host time identification module 106 is configured to use visual data to identify a list of candidate host times (or frames) by searching the visual data for both (1) pairs of frames where the difference in the frames' pixel values on any channel exceeds a preset threshold value, with the second frame in each such pair being chosen as a candidate host time; and (2) frames whose pixel values are within a preset threshold of the pixel values for color black or white, indicating a fade-in, fade-out, or fade-in/fade-out sequence, with such frames being chosen as a candidate host time, each with its own score. In step 1406, the content integration system 100 is configured to input the pairs of intervals between the candidate host times identified in step 1404 into the trained deep Siamese neural network to create a score similarity matrix. In step 1408, the content integration system 100 is configured to use a spectral clustering algorithm to group shots into individual scenes, with the boundaries between the scenes representing the host times.

Figure 15:
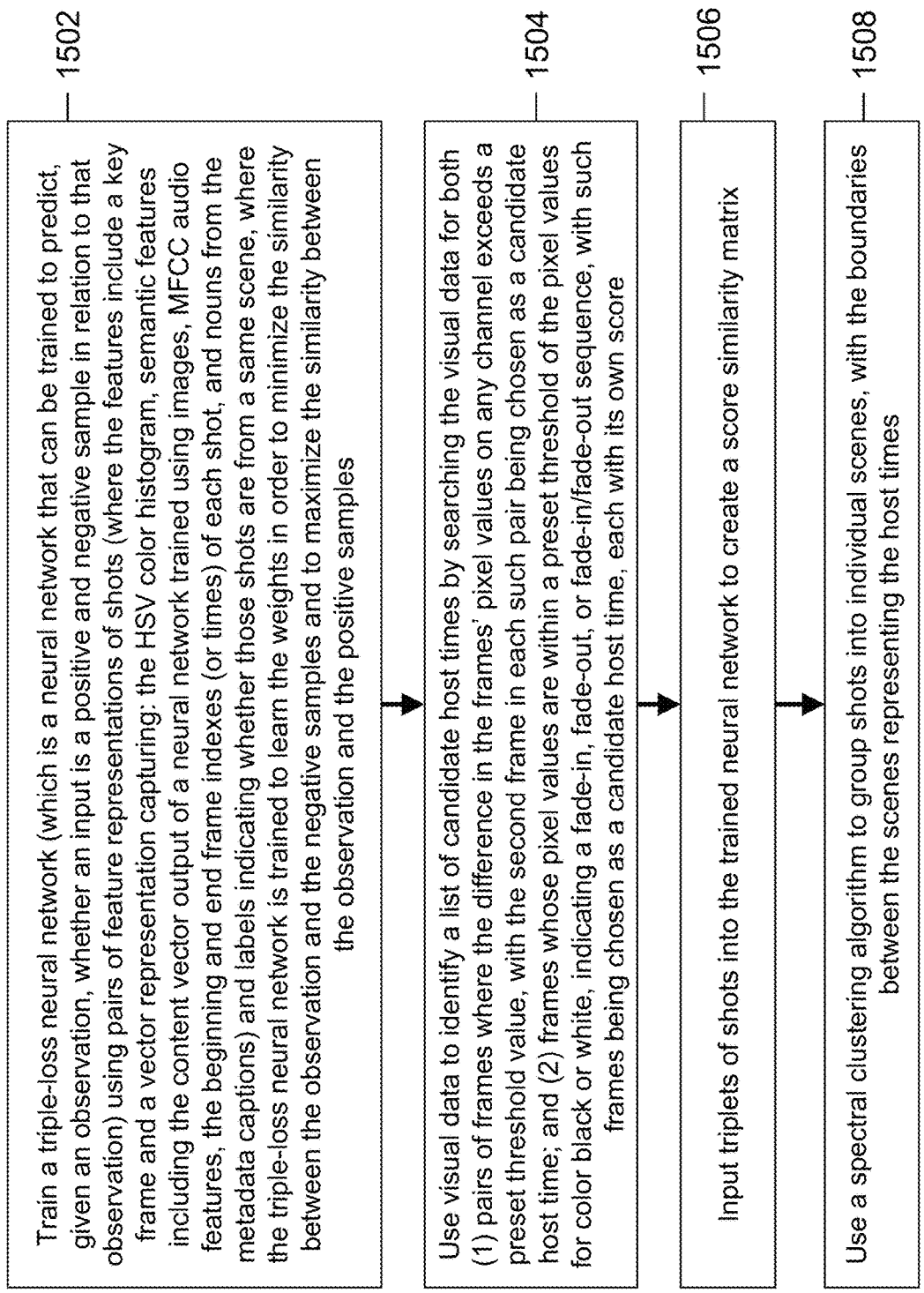
FIG. 15 illustrates an example of a method of host time identification using a combination of audio, visual data, and metadata from a target digital content item in accordance with some embodiments.

FIG. 15 illustrates an example of a method of host time identification using a combination of audio, visual data, and metadata from target digital content in accordance with some embodiments. In step 1502, the content integration system 100 is configured to train a triple-loss neural network (which is a neural network that can be trained to predict, given an observation, whether an input is a positive and negative sample in relation to that observation) using pairs of feature representations of shots (where the features include a key frame and a vector representation capturing: the HSV color histogram, semantic features including the content vector output of a neural network trained using images, MFCC audio features, the beginning and end frame indexes (or times) of each shot, and nouns from the metadata captions) and labels indicating whether those shots are from a same scene. The triple-loss neural network is trained to learn the weights in order to minimize the similarity between the observation and the negative samples and to maximize the similarity between the observation and the positive samples. In step 1504, the host time identification module 106 is configured to use visual data to identify a list of candidate host times by searching the visual data for both (1)

pairs of frames where the difference in the frames' pixel values on any channel exceeds a preset threshold value, with the second frame in each such pair being chosen as a candidate host time; and (2) frames whose pixel values are within a preset threshold of the pixel values for color black or white, indicating a fade-in, fade-out, or fade-in/fade-out sequence, with such frames being chosen as a candidate host time, each with its own score. In step 1506, the content integration system 100 is configured to input triplets of shots into the trained neural network to create a score similarity matrix. In step 1508, the content integration system 100 is configured to use a spectral clustering algorithm to group shots into individual scenes, with the boundaries between the scenes representing the host times.

III. Host Time Approval, Storage, Curation, and Customization Prior to Source Digital Content Selection In some embodiments, at any point during or after the host time identification, the host times identified by the host time identification module 106 may be subject to an approval, customization, rejection, or addition process.

In some embodiments, at any time during or after the identification of host times by host time identification module 106, host time defining data is returned, for example, through the distribution module 112, to the host time approval module 110, where a selection, approval, rejection, or customization input or message is accepted, the input or message including any approvals, changes to, rejections of, or additions to the host times identified by host time identification module 106. The message or resultant list of host times are then transmitted to the distribution module 112 or host time identification module 106.

In some embodiments, at any point during or after the host time identification, the host time data is transmitted to a host time approval module 110, which is also the device, computer, application, or process where the content is created (such as a mobile phone).

In some embodiments, the host time approval module 110 displays the host times to the user by playing the target digital content to the user, and inserting sample source digital content into the target digital content item at the host times, or otherwise visually signaling the host times to the user.

In some embodiments, at any point during or after the approval, customization, rejection of, or additions to the host times identified by host time identification module 106, the host time approval module 110 may transmit a message containing data identifying whether or not particular host times have been approved or rejected, or, where customizations, changes, or additions have been made, data describing the new or altered host times to the host time identification module 106, which can then make the necessary changes to the list of the candidate host times.

In some embodiments, at any point during or after the approval, customization, rejection of, or additions to the host times identified by host time identification module 106, the host time approval module 110 may transmit a message containing data identifying whether or not particular host times have been approved or rejected, or, where customizations, changes, or additions have been made, data describing the new or altered host times to the storage module 114, which can then make the necessary changes to the list of the candidate host times.

In some embodiments, in response to the approval, customization, rejection of, or additions to the host times requested by host time approval module 110, the host time identification module 106 and the storage module 114 do not delete any previously identified host times that have been rejected or altered, but merely change the states of the identified host times to reflect the fact that they have been rejected or altered.

In some embodiments, at any point during or after host time identification, the storage module 114 is configured to store the host time defining data, host time object, the source digital content transformation object, the target digital content, and/or the metadata about the target digital content. In some embodiments, the storage module 114 can be part of the distribution module 112. In other embodiments, the storage module 114 can be part of the host time identification module 106 or can be co-located with the host time identification module 106.

In some embodiments, at any point during or after the host time identification or storage, the content creator may transmit a message to the distribution module 112, the storage module 114, or the host time identification module 106 with new parameters or constraints on the host times. This results in the distribution module 112, the storage module 114, or the host time identification module 106 adjusting the list of candidate host time based on the new constraints. As an example, the new constraints may dictate a different frequency of source digital content integrations, insertions, or interleavings. Based on this, the distribution module 112, the storage module 114, or the host time identification module 106 will choose a smaller or larger list of host time that meet the new constraints.

In some embodiments, at any point during or after the identification of host times by host time identification module 106, the host times may be curated one or more times, so that the desired number of source digital content integrations, interleavings, or insertions can be made.

In some embodiments, at any point during or after the identification of host times by host time identification module 106 and the subsequent storage, the distribution module 112, the storage module 114, or the host time identification module 106 may receive, one or more times, data in the form of an integer representing the number of source digital content integrations, interleavings, or insertions that should be made, data in the form of portions of the content (e.g. the first minute) where integrations, interleavings, or insertions should not be made, and/or data about how far apart host times are to be spaced, and adjust the states of particular host times or candidate host times so that source digital content is not integrated, interleaved, or inserted during those host times (as least as long as their states remain as such).

In some embodiments, when a module, such as the distribution module 112, the storage module 114, or the host time identification module 106, receives data in the form of an integer representing the number of source digital content integrations, interleavings, or insertions to be made, it responds to the request by sorting the list of host times according to their candidate scores or other criteria and then selecting the highest ranked host times in a number that matches the integer.

In some embodiments, when a module, such as the distribution module 112, the storage module 114, or the host time identification module 106, receives data in the form of an integer representing the number of source digital content integrations, interleavings, or insertions to be made, it responds to the request by dividing the duration of the content by the integer into equal-length segments. Within each of the segments, host times that are within a threshold distance from the border between segments may be ruled out, and the module then chooses the highest ranking host time or, if there is none, selects a replacement host time in a neighboring segment or returns the middle frame of the segment.

In some embodiments, when a module, such as the distribution module 112, the storage module 114, or the host time identification module 106, receives data in the form of an integer representing the number of source digital content integrations, interleavings, or insertions to be made, the module responds to the request by dividing the duration of the content by the integer into equal-length segments, and, for the host times within each segment, negatively weights or otherwise penalizes each candidate host time's candidate score based on the distance between the candidate host time and the segment's middle frame (i.e., halfway through the segment in time). The module then chooses the host times within each segment with the highest weighted score.

In some embodiments, when a module, such as the distribution module 112, the storage module 114, or the host time identification module 106, receives data in the form of an integer representing the number of source digital content integrations, interleavings, or insertions to be made as well as the minimum space between the host times, the module responds to the request by using a backtracking optimization algorithm that finds the maximum score for a certain number of host times that have sufficient distance between them. A backtracking algorithm is one that finds all (or some) solutions to some computational problems, such as constraint satisfaction problems, and works by incrementally building candidates for the solutions and abandoning each partial candidate c ("backtracks") as soon as it determines that c cannot possibly be built as a valid solution.

In some embodiments, when a module, such as the distribution module 112, the storage module 114, or the host time identification module 106, receives data in the form of an integer representing the number of source digital content integrations, interleavings, or insertions to be made as well as data about the minimum space between the host times, the module responds to the request by using a backtracking optimization algorithm that finds the maximum score for a certain number of host times that have sufficient distance between them, and only searches in limited time window within the content that surround the middle frames of equal-length segments of the content created by dividing the duration of the content by the number of host times desired. This helps to reduce the computation costs.

In some embodiments, multiple versions of the list of candidate host times may be created or stored, where each version of the list corresponds to a certain device, user, or channel. When a viewing or distribution of the target digital content item is requested from the corresponding device, user or channel, the corresponding version of the list of candidate host times is used to integrate, interleave, or insert source digital content into the target digital content item.

In some embodiments, the host time identification module 106, the distribution module 112, or the content integration module 118 may be configured to use incoming data about each individual impression to alter or finalize the list of host times to better suit the particular impression.

In some embodiments, the host time identification module 106, the distribution module 112, or the content integration module 118 may be configured to use the initial list of candidate host times to create a default XML object, such as a VMAP, that can be delivered to a display module, such as a video player embedded in a web page, such that the display module can use the VMAP as a timeline for interleaving source digital content in the form of advertisements (e.g., mid-rolls or ad pods) into the target digital content item, as well as one or more custom XML objects, such as a VMAP, that are specialized for specific user IDs, IP addresses, geographic areas, times of day, devices, or other impression characteristics. These specialized versions may be informed by past data about the effectiveness of integrations, interleavings, or insertions of source digital content into target digital content item where the impression involved those specific user IDs, IP addresses, geographic areas, times of day, devices, or other impression characteristics. As new impressions of the target digital content item are requested in the display module (e.g., in the video player by visitors to the website), data about that the impression (such as the user ID or IP address, geographic area, time of day, or device) can be used to fetch the custom XML object, such as a VMAP, and use the timeline in it to integrate, interleave, or insert source digital content into the target digital content. Or, where no impression data is available, the default XML object, such as a VMAP, may be used.

In some embodiments, the host time identification module 106, the distribution module 112, or the content integration module 118 may be configured to use the initial list of candidate host times to create a default XML object, such as a VMAP, that can be delivered to a display module, such as a video player embedded in a web page, such that the display module can use the VMAP as a timeline for interleaving source digital content in the form of advertisements (e.g., mid-rolls or ad pods) into the target digital content item. In addition, the host time identification module may gather data about past individual impressions of target digital content such as specific user IDs, IP addresses, geographic areas, times of day, devices, or other impression characteristics. The data about past impressions may indicate the effectiveness of integrations, interleavings, or insertions of source digital content into the target digital content item, where the impression involves the specific user IDs, IP addresses, geographic areas, times of day, devices, or other impression characteristics. As new impressions of the target digital content are requested in the display module (e.g., in the video player by visitors to the website), data about the impressions (such as the user ID or IP address, geographic area, time of day, or device) can be compared to past data associated with other impressions and used to automatically refine the list of candidate host times in real time and create a specialized custom XML object, such as a VMAP, whose timeline can be used to integrate, interleave, or insert source digital content into the target digital content item for the incoming new impressions. As an example, some devices may only have the top three candidate host times selected and added to their XML objects, such as a VMAP, whereas other devices may have all of the candidate host times added to their XML objects. In some instances, the custom XML object (e.g., a VMAP) can be generated and stored at the time of host time identification.

IV. Selecting and Transforming Source Digital Content

In some embodiments, before, during, or after the identification of host times or candidate host times, the content integration system 100 is configured to select or obtain source digital content to be integrated, inserted, or interleaved with the target digital content item using the source digital content selection module 116.

In some embodiments, the source digital content selection module 116 is a marketplace, advertisement server, or exchange.

In some embodiments, the source digital content selection module 116 uses information about the host times (such as their exact positions and frequency), candidate scores, metadata about the original content (such as author or distribution channel), and/or data about the individual viewing impression to aid the selection of the source digital content, for example, by using such data to match the target digital content with source digital content that has matching or compatible data).

In some embodiments, the source digital content selection module 116 uses the objects, people, textures, materials, shapes, locations, and activities that are depicted in the target digital content and are identified during the host time identification process to aid the selection of the source digital content, for example, by using such data to match the target digital content with source digital content that has matching or compatible data.

In some embodiments, the source digital content selection module 116 uses the content vectors associated with the target digital content item as well as content vectors created for the source digital content to aid the selection of the source digital content. For example, the content vectors for the target digital content item can be generated by passing the target digital content item through a neural network model that has been trained on segments of content items whose features include the language, objects, people, textures, materials, shapes, locations, and activities they depict where each segment has a vector assigned to it. The trained neural network model takes as its input a given segment of the target digital content item and outputs a vector which, by comparison to prior segments' vectors, can predict a content vector that estimates the language, objects, people, textures, materials, shapes, locations, and activities depicted inside the input segment. The content vectors for the source digital content items can be used to match the target digital content to source digital content. One of the advantages of using the content vectors is that the distance between two segments or two content items can be measured relatively quickly (e.g. using the cosine distance), and thus the comparison can be done rapidly and even within, for example, real time bidding environments.

In some embodiments, the source digital content selection module 116 uses the candidate score associated with each host time to select appropriate source digital content, where the host times with lower candidate scores are matched with source digital content items that are shorter or deemed to be more engaging.

In some embodiments, the source digital content selection module 116 receives the hot region object or some other data structures for host time objects, such as a VMAP.

In some embodiments, the data that is sent to the source digital content selection module 116 is customized for the impression, for example, based on the device that the integrated digital content will be displayed on or based on the particular viewer.

V. Integration, Interleaving, or Insertion and Subsequent Optimization and Model Improvement In some embodiments, after host times or candidate host times have been identified, the content integration system 100 is configured to integrate, interleave, or insert the source digital content into the target digital content item ("content integration") using the content integration module 118.

In some embodiments, the content integration module 118 uses the transformation object to transform a source digital content item prior to integrating it into the target digital content item. These transformations may affect the visual and/or audio information of the source digital content.

In some embodiments, after or while source digital content is integrated, interleaved, or inserted into the target digital content item and displayed to the viewer, the content integration module 118, the interface 122, or the point of display collects and transmits behaviors about the user views or interactions (including, but not limited to, the point where the viewer stopped viewing, whether or not they stopped due to interaction with source digital content in a positive manner, as well as impression data, such as viewer ID, device ID, a geographic location, or time of view, collectively, "behavior data") to the host time identification module 106 or the distribution module 112, which may modify or improve one or more lists of candidate host times at any time to optimize performance.

In some embodiments, after or while source digital content is integrated, interleaved, or inserted into the target digital content item and displayed to the viewer, the content integration module 118, the interface 122, or the point of display can collect and transmit behavior data to the host time identification module 106 or the distribution module 112, which modifies the central list of candidate host times by removing from the list of candidate host times or penalizing the candidate scores of the candidate host times that align with or closely precede points where viewers stop viewing, and by rewarding the candidate score of the candidate host times that align with or closely precede points where viewers do not stop viewing, so that future viewers of that target digital content item can receive source digital content integrated, interleaved, or inserted at more appropriate host times.

In some embodiments, after or while source digital content is integrated, interleaved, or inserted into the target digital content item and displayed to the viewer, the content integration module 118, the interface 122, or the point of display can collect and transmit behavior data to the host time identification module 106 or the distribution module 112, which can then modify the central list of candidate host times by removing from the candidate host times or penalizing the candidate scores of the candidate host times that align with or closely precede points where viewers stop viewing, and by rewarding the candidate scores of the candidate host times that align with or closely precede points where viewers do not stop viewing in list of candidate host times that are specific to the types of device that the target digital content item is displayed, the geographic area where the view occurred, the time the view occurred, and so on.

In some embodiments, the host time identification module 106 or the distribution module 112 additionally creates and updates objects specific to each device, geographic location, view time, or user object, and can update each of these objects for new impression and behavior data. For new target digital content items, after a list of candidate host times has been created, the list of candidate host times may be compared to objects that line up with the impression data while preparing a final list of host times for each new impression of the data to deliver to the content integration module 118.

In some embodiments, the host time identification module 106 uses machine learning based approaches to predict, for each new set of host times, the list of appropriate host times for a given device, geographic location, view time, or user object based on past impression or behavior data. For example, features about the host times, device, geographic location, view time, or user object, and the behavior can become features in a new or updated predictive model to identify host times. In some embodiments, these models can be specific to device, geographic location, view time, or user object.

In some embodiments, behavior data is transmitted from the content integration module 118 or the display module to the host time identification module 106 so that the behavior data can be used as a feature in future predictive models or can be used to weight future predictions. This creates a feedback loop that enhances the identification of future host times. Specifically, features about both the host times and the behavior data can become features in a new or updated predictive model to identify host times.

In some embodiments, after host times or candidate host times have been identified, the content integration module 118 is configured to use the host times identified by host time identification module 106 as the insertion spots for integrating the source digital content into a new version of the target digital content ("versioning"), with that new version being streamed or otherwise distributed or displayed to one or more viewers of the target digital content.

In some embodiments where versioning is the method used to integrate source digital content into the target digital content item, the content integration module may operate as or may be co-located with distribution module 112.

In some embodiments where versioning is the method used to integrate source digital content into the target digital content item, the content integration module may operate as or may be co-located with host time identification module 106.

In some embodiments, after host times or candidate host times have been identified, the content integration module 118 uses the host times identified by host time identification module 106 as the segue spots for interleaving (i.e., alternative, during display to the viewer) the source digital content and the target digital content by playing them in an alternating fashion.

Figure 16:
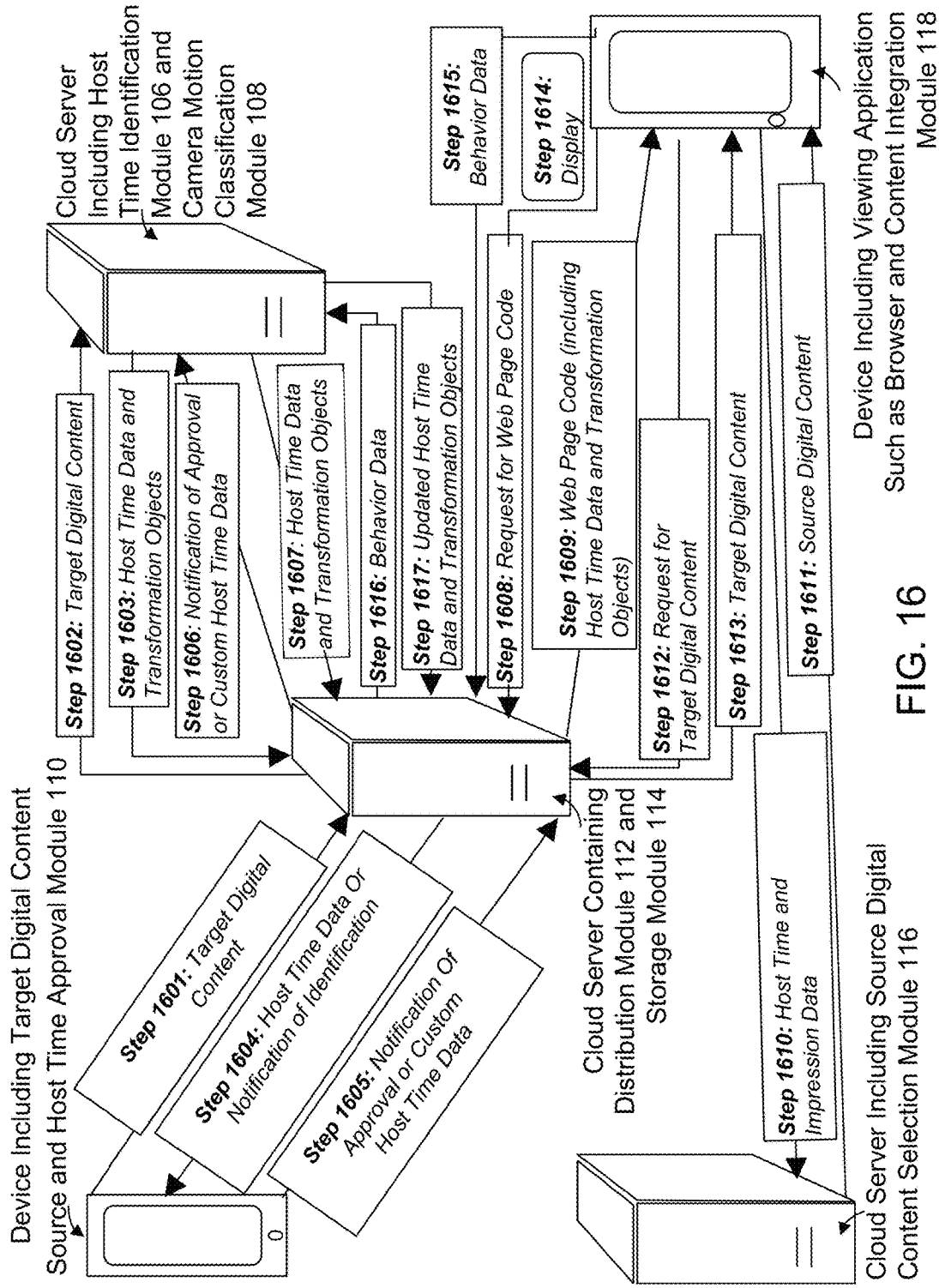
FIG. 16 illustrates an embodiment of a content integration system and examples of operations of the content integration system in accordance with some embodiments.

FIG. 16 illustrates an embodiment of a content integration system in accordance with some embodiments. step 1601 represents the transmission, after or while the target digital content item is created, of the target digital content item or its components from a target digital content source, which may also include the host time approval module 110, to a distribution module 112 (e.g., a media website or a social network website dedicated to serving digital content). Distribution module 112 may operate as or may be co-located with storage module 114.

In step 1602, the distribution module 112 transmits the target digital content item to a host time identification module 106, which may operate as or may be co-located with the camera motion classification module 108.

In step 1603, the host time identification module 106 returns one or more instances of host time data and transformation objects to the distribution module 112.

In step 1604, a notification of the identification of host times and/or one or more instances of host time data are sent by the distribution module 112 to the target digital content source that also includes the host time approval module 110.

In step 1605, a notification of approval or customizations of instances of host time data are sent from the target digital content source to the distribution module 112.

In step 1606, the distribution module 112 transmits the notification of approval or customizations of instances of host time data to the host time identification module 106 for the preparation of the transformation object.

In step 1607, the host time identification module 106 sends the transformation object to the distribution module 112, where the transformation object is integrated into the source code for the web page or application in which the target digital content is viewed and is then transmitted to storage module 114, which stores the transformation object.

In step 1608, a viewing application such as a browser, which may also act as the content integration module 118, issues to the distribution module 112 a request for the source code of the web page or application in which the target digital content is viewed.

In step 1609, the source code of the web page or application in which the target digital content is viewed, including the host time data and transformation objects, as well as instructions to the source digital content selection module 116, are delivered from the distribution module 112 to the viewing application, such as a browser.

In step 1610, the viewing application transmits the host time and impression data to the source digital content selection module 116.

In step 1611, the source digital content selection module 116 transmits selected source digital content to the viewing application, which also acts as the content integration module 118.

In step 1612, the viewing application issues a request to the distribution module 112 for the target digital content item.

In step 1613, the target digital content item is delivered from the distribution module 112 to the content integration module 118, which is also a viewing application (such as a browser).

In step 1614, the content integration module 118 integrates the source digital content into the target digital content item by applying the transformation objects to the source digital content and then interleaving it with the target digital content item.

In step 1615, the content integration module 118 returns the viewing behavior data to the distribution module 112.

In step 1616, the distribution module 112 sends the viewing behavior data to the host time identification module 106, which then uses the behavior data to update a central list of host times and/or lists of host times customized for each device and/or user, etc., and also uses it to update the predictive models used to evaluate host times.

In step 1617, the host time identification module 106 sends the updated host times and their transformation objects to distribution module 112, which stores them and uses them for future impressions.

Figure 17:
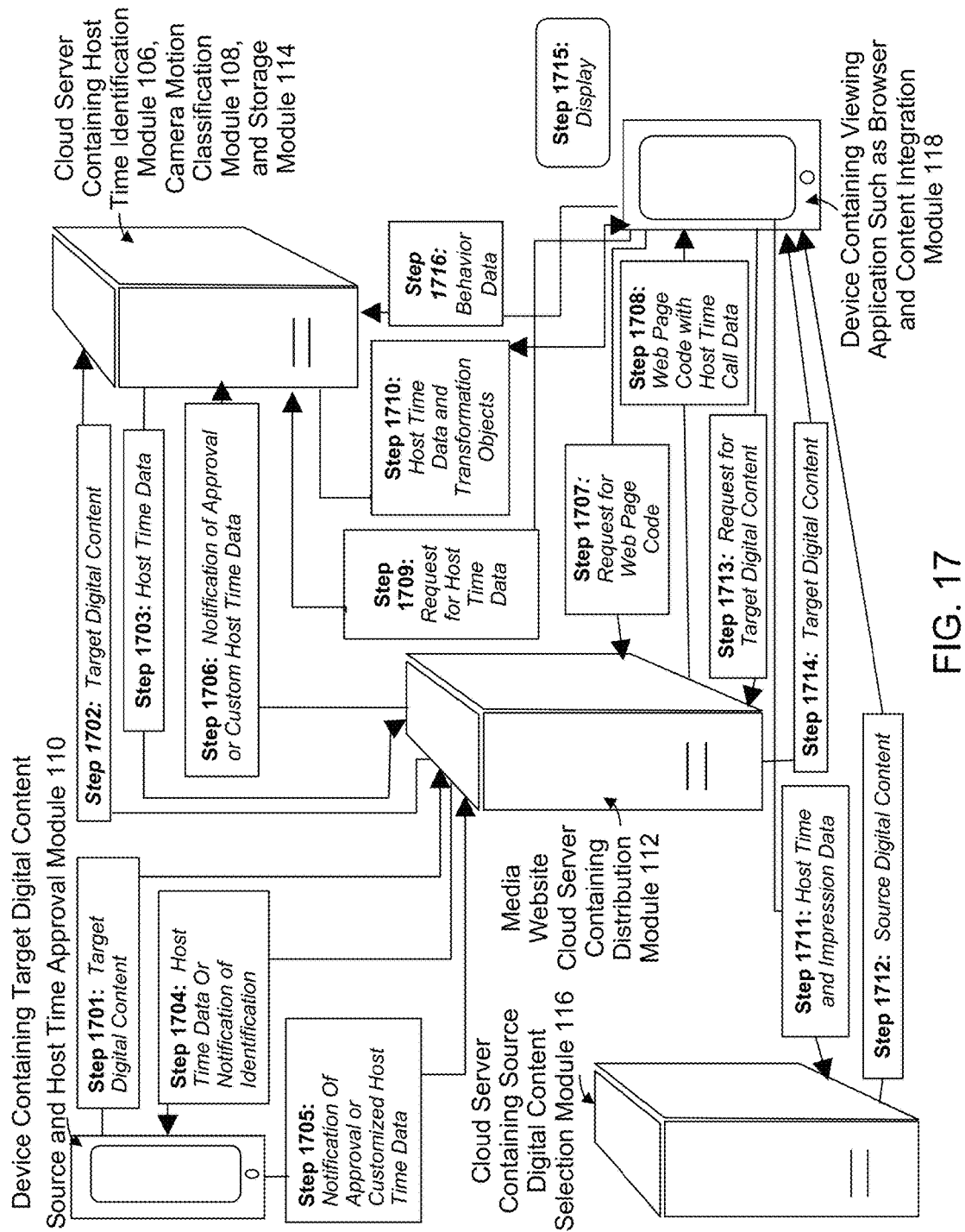
FIG. 17 illustrates an embodiment of a content integration system and examples of operations of the content integration system in accordance with some embodiments.

FIG. 17 illustrates an embodiment of a content integration system in accordance with some embodiments. step 1701 represents the transmission, after or while a target digital content item is created, of the target digital content item or its components from a target digital content source (which also includes the host time approval module 110) to a distribution module 112 (e.g., a media website or social network dedicated to serving digital content).

In step 1702, the distribution module 112 transmits the target digital content item to a host time identification module 106, which may operate as or may be co-located with the camera motion classification module 108 and the storage module 114.

In step 1703, the host time identification module 106 returns one or more instances of host time data to the distribution module 112.

In step 1704, a notification of the identification of host times or one or more instances of host time data are sent by the distribution module 112 to the target digital content source, which also includes the host time approval module 110.

In step 1705, a notification of approval or customizations of instances of host time data are sent from the target digital content source to distribution module 112.

In step 1706, the distribution module 112 transmits the notification of approval or customizations of instances of host time data to the host time identification module 106, which prepares the transformation objects and transmits them and the host time data to the storage module 114 for storage.

In step 1707, a viewing application, such as a browser, which also acts as the content integration module 118, issues a request to the distribution module 112 for the source code of the web page or application in which the target digital content is viewed.

In step 1708, the source code of the web page, along with the host time data and the instructions or data for calling the host time identification module 106 and the source digital content selection module 116, is delivered from the distribution module 112 to the content integration module 118, which is also a viewing application, such as a browser.

In step 1709, the viewing application issues a request for the host time data to the host time identification module 106.

In step 1710, the host time identification module 106 returns the host time data that it has obtained from the storage module 114 to the content integration module 118.

In step 1711, the viewing application issues a request for the source digital content, along with data about the host time and the impression, to the source digital content selection module 116.

In step 1712, the source digital content selection module 116 transmits the selected source digital content to the viewing application.

In step 1713, a viewing application issues a request to the distribution module 112 for the target digital content item.

In step 1714, the target digital content item is delivered from the distribution module 112 to the content integration module 118.

In step 1715, the content integration module 118, which is also the viewing application such as a browser, integrates the source digital content into the target digital content item by applying the transformation objects to the source digital content and then interleaving it with the target digital content item (e.g., alternating their display).

In step 1716, the content integration module 118 returns the viewing behavior data to the host time identification module 106, which uses the behavior data to update a central list of host times and/or lists of host times customized for each device and/or user, etc., and then uses the updated host times for future impressions of the target digital content. Host time identification module 106 may also use the behavior data to update the predictive models used to evaluate host times.

Figure 18:
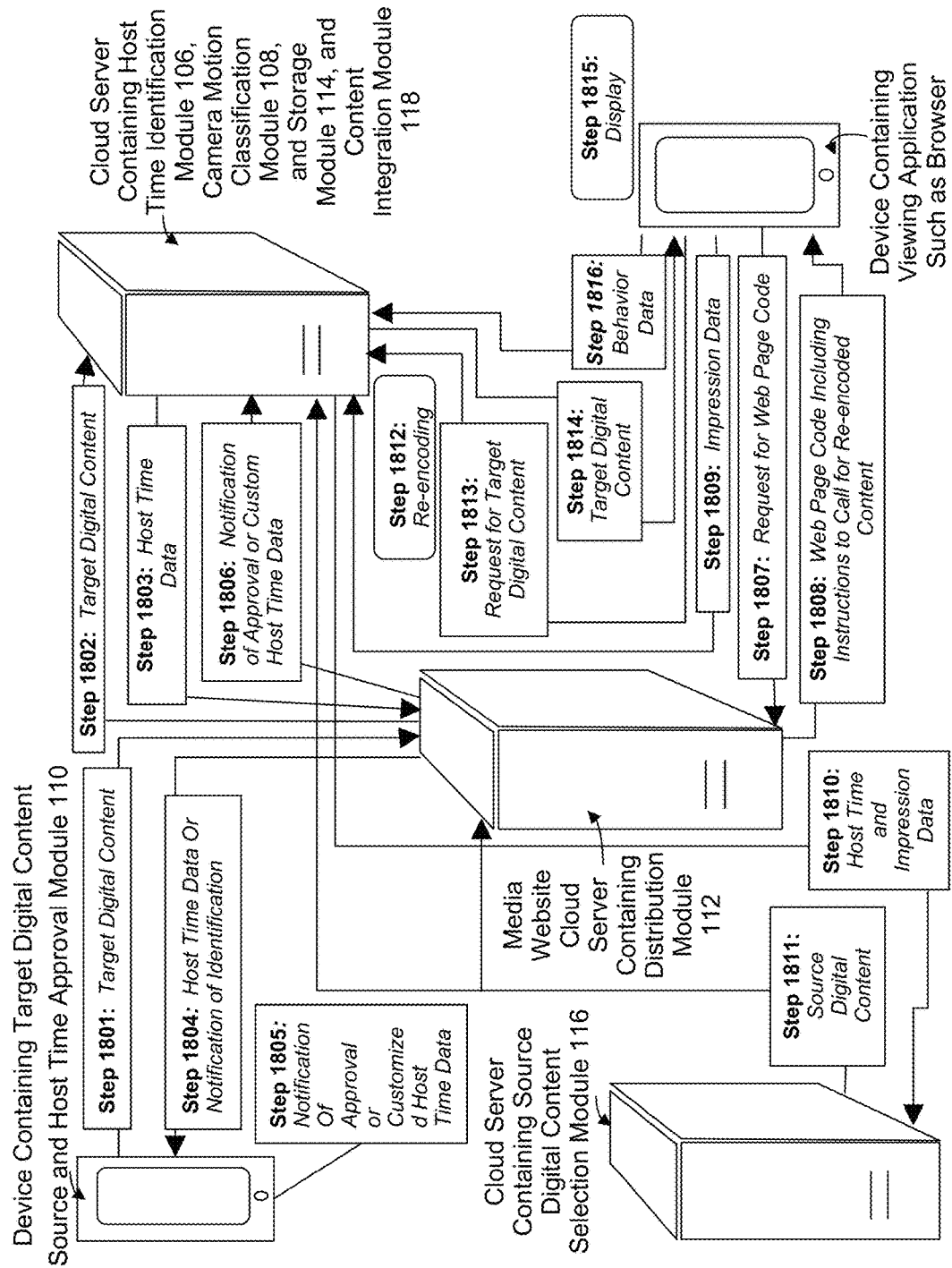
FIG. 18 illustrates an embodiment of a content integration system and examples of operations of the content integration system in accordance with some embodiments.

FIG. 18 illustrates an embodiment of a content integration system in accordance with some embodiments. step 1801 represents the transmission, after or while a target digital content item is created, of the target digital content item or its components from a target digital content source (which also includes the host time approval module 110) to the distribution module 112 (e.g., a media website or social network dedicated to serving digital content).

In step 1802, the distribution module 112 transmits the target digital content item to the host time identification module 106, which may operate as or may be co-located with the camera motion classification module 108, the storage module 114, and the content integration module 118.

In step 1803, the host time identification module 106 returns one or more instances of host time data to the distribution module 112.

In step 1804, a notification of the identification of host times or one or more instances of host time data are sent by the distribution module 112 to the target digital content source.

In step 1805, a notification of approval or customizations of instances of host time data are sent from the target digital content source to the distribution module 112.

In step 1806, the notification of approval or customizations of instances of host time data are relayed from the distribution module 112 to the host time identification module 106, which transmits the notification of approval or customizations of instances of host time data to the storage module 114 for storage.

In step 1807, a viewing application, such as a browser, issues a request to the distribution module 112 for the source code of the web page or application in which the target digital content is viewed.

In step 1808, the web page source code, along with (1) the host time data, (2) instructions to send impression data and behavior data to the host time identification module 106 and/or (3) instructions to route requests for the target digital content item to the host time identification module 106, is delivered from the distribution module 112 to the viewing application.

In step 1809, the viewing application transmits the impression data to the host time identification module 106.

In step 1810, the host time identification module 106 transmits the host time and the impression data to the source digital content selection module 116.

In step 1811, the source digital content selection module 116 transmits selected source digital content to the host time identification module 106, which also acts as the content integration module 118.

In step 1812, the host time identification module 106, which also acts as the content integration module 118, integrates the source digital content into the target digital content item to create (re-encode) a new version of target digital content item.

In step 1813, a viewing application issues a request to the host time identification module 106 for the target digital content item.

In step 1814, the (new version of the) target digital content item is delivered from the distribution module 112 to the viewing application.

In step 1815, the viewing application displays the new version of the target digital content item.

In step 1816, the content integration module 118, which is also a viewing application (e.g., a browser), returns the viewing behavior data to the host time identification module 106, which uses the behavior data to update a central list of host times and/or lists of host times customized for individual device and/or user, etc. and then uses the updated host times for future impressions of the target digital content item. The host time identification module 106 also uses the behavior data to update the predictive models used to evaluate host times.

Figure 19:
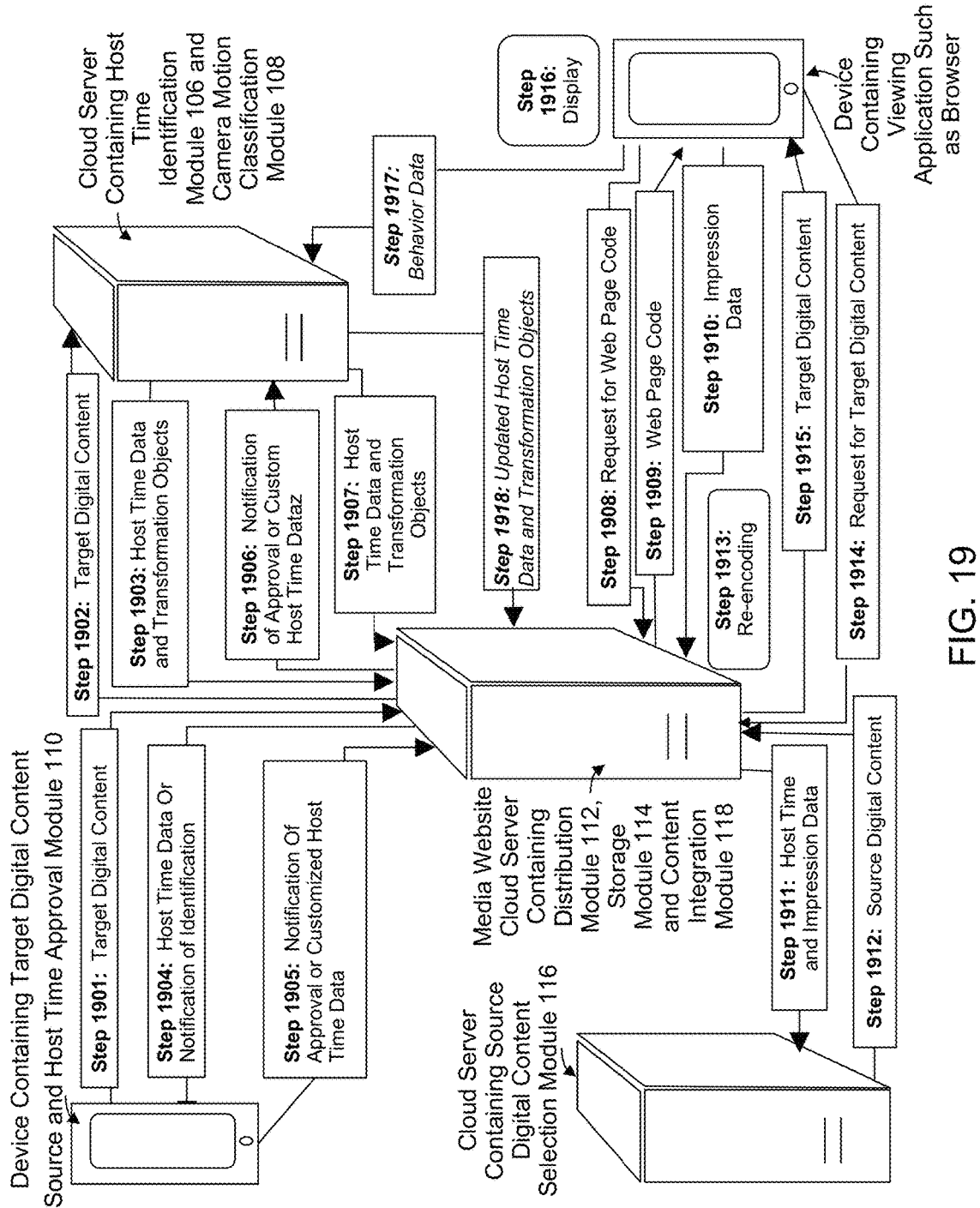
FIG. 19 illustrates an embodiment of a content integration system and examples of operations of the content integration system in accordance with some embodiments.

FIG. 19 illustrates an embodiment of a content integration system in accordance with some embodiments. The content integration module 118 is co-located with the distribution module 112. step 1901 represents the transmission, after or while a target digital content item is created, of the target digital content item or its components from a target digital content source (which also includes the host time approval module 110) to the distribution module 112 (e.g., a media website or social network dedicated to serving digital content), which also acts as the storage module 114 and content integration module 118.

In step 1902, the distribution module 112 transmits the target digital content item to the host time identification module 106, which may operate as or may be co-located with a scene recognition module and the camera motion classification module 108.

In step 1903, the host time identification module 106 returns one or more instances of host time data to the distribution module 112.

In step 1904, a notification of the identification of host times or one or more instances of host time data are sent by the distribution module 112 to the target digital content source, which also includes the host time approval module 110.

In step 1905, a notification of approval or customizations of instances of host time data are sent from the target digital content source to distribution module 112.

In step 1906, the notification of approval or customizations of instances of host time data are relayed from the distribution module 112 to the host time identification module 106, which creates transformation objects.

In step 1907, the host time identification module 106 transmits the host time data and any transformation objects to the distribution module 112, which, in turn, transmits the host time data and any transformation objects to the storage module 114 for storage.

In step 1908, a viewing application, such as a browser, issues a request to the distribution module 112 for the source code of the web page or application in which the target digital content item is viewed.

In step 1909, the web page source code is delivered from the distribution module 112 to the viewing application, along with instructions to return the impression data and behavior data to distribution module 112.

In step 1910, the viewing application forwards the impression data to the distribution module 112.

In step 1911, the distribution module 112 transmits the impression data and the host time data that it retrieves from the storage module 114 to the source digital content selection module 116.

In step 1912, the source digital content selection module 116 transmits selected source digital content to the distribution module 112, which also acts as the content integration module 118.

In step 1913, the distribution module 112, which also acts as the content integration module 118, integrates the source digital content into the target digital content item to create a new version of the target digital content item.

In step 1914, the viewing application issues a request to the distribution module 112 for the (new version of the) target digital content item.

In step 1915, the target digital content item is delivered from the distribution module 112 to the viewing application.

In step 1916, the viewing application displays the new version of the target digital content item.

In step 1917, the content integration module 118, which is also the viewing application, returns the viewing behavior data to the host time identification module 106, which uses the behavior data to update a central list of host times and/or lists of host times customized for individual devices and users, etc.

In step 1918, the host time identification module 106 forwards the updated lists and transformation objects to the distribution module 112, which then uses those host times for future impressions of the target digital content item.

VI. System Example

Figure 20:
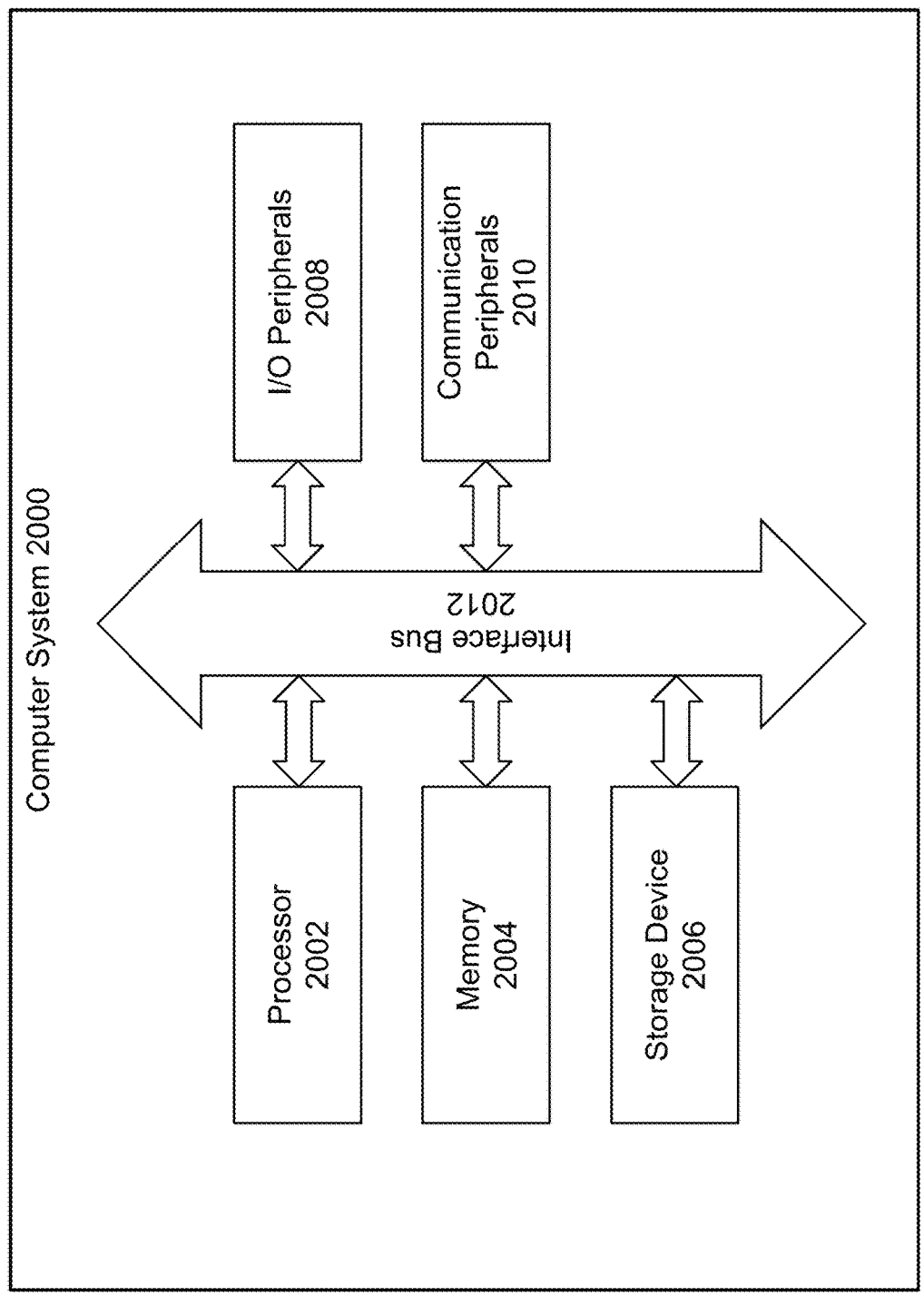
FIG. 20 illustrates an example of a computer system for implementing some of the embodiments disclosed herein.

FIG. 20 illustrates an example computer system 2000 for implementing some of the embodiments disclosed herein. Computer system 2000 may have a distributed architecture, where some of the components (e.g., memory and processor) are part of an end user device and some other similar components (e.g., memory and processor) are part of a computer server. Computer system 2000 includes at least a processor 2002, a memory 2004, a storage device 2006, input/output (I/O) peripherals 2008, communication peripherals 2010, and an interface bus 2012. Interface bus 2012 is configured to communicate, transmit, and transfer data, controls, and commands among the various components of computer system 2000. Memory 2004 and storage device 2006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. Memory 2004 and storage device 2006 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with computer system 2000.

Further, memory 2004 includes an operating system, programs, and applications. Processor 2002 is configured to execute the stored instructions and includes, for example, a logical processing unit, a microprocessor, a digital signal processor, and other processors. Memory 2004 and/or processor 2002 can be virtualized and can be hosted within another computing system of, for example, a cloud network or a data center. I/O peripherals 2008 include user interfaces, such as a keyboard, screen (e.g., a touch screen), microphone, speaker, other input/output devices, and computing components, such as graphical processing units, serial ports, parallel ports, universal serial buses, and other input/output peripherals. I/O peripherals 2008 are connected to processor 2002 through any of the ports coupled to interface bus 2012. Communication peripherals 2010 are configured to facilitate communication between computer system 2000 and other computing devices over a communications network and include, for example, a network interface controller, modem, wireless and wired interface cards, antenna, and other communication peripherals.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

In some embodiments, the software needed for implementing a process or a database includes a high level procedural or an object-orientated language such as C, C++, C#, Java, or Perl. The software may also be implemented in assembly language if desired. The language can be a compiled or an interpreted language. Packet processing implemented in a host server includes any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable—read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of examples, and that numerous changes in the details of implementation of the disclosure may be made without departing from the spirit and scope of the disclosure, which is limited only by the claims which follow. Other embodiments are within the following claims. For example, the server groups in the host server can each be a logical module running on a single server.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method, comprising, by one or more processing devices:
    receiving a target digital content item, the target digital content item comprising a plurality of frames;
    identifying, from the plurality of frames and based on one or more attributes of the target digital content item, a set of candidate host frames for inserting source digital content items;
    determining a candidate score for each respective candidate host frame of the candidate host frames, wherein the candidate score indicates a degree of transition of the target digital content item at the candidate host frame; and
    generating host time defining data including identifications and the candidate scores of the candidate host frames.

2. The method of claim 1, wherein the one or more attributes of the target digital content item include at least one of metadata associated with the target digital content item, pixel values or objects in visual content of the target digital content item, or a transcript, amplitude, zero crossing rate, energy, entropy of energy, spectral centroids, spectral spread, spectral entropy, spectral flux, spectral roll-off, MFCCs, chroma vector, or chroma deviation of audio content of the target digital content item.

3. The method of claim 1, further comprising:
    ranking the candidate host frames identified in the host time defining data based on their respective candidate scores in the host time defining data;
    selecting, based on the ranking, one or more candidate host frames for inserting one or more source digital content items into the target digital content item; and
    inserting the one or more source digital content items into the target digital content item at the one or more candidate host frames.

4. The method of claim 1, wherein:
    identifying the set of candidate host frames comprises, for each pair of consecutive frames in the plurality of frames:
        determining a level of change of the one or more attributes between the pair of consecutive frames; and
        selecting a later frame in the pair of consecutive frames as a candidate host frame based on the level of change being greater than a threshold value; and
    determining the candidate score for each candidate host frame comprises determining the candidate score for the candidate host frame based on the level of change of the one or more attributes between the candidate host frame and a frame immediately before the candidate host frame.

5. The method of claim 1, wherein:
    identifying the set of candidate host frames comprises, for each frame in an analyzing interval that includes a set of frames:
        determining an attribute of the frame;
        determining, as a threshold, a variance of the attribute among the frame and frames before the frame in the analyzing interval; and
        identifying the frame as a candidate host frame based on the attribute of the frame being greater than the threshold.

6. The method of claim 1, wherein:
    the one or more attributes comprise pixel values of the target digital content;
    identifying the set of candidate host frames comprises, for each frame in the plurality of frames:
        determining a level of change of the pixel values between the frame and a white frame or between the frame and a black frame; and
        selecting the frame as a candidate host frame based on the level of change being greater than a threshold value; and
    determining the candidate score for each candidate host frame comprises determining the candidate score for the candidate host frame based on the level of change of the pixel values between the frame and the white frame or between the frame and the black frame.

7. The method of claim 1, further comprising:
    extracting, using one or more neural networks, a first set of one or more feature vectors from a frame in an analyzing interval before a candidate host frame;
    combining the first set of one or more feature vectors into a first content vector;
    extracting, using the one or more neural networks, a second set of one or more feature vectors from a frame in an analyzing interval after the candidate host frame;
    combining the second set of one or more feature vectors into a second content vector;
    determining a distance between the first content vector and the second content vector;
    increasing the candidate score of the candidate host frame based on the distance being greater than a first threshold value or removing the candidate host frame from the set of candidate host frames based on the distance being less than a second threshold value.

8. The method of claim 1, wherein identifying the set of candidate host frames comprises, for each frame in the plurality of frames:
    recognizing, using a neural network, objects in the frame;
    comparing the objects recognized in the frame with objects recognized in an earlier frame;
    identifying the frame as a candidate host frame based on the objects recognized in the frame different from the objects recognized in the earlier frame.

9. The method of claim 1, further comprising:
    determining, for each of the candidate host frames, a difference of the one or more attributes between a frame immediately preceding the candidate host frame and a frame immediately following the candidate host frame; and
    reducing the candidate score of the candidate host frame or removing the candidate host frame from the set of candidate host frames based on the difference being less than a threshold.

10. The method of claim 1, further comprising, for each candidate host frame in the candidate host frames:

determining, for a first analyzing interval immediately preceding the candidate host frame, a first motion vector for frames in the first analyzing interval using an optical flow method;

determining, for a second analyzing interval immediately following the candidate host frame, a second motion vector for frames in the second analyzing interval using the optical flow method;

determining a difference between the first motion vector and the second motion vector; and decreasing the candidate score of the candidate host frame or removing the candidate host frame from the set of candidate host frames based on the difference being less than a threshold.

11. The method of claim 1, wherein:
the target digital content item comprises audio data;
identifying the set of candidate host frames comprises:
classifying frames or segments of the audio data, the classifying including determining a degree of confidence of the classification for each respective frame or segment of the audio data; and
identifying, as a candidate host frame, a frame immediately before a change of classification among the frames or segments of the audio data; and
determining the candidate score for the candidate host frame comprises determining the candidate score for the candidate host frame based on the degree of confidence associated with the candidate host frame.

12. The method of claim 1, wherein:
the target digital content item comprises audio data;
identifying the set of candidate host frames comprises:
classifying segments of the audio data;
identifying two or more segments of the audio data classified as human speech based on the classification; and
determining a change of speakers among the two or more segments based on an amplitude or Mel-Frequency Cepstral Coefficients (MFCCs) associated with each of the two or more segments, wherein determining the change of speakers includes determining a degree of confidence of determining the change of speakers; and
identifying, as a candidate host frame, a frame immediately before the change of speakers; and
determining the candidate score for the candidate host frame comprises determining the candidate score for the candidate host frame based on the degree of confidence of determining the change of speakers.

13. The method of claim 12, wherein identifying the set of candidate host frames further comprises,
determining that a same speaker is associated with two consecutive segments based on the amplitude or the Mel-Frequency Cepstral Coefficients (MFCCs) associated with each of the two consecutive segments;
determining a level of valence, arousal, or other emotional intensity for each of two consecutive segments;
identifying, as a candidate host frame, a frame immediately before a second segment of the two consecutive segments based on a difference between the levels of valence, arousal, or other emotional intensity for the two consecutive segments being greater than a threshold value; and
determining the candidate score for the candidate host frame comprises determining the candidate score for the candidate host frame based on the difference between the levels of valence, arousal, or other emotional intensity for the two consecutive segments.

14. The method of claim 1, wherein:
the target digital content item comprises audio data;
identifying the set of candidate host frames comprises:
converting the audio data into text using voice recognition; and
identifying, using natural language processing, the candidate host frames based on a pause or transition in the text.

15. The method of claim 1, wherein:
the target digital content item comprises visual data and audio data;
the method further comprises parsing the target digital content item into the visual data and audio data;
identifying the set of candidate host frames comprises:
identifying a preliminary set of candidate host frames based on one or more attributes associated with the visual data; and
identifying, from the preliminary set of candidate host frames, the set of candidate host frames based on one or more attributes of the audio data; and
determining the candidate score for the candidate host frame comprises determining the candidate score for the candidate host frame based on the one or more attributes associated with the visual data and the one or more attributes of the audio data.

16. The method of claim 1, further comprising adjusting the candidate scores of the set of candidate host frames based on:
a popularity of each portion of the target digital content item; or
a proximity of each candidate host frame to a start of the target digital content item.

17. The method of claim 1, wherein identifying the set of candidate host frames comprises:
grouping the plurality of frames into scenes based on a level of camera motion in each frame, the camera motion including a translation or a rotation.

18. The method of claim 1, wherein the host time defining data further comprises:
a source digital content transformation object associated with each respective candidate host frame,
wherein the source digital content transformation object describes a transformation of an source digital content item before inserting the source digital content item into the target digital content item at the candidate host frame.

19. A system comprising:
a processing device; and
a non-transitory computer-readable medium communicatively coupled to the processing device, wherein the processing device is configured to execute program code stored in the non-transitory computer-readable medium and thereby perform operations comprising:
receiving a target digital content item, the target digital content item comprising a plurality of frames;
identifying, from the plurality of frames and based on one or more attributes of the target digital content item, a set of candidate host frames for inserting source digital content items;
determining a candidate score for each respective candidate host frame of the candidate host frames, wherein the candidate score indicates a degree of transition of the target digital content item at the candidate host frame; and
generating host time defining data including identifications and the candidate scores of the candidate host frames.

20. A system for integrating digital media content, the system comprising:
- means for receiving a target digital content item, the target digital content item comprising a plurality of frames;
- means for identifying, from the plurality of frames and based on one or more attributes of the target digital content item, a set of candidate host frames for inserting source digital content items;
- means for determining a candidate score for each respective candidate host frame of the candidate host frames, wherein the candidate score indicates a degree of transition of the target digital content item at the candidate host frame; and
- means for generating host time defining data including identifications and the candidate scores of the candidate host frames.

\* \* \* \* \*